United States Patent
Habib

(10) Patent No.: US 11,610,337 B2
(45) Date of Patent: Mar. 21, 2023

(54) CALIBRATION OF CAMERAS AND SCANNERS ON UAV AND MOBILE PLATFORMS

(71) Applicant: Purdue Research Foundation, West Lafayette, IN (US)

(72) Inventor: Ayman F. Habib, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 358 days.

(21) Appl. No.: 16/792,729

(22) Filed: Feb. 17, 2020

(65) Prior Publication Data

US 2020/0327696 A1    Oct. 15, 2020

Related U.S. Application Data

(60) Provisional application No. 62/806,853, filed on Feb. 17, 2019.

(51) Int. Cl.
| | |
|---|---|
| *G06T 7/80* | (2017.01) |
| *G06T 7/73* | (2017.01) |
| *G01S 17/89* | (2020.01) |
| *B64C 39/02* | (2006.01) |
| *G08G 5/00* | (2006.01) |

(52) U.S. Cl.
CPC .............. *G06T 7/80* (2017.01); *B64C 39/024* (2013.01); *G01S 17/89* (2013.01); *G06T 7/74* (2017.01); *G08G 5/003* (2013.01); *B64C 2201/127* (2013.01); *G06T 2207/10028* (2013.01)

(58) Field of Classification Search
CPC ........ G01S 7/4972; G01S 17/86; G01S 17/88; G01S 17/89; G06T 2207/10028; G06T 2207/30244; G06T 2207/30252; G06T 7/74; G06T 7/80; B64C 2201/027; B64C 2201/123; B64C 2201/127; B64C 2201/14; B64C 39/024; B64D 47/08; G08G 5/003
USPC .......................................................... 701/468
See application file for complete search history.

(56) References Cited

U.S. PATENT DOCUMENTS

| | | | |
|---|---|---|---|
| 10,247,573 B1* | 4/2019 | Gavrilets | ................ B64C 13/18 |
| 11,037,320 B1* | 6/2021 | Ebrahimi Afrouzi | ..... G06T 7/90 |

(Continued)

FOREIGN PATENT DOCUMENTS

| | | | | |
|---|---|---|---|---|
| CA | 2974031 A1 * | 1/2018 | ........... | G01S 5/0252 |
| GB | 2559157 A  * | 8/2018 | ........... | G06K 9/6203 |

(Continued)

OTHER PUBLICATIONS

Feature-Based Registration of Terrestrial Laser Scans with Minimum Overlap Using Photogrammetric Data, Renaudin et al., ETRI Journal, vol. 33, No. 4, p. 517-527, Aug. 2011.

*Primary Examiner* — Atul Trivedi

(74) *Attorney, Agent, or Firm* — Maginot, Moore & Beck LLP

(57) ABSTRACT

Boresight and lever arm calibration of cameras and scanners on UAVs or mobile platforms is performed by optimizing the flight/travel path of the UAV/platform relative to control points or tie points. The flight/travel paths account for the potential bias of boresight angles, lever arm and times delays to produce an accurate estimation of the orientation of these cameras/scanners relative to the GNSS/INS coordinate system of the UAV/platform.

17 Claims, 19 Drawing Sheets

(56) References Cited

U.S. PATENT DOCUMENTS

| | | | | |
|---|---|---|---|---|
| 2005/0091411 A1* | 4/2005 | Michaiel | | H04L 67/52 |
| | | | | 709/250 |
| 2008/0052181 A1* | 2/2008 | Devitt-Carolan | | G06Q 30/00 |
| | | | | 705/26.8 |
| 2009/0154793 A1* | 6/2009 | Shin | | G01C 11/06 |
| | | | | 701/5 |
| 2015/0221079 A1* | 8/2015 | Schultz | | G01S 7/4808 |
| | | | | 382/190 |
| 2016/0047744 A1* | 2/2016 | Adel | | G03F 7/70633 |
| | | | | 356/243.1 |
| 2016/0356890 A1* | 12/2016 | Fried | | G01S 7/4863 |
| 2016/0379388 A1* | 12/2016 | Rasco | | G06N 5/003 |
| | | | | 715/753 |
| 2017/0001732 A1* | 1/2017 | Lim | | G05D 1/0684 |
| 2017/0017240 A1* | 1/2017 | Sharma | | B64C 39/024 |
| 2017/0029107 A1* | 2/2017 | Emami | | G08G 5/0069 |
| 2017/0039765 A1* | 2/2017 | Zhou | | G06T 7/521 |
| 2017/0329351 A1* | 11/2017 | Park | | G01S 5/0205 |
| 2017/0336198 A1* | 11/2017 | Adel | | G01B 11/272 |
| 2017/0366264 A1* | 12/2017 | Riesing | | H04B 10/118 |
| 2018/0089804 A1* | 3/2018 | Habib | | G06T 7/55 |
| 2018/0259341 A1* | 9/2018 | Aboutalib | | G06T 7/74 |
| 2018/0259496 A1* | 9/2018 | McPeek | | G01N 33/025 |
| 2019/0043211 A1* | 2/2019 | Bertrand | | G01C 25/00 |
| 2019/0302276 A1* | 10/2019 | Sandford | | G01S 17/93 |
| 2019/0368879 A1* | 12/2019 | Roumeliotis | | G06T 7/246 |
| 2020/0150677 A1* | 5/2020 | Walters | | G05D 1/0206 |
| 2020/0184027 A1* | 6/2020 | Dolan | | G01S 13/931 |
| 2020/0193158 A1* | 6/2020 | Delp | | G06V 20/188 |
| 2020/0217666 A1* | 7/2020 | Zhang | | G01C 21/206 |
| 2020/0327696 A1* | 10/2020 | Habib | | G01S 17/89 |
| 2021/0372793 A1* | 12/2021 | Nikulin | | G05D 1/106 |
| 2022/0036750 A1* | 2/2022 | Poojary | | G01S 13/867 |
| 2022/0113423 A1* | 4/2022 | Yang | | B64C 39/024 |
| 2022/0130145 A1* | 4/2022 | Connary | | G06V 20/10 |

FOREIGN PATENT DOCUMENTS

| | | | | |
|---|---|---|---|---|
| JP | 7050683 B2 | * | 4/2022 | ......... B60W 30/182 |
| WO | WO-2018055513 A2 | * | 3/2018 | ............ G01S 17/10 |
| WO | WO-2018089268 A1 | * | 5/2018 | .......... B64C 39/024 |
| WO | WO-2022080283 A1 | * | 4/2022 | |

* cited by examiner

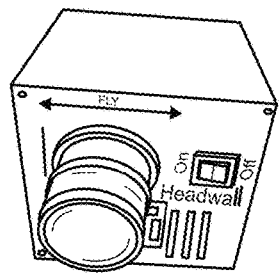 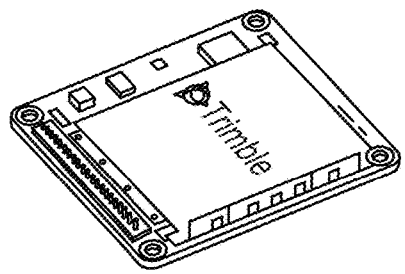 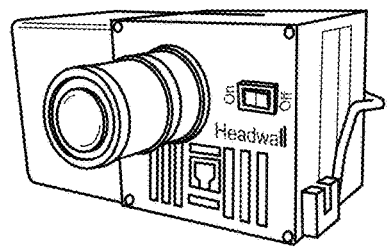
FIG. 7a          FIG. 7b          FIG. 7c
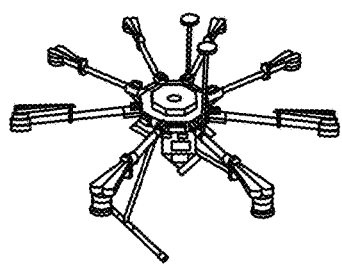 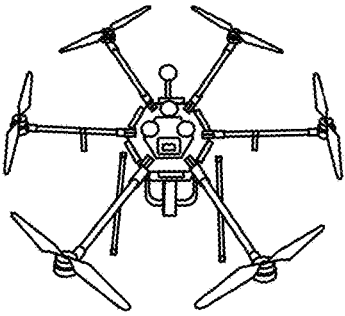 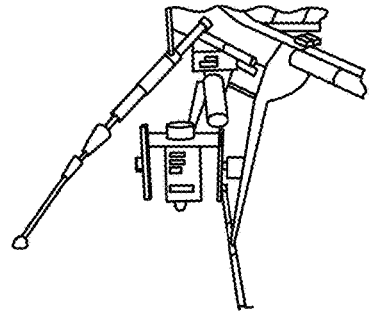
FIG. 8a          FIG. 8b          FIG. 8c Illustration of point positioning of a UAV-based Light Detection and Ranging (LiDAR) system.

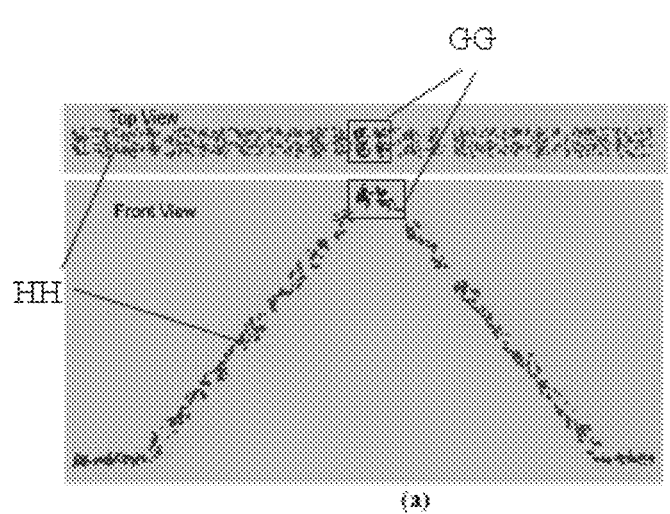 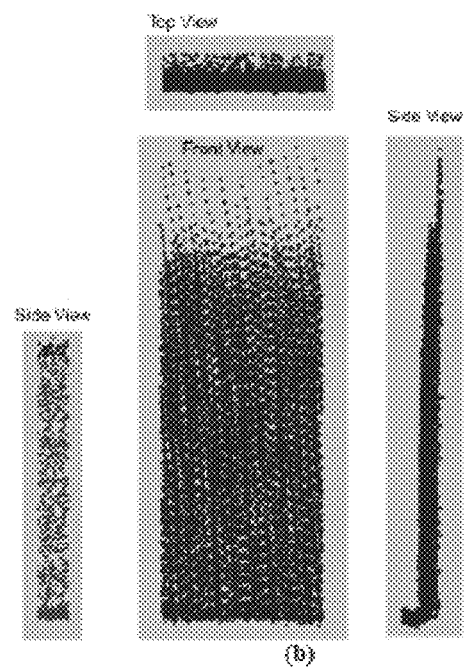
FIG. 23 a
FIG. 23b
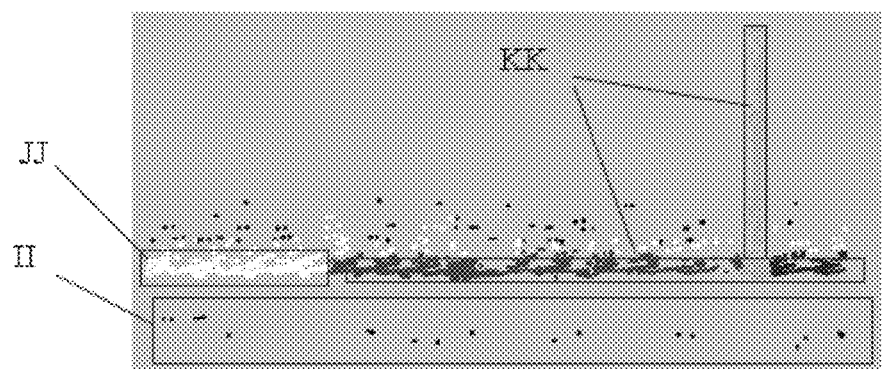
FIG. 24

CALIBRATION OF CAMERAS AND SCANNERS ON UAV AND MOBILE PLATFORMS

PRIORITY CLAIM

This application claims priority to U.S. Provisional No. 62/806,853, filed on Feb. 17, 2019, the entire disclosure and appendices of which are incorporated herein by reference.

STATEMENT OF GOVERNMENT INTEREST

This invention was made with government support under DE-AR0000593 awarded by the US Department of Energy. The government has certain rights in the invention.

BACKGROUND

Remote sensing is a rapidly growing technological and industrial field. Cameras and/or LiDAR scanners mounted to a mobile platform are used to extract a wide range of information. One increasingly important application is the use of cameras and/or LiDAR scanners to image and gather data concerning land and terrain.

In particular, hyperspectral imaging is quickly emerging as an irreplaceable mechanism for collecting high-quality scientific data. By measuring the spectral radiance in narrow bands across large swaths of the electromagnetic spectrum, hyperspectral sensors or imaging spectrometers are able to provide large amounts of characteristic information pertaining to the objects they capture. The growing popularity of hyperspectral imaging technology and recent advances in unmanned aerial vehicles (UAVs) created an environment where high-resolution hyperspectral imaging is more accessible than ever. Hyperspectral imaging has been adopted to a considerable extent in precision agricultural applications that employ phenotypic data to improve management of farm inputs, such as fertilizers, herbicides, seed, and fuel. Phenotypic data captured by hyperspectral sensors enables researchers and agronomists to sense crop characteristics such as moisture content, nutrients, chlorophyll, leaf area index, and crop biomass without the drawbacks associated with laborious and expensive in-field measurements.

In the past, hyperspectral imaging utilized mobile mapping systems (MMS), such as satellites and manned aircrafts, as the platforms for agricultural data collection. Modern MMS, including terrestrial and airborne platforms, provide economic and accurate means to collect data for urban mapping, environmental monitoring, transportation planning and transportation corridor mapping, infrastructure monitoring, change detection, resource management, precision agriculture, archeological mapping and even digital documentation of cultural heritage sites. Due to recent improvements in the accuracy of integrated Global Navigation Satellite Systems (GNSSs) and inertial navigation systems (INS), an MMS can now provide geo-referenced data with high spatial accuracy. For agricultural management applications, the increased requirements for geospatial data at a higher spatial resolution and temporal frequency made it clear that manned aircraft and satellite remote sensing systems cannot fully satisfy such needs.

Therefore, low-cost UAVs are emerging as ideal alternative platforms for agricultural management as well as other applications. UAVs offer several design and performance advantages over other conventional platforms, such as small size, low weight, low flying height slow flight speed, low cost, and ease of storage and deployment. A UAV-based MMS is capable of providing high spatial resolution data at a higher data collection rate. Meanwhile, integrated GNSS/INS mounted on a UAV allows for directly geo-referencing the acquired data with high accuracy while eliminating the need for an excessive number of ground control points (GCPs). A GCP is a marked target on the ground, placed strategically in an area of interest that has a known geo-referenced location.

With regard to deriving accurate three-dimensional (3-D) geospatial information, the interior and exterior orientation of the utilized sensor should be established, whether the sensor is a spectral camera, frame camera or LiDAR (light detection and ranging) type device. Interior orientation, which encompasses the internal sensor characteristics such as focal length and lens distortion, is established through a sensor calibration procedure. Exterior orientation, which defines the position and orientation of the sensor, camera or LiDAR scanner at the moment of exposure, is traditionally established using GCPs within a bundle adjustment procedure. Nowadays, with the help of an integrated GNSS/INS unit onboard, the exterior orientation parameters can be directly estimated without the need for GCPs.

Due to the large volume of acquired data by a hyperspectral scanner, high spatial resolution systems are usually based on having a 1-D array along the focal plane while operating through what is commonly known as "push-broom scanning mechanism." A push-broom scanner acquires a thin strip at a given exposure. A scene is formed by successive exposures along the flight trajectory and concatenating the acquired strips. Considering that the exterior orientation parameters of every scan line have to be determined, a direct geo-referencing procedure is often adopted to provide the position and orientation of the scanner using an integrated GNSS/INS unit. In this regard, the GNSS/INS position and orientation refer to the body frame of the inertial measurement unit (IMU). Therefore, the lever arm components and boresight angles between the hyperspectral push-broom scanner and IMU body frame coordinate systems need to be estimated to derive accurate position and orientation of the scanner. The "lever arm", which is the spatial displacement between the IMU body frame and the perspective center of the scanner, can be established to a reasonable accuracy (e.g., 2-3 cm) using conventional measurement tools. However, the orientation of the camera/LiDAR scanner coordinate systems (boresight angles) relative to the IMU body frame can only be roughly established. The boresight angles play a more critical role than the lever arm components in controlling the geospatial accuracy of derived data due to the error propagation of the boresight angle as a function of the height of the platform above the region being detected. Thus, reliable boresight angles calibration is essential for ensuring the spatial accuracy of GNSS/INS-assisted imaging platforms. The boresight calibration data is applied as a correction factor to the 3D position data measured by the UAV as it travels over terrain. The boresight calibration can be incorporated into software that assigns the navigation data to the acquired image data to ensure accuracy of the data. Alternatively, the boresight calibration data can be used to point the imaging device.

Boresight calibration approaches are well established for frame imaging sensors or cameras through bundle adjustment of overlapping images along and across the flight direction together with several GCPs. For push-broom scanners, significant research has been dedicated toward establishing reliable boresight calibration strategies. In one approach, the boresight angles are estimated by minimizing the difference between the ground coordinates of GCPs and the projected ground coordinates of the respective image points. More specifically, using the interior orientation parameters, GNSS/INS geo-referencing parameters, nominal lever arm components, and boresight angles, and an available digital elevation model (DEM), the image points corresponding to established GCPs were projected onto the DEM using a ray tracing procedure. Then, boresight angles are estimated by minimizing the differences between the GCPs and the projected ground coordinates. An experimental dataset used in this prior approach was acquired by the push-broom scanner "ROSIS-03" over a test site from a flying height of 3230 m. An IGI AeroControl CCNS IIb was used for the determination of platform position and orientation. The accuracy of the GNSS/INS position and orientation information is about 0.1-0.3 m and 0.01°-0.1°, respectively. Using a DEM with 5-10 m vertical accuracy and 25 m horizontal resolution, five GCPs were used for boresight calibration. The estimated ground coordinates of seven check points were compared to the surveyed coordinates to evaluate the accuracy of the boresight calibration procedure. The RMSE (root mean square error) of the differences in the XY coordinates was around 1.5 m, which is almost at the same level as the ground sampling distance (GSD) of the used sensor (1.9 m). Similar strategies involving additional parameters (e.g., aircraft stabilizer scaling factors and variations of sensor's CCD size) in the calibration procedure have been developed in which the achieved accuracy for the ortho-rectified mosaics using the estimated boresight angles and a given DEM were found to be accurate at the level of the GSD of the involved sensors.

In one automated in-flight boresight calibration approach for push-broom scanners, the boresight angles were estimated by forcing conjugate light rays to intersect as much as possible. The proposed approach applied a speeded up robust features (SURF) detector to identify interest points, whose descriptors were used in a matching routine to derive homologous points in overlapping scenes. Then, tie points were projected onto a DEM utilizing a ray tracing algorithm using nominal values for the boresight angles. As is known, a tie point corresponds to a pixel or data point in two or more different images of a scene that represent the projection of the same physical point in the scene. The tie point does not have known ground coordinates. The boresight angles were derived by minimizing the root-mean-square error between the ground coordinates of corresponding tie points. The approach was evaluated using two dataset with overlapping strips over a forested mountain and a relatively flat urban area, where the average GSD was 0.5 m for both dataset. To evaluate the boresight calibration results, residual errors were calculated using a reference dataset comprised of manually defined tie points. The RMSE of the residual errors was 1.5 m (three times the GSD) for the forest dataset and 0.5 m (GSD level) for the urban area.

Accurate geospatial information from push-broom scanners and LiDAR cameras, which are aided by a GNSS/INS unit, requires accurate boresight calibration (i.e., accurate estimation of the orientation of these sensors relative to the GNSS/INS coordinate system). In addition, time delay (i.e., time synchronization errors) among the different sensors must be estimated. For LiDAR sensors, manufacturer-based time synchronization is quite accurate since any time delay issues will result in point clouds with poor quality. However, for cameras integrated with a GNSS/INS unit, time delay has to be accurately estimated since these sensors are not solely designed for GNSS/INS-assisted platforms.

SUMMARY OF THE DISCLOSURE

The key limitation of the above approaches is the need for having a digital elevation model (DEM) of the covered area as well as some GCPs. Moreover, none of these prior approaches address or propose an optimal/minimal flight and control point/tie point configuration for reliable estimation of the boresight angles. The present disclosure addresses this aspect by providing an optimal/minimal configuration of the flight and control/tie point layout for reliable and practical boresight calibration using bias impact analysis. The present disclosure contemplates the use of conjugate points in overlapping point clouds derived from different flight/travel lines for camera-based boresight calibration and for time delay estimation. The disclosure further contemplates using conjugate planar/linear features for LiDAR boresight calibration.

In one embodiment, the analysis is based on evaluating the impact of incremental changes in the boresight pitch, roll, and heading angles ($\delta\Delta\omega$, $\delta\Delta\phi$, and $\delta\Delta\kappa$) on derived ground coordinates after making some assumptions regarding the flight trajectory and topography of the covered terrain (e.g., parallel scanner and IMU coordinate systems and vertical scanner over relatively flat/horizontal terrain). The derived impact is then used to establish an optimal/minimal flight and control/tie point configuration for reliable boresight angles estimation. An approximate approach that starts with the outcome of the bias impact analysis is then introduced for evaluating the boresight angles using tie features in overlapping scenes. The present disclosure proposes two rigorous approaches. The first approach is based on using GCPs in single or multiple flight lines. The second rigorous approach estimates the boresight angles using tie points only.

To ensure reliable/practical estimation of the boresight angles, a bias impact analysis is provided to derive the optimal/minimal flight and control/tie point configuration for the estimation of the boresight angles. The conceptual basis of the bias impact analysis is deriving the flight configuration that maximizes the impact of biases in the boresight parameters while ensuring the sufficiency of the flight and control/tie feature configuration to avoid any potential correlation among the sought after parameters. More specifically, the analysis has shown that the optimal/minimal flight and control/tie point configuration should encompass: (1) flight lines in opposite and/or parallel directions and (2) GCPs or tie features that are laterally displaced from the flight lines.

The present disclosure also contemplates different calibration strategies for LiDAR systems, namely for boresight and lever arm calibration. Both strategies start with a 3D point cloud relative to a global reference frame in which the point cloud is derived from data collected from several flight/travel lines of the vehicle. The calibration procedures disclosed herein derive mounting parameters for the on-board sensors/cameras, namely the lever arm ($\Delta X$ and $\Delta Y$) and the boresight angles ($\Delta\omega$, $\Delta\phi$, $\Delta\kappa$) for all of the sensors of the vehicle, and the lever arm ($\Delta Z$) for all but the reference sensor (in a multiple sensor vehicle). These differential mounting parameters are applied to the measured mounting parameters of the installation to adjust the 3D point cloud data generated by the vehicle.

One calibration approach used for boresight calibration of push-broom scanners is an approximate one that uses tie features in overlapping scenes to estimate the boresight angles after making some assumptions regarding the flight trajectory and topography of the covered area (namely, vertical imagery over relatively flat terrain). The other two approaches are rigorous with one using GCPs while the other relying on tie points. The GCP-based rigorous approach aims at minimizing the differences between the projected object points onto the image space and the observed image points for the used GCPs (i.e., enforcing the collinearity principle). The tie feature-based rigorous approach aims to improve the intersection of conjugate light rays corresponding to tie features (i.e., enforcing the coplanarity principle).

To get accurate geospatial information from push-broom cameras and LiDAR scanners, which are aided by a GNSS/INS unit, it is necessary to have accurate boresight calibration (i.e., accurate estimation of the orientation of these sensors relative to the GNSS/INS coordinate system). Moreover, time delay (i.e., time synchronization errors) among the different sensors have to be estimated. For LiDAR sensors, manufacturer-based time synchronization is quite accurate since any time delay issues will result in point clouds with poor quality. However, for cameras integrated with a GNSS/INS unit, time delay has to be accurately estimated since these sensors are not solely designed for GNSS/INS-assisted platforms. For time delay estimation, conjugate features in overlapping images are used to solve for the time delay as well as the boresight angles after establishing the optimal flight/feature configuration for the estimation of these parameters. Thus, the boresight calibration strategy is augmented to also include time delay estimation.

In one aspect of the present disclosure, a method is provided for calibrating the boresight mounting parameters for an imaging device mounted to a vehicle that includes: directing the vehicle in a travel path for calibrating the imaging device, the travel path including three travel lines, two of the travel lines being in parallel and in opposite directions and having a substantially complete overlap of the swath along the two travel lines, and the third travel line being parallel to the other two travel lines with the swath of the third travel line overlapping about 50% of the swath of the other two travel lines; obtaining image and associated location data along each of the three travel lines; identifying a tie point I in the image data that is located in the center of the swath of the third travel path; for each of the three travel lines, a, b and c, calculating an estimated position $r_I^m(a)$, $r_I^m(b)$ and $r_I^m(c)$, respectively, of the tie point in the mapping frame coordinate system; establishing one of the three travel lines, a, as a reference and calculating a difference between the estimated position of the reference travel line $r_I^m(a)$, and the estimated position of each of the other two travel lines, $r_I^m(b)$, $r_I^m(c)$, respectively; applying a least squares adjustment to equations of the following form to solve for the biases in boresight angles, $\delta\Delta\omega$, $\delta\Delta\phi$ and $\delta\Delta\kappa$, from the pre-determined assumed boresight angles $$r_I^m(a) - r_I^m(b) = \begin{bmatrix} \mp\left(H + \frac{X_a'^2}{H}\right)\delta\Delta\varphi \\ \pm H\delta\Delta\omega \pm X_a'\delta\Delta\kappa \\ 0 \end{bmatrix} - \begin{bmatrix} \mp\left(H + \frac{X_b'^2}{H}\right)\delta\Delta\varphi \\ \pm H\delta\Delta\omega \pm X_b'\delta\Delta\kappa \\ 0 \end{bmatrix},$$

where $r_I^m(a) - r_I^m(b)$ are the calculated differences between the reference travel line and each of the other two travel lines, respectively, H is the altitude of the vehicle above the tie point, $X'_a$ is the lateral distance between the tie point and the reference travel line, and $X'_b$ is the lateral distance between the tie point and each of the other two travel lines, respectively; and adjusting the predetermined assumed boresight angles by the biases in boresight angles determined in the least squares adjustment.

In another aspect of the present disclosure, a method is provided for calibrating the boresight mounting parameters for an imaging device mounted to a vehicle that includes: selecting two ground control points in the region, the ground control points having a known position and orientation relative to the mapping frame and the ground control points being separated by a distance less than the half the width of the swath of the imaging device; directing the vehicle in a travel path for calibrating the imaging device, the travel path being substantially perpendicular to a line between the two ground control points in which a first control point is substantially aligned with the center of the swath and the second control point is substantially aligned with an edge of the swath as the vehicle travels over the one control point; obtaining image and associated location data along the travel path, the location data including location data of said two ground control points; calculating an offset of the boresight pitch and roll angles based on the difference between the location data for first control point and the known location of the first control point; calculating an offset of the boresight heading angle based on the difference between the location data for first control point and the known location of the second control point; and adjusting the predetermined assumed boresight angles by the calculated offsets.

In another feature of the present disclosure, a method is provided for calibrating the mounting parameters for a LiDAR (light detection and ranging) imaging device mounted to a vehicle that includes: (a) providing a scene to be imaged by the LiDAR having vertical and horizontal planar features; (b) directing the vehicle in a travel path for calibrating the imaging device, the travel path including a flight direction along opposite flight lines while scanning a vertical planar feature parallel to the flight direction to obtain location data of the vertical planar feature in each of the opposite flight lines, and estimating a change in lever arm coordinate (X) by minimizing discrepancies between the location data obtained in each of the opposite flight lines; (c) directing the vehicle in the travel path for calibrating the imaging device in a flight direction along opposite flight lines while scanning a vertical planar feature perpendicular to the flight direction to obtain location data of the vertical planar feature in each of the opposite flight lines, and estimating a change in lever arm coordinate (Y) by minimizing discrepancies between the location data obtained in each of the opposite flight lines; (d) directing the vehicle in the travel path for calibrating the imaging device in a flight direction along opposite flight lines at one altitude and along a third flight line at a different altitude while scanning a horizontal planar feature and a vertical planar feature perpendicular to the flight direction, and estimating a change in boresight pitch ($\Delta\omega$) by minimizing discrepancies between the location data obtained in each of the three flight lines; (e) directing the vehicle in the travel path for calibrating the imaging device in a flight direction along opposite flight lines at one altitude and along a third flight line at a different altitude while scanning a horizontal planar feature and a vertical planar feature parallel to the flight direction, and estimating a change in boresight roll ($\Delta\phi$) by minimizing discrepancies between the location data obtained in each of the three flight lines; (f) directing the vehicle in the travel path for calibrating the imaging device in a flight direction along two flight lines in the same direction with a lateral separation between the two flight lines and estimating a change in boresight roll ($\Delta\kappa$) by minimizing discrepancies between the location data obtained in each of the two flight lines; and then (g) adjusting the pre-determined assumed lever arm coordinates to the values (X, Y) and adjusting pre-determined assumed boresight angles ($\omega$, $\phi$, $\kappa$) by the values ($\Delta\omega$, $\Delta\phi$, $\Delta\kappa$) respectively.

Another feature of the disclose is a method for calibrating the mounting parameters for a LiDAR (light detection and ranging) imaging device mounted to a vehicle that includes: (a) directing the vehicle in a travel path for calibrating the imaging device, the travel path including two or more travel paths over a scene; (b) extracting data from a plurality of LiDAR scans, image data and trajectory data and generating a LiDAR 3D point cloud; (c) identifying two or more conjugate features in the LiDAR point cloud and image data and generating the location of the conjugate features in the imaging frame coordinate system; (d) computing the 3D mapping frame coordinates for the LiDAR and image features initially using the pre-determined assumed mounting parameters; (e) pairing conjugate features; (f) assigning one LiDAR scan as a reference and generating a weight matrix of others of the plurality of LiDAR scans in relation to the reference for all conjugate features; (g) estimating new mounting parameters for use in modifying the mounting parameters by minimizing discrepancies between the reference and each of the plurality of LiDAR scans using least squares adjustment (LSA) of the weight matrix; (h) comparing the new mounting parameters to immediately prior mounting parameters and if the difference is greater than a pre-defined threshold value returning to Step (d) using the new mounting parameters in computing the 3D mapping frame coordinates; and (i) if the difference in Step (h) is less than the pre-defined threshold, outputting the new mounting parameters estimated in Step (g).

According to another aspect of the disclosure a method for calibrating the mounting parameters for a LiDAR (light detection and ranging) imaging device mounted to a vehicle includes: (a) directing the vehicle in a travel path for calibrating the imaging device, the travel path including two or more travel paths over a scene; (b) extracting data from a plurality of LiDAR scans generating a LiDAR 3D point cloud; (c) identifying all profiles in the LiDAR point cloud in which the profiles are comprised of multiple linear segments with angular variability between the segments; (d) extracting a template profile in one travel path from among all profiles and identifying points in the 3D point cloud corresponding to the template profile; (e) identifying profiles in the remaining travel paths that match the template profile and identifying points in the 3D point cloud corresponding to each of the profiles; (f) determining the 3D mapping frame coordinates for each point of all the profiles initially using the pre-determined assumed mounting parameters; (g) comparing points in the template profile to points in each of the other profiles, respectively, to find the closest point pairs between the two profiles; (h) generating a weight matrix for each profile, respectively, based on the closest point pairs between the respective profile and the template profile; (i) estimating new mounting parameters for use in modifying the mounting parameters by minimizing discrepancies between point pairs; (j) comparing the new mounting parameters to immediately prior mounting parameters and if the difference is greater than a pre-defined threshold value returning to Step (f) using the new mounting parameters; and (k) if the difference in Step (j) is less than the pre-defined threshold, outputting the new mounting parameters estimated in Step (i).

The present disclosure also contemplates a method for calibrating the mounting parameters for an imaging device mounted to a vehicle that adjusts for time delay in the detection and sensing of the device, in which the method includes: (a) directing the vehicle along at least two travel paths over a scene, the travel paths being in opposite directions and at different altitudes over the scene and the vehicle linear and angular velocities along the travel paths being different; (b) determining the difference between mounting parameters calculated based on each of the at least two travel paths; (c) computing a time delay in the imaging device based on the difference determined in Step (b); and (d) adjusting the position and orientation determined by the navigation device to account for the time delay.

DESCRIPTION OF THE FIGURES

FIGS. 7a-c are pictures of the components for a push-broom scanner onboard the UAV.

FIGS. 8a-c are pictures of a UAV for use with a push-broom scanner.

FIGS. 23a-b depict retained and rejected sample profiles used in the method of the flowchart in FIG. 20.

FIG. 24 is a modified view of the sample profile classifying non-linear points, ignored linear segments due to their scarcity, and considered linear segments extracted by the method disclosed herein.

DETAILED DESCRIPTION

Figure 1A:
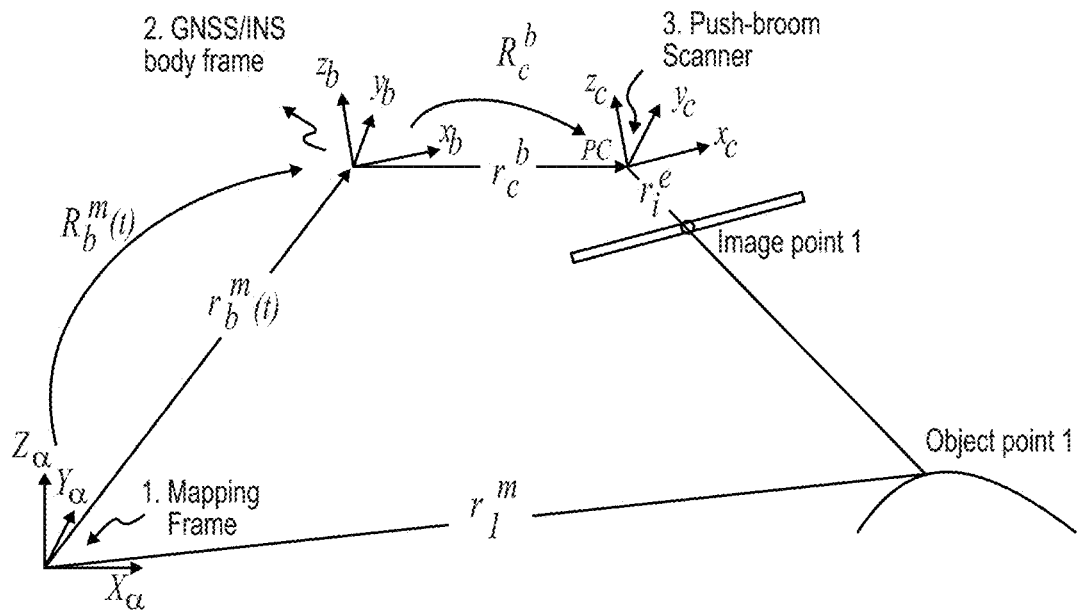
FIG. 1 is a diagram of the coordinate systems and collinearity equations for a push-broom scanner.
FIG. 1b is a diagram of the conceptual basis of using GCPs for the estimation of boresight angles of a push-broom scanner.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains In accordance with one aspect of the present disclosure, the bias impact analysis and boresight calibration are based on the collinearity equations, which describe the conceptual basis of point positioning using GNSS/INS-assisted push-broom scanners. A push-broom scanner system involves three coordinate systems—a mapping frame, an IMU body frame, and a scanner frame. The mathematical model of the collinearity principle—which describes the collinearity of the scanner perspective center, image point, and corresponding object point—is graphically illustrated in FIG. 1. The notations for spatial offsets and rotations used in FIG. 1 are: $r_a^b$, denotes the spatial offset for point a relative to a coordinate system associated with point b; and second, $R_a^b$ denotes the rotation matrix that transforms a vector from coordinate system a to coordinate system b. The superscripts/subscripts m, b, and c represent the mapping, IMU body frame, and camera/scanner coordinate systems, respectively. The variable $r_I^m$ represents ground coordinates of the object point I; $r_b^m(t)$ and $R_b^m(t)$ are the GNSS/INS-based position and orientation information of the IMU body frame coordinate system relative to the mapping frame; $r_c^b$ and $R_c^b$ are the lever arm vector and boresight rotation matrix relating the push-broom scanner and IMU body frame coordinate systems; $r_i^c$ denotes the vector connecting the scanner perspective center to the image point, i, corresponding to an object point, I; and $\lambda_i$ is a point-specific unknown scale factor that varies with the terrain relief and scanner tilt. As illustrated in FIG. 1, the xyz-axes of the scanner coordinate system can be defined to be aligned with the across flight, along flight, and up directions, respectively. In the case of push-broom scanners, the y-image coordinates for any point would be constant, which depends on the scanner alignment along the focal plane. Usually, the scan line is set vertically below the perspective center of the used lens—thus making the y-image coordinate almost zero. The y-scene coordinate defines the time of the exposure for the scan line in question. The bias impact analysis starts with Equation 1 which is the point positioning equation for a push-broom scanner:

$$r_I^m = r_b^m(t) + R_b^m(t)r_c^b + \lambda_i \cdot R_b^m(t) R_b^c r_i^c \tag{1}$$

It is understood that the lever arm vector $r_c^b$ and the boresight rotation matrix $R_c^b$ are parameters associated with the physical scanner or camera, and that these are the parameters that are being calibrated to ensure accurate geospatial data for a particular object point I. In particular, when the push-broom scanner obtains an image of a particular point on the ground the GNSS/INS unit determines global position of that imaged point (in the mapping frame coordinate system) based on the $r_b^m$ (XYZ coordinates) and $R_b^m$ (pitch, roll and heading angles) as measured by the GNSS/INS unit, as offset by the location and orientation of the scanner coordinate system relative to the GNSS/INS coordinate system, as given by $r_c^b$ (lever arm) and $R_c^b$ (rotation matrix) and by the location of the image point I of the scanner relative to the scanner coordinate system, given by $r_i^c$. The offsets $r_c^b$, $R_c^b$ and $r_i^c$ are assumed to be known a priori as predetermined parameters of the particular push-broom scanner. However, in reality the image point of the scanner is usually not where it is assumed to be, so the image obtained by the scanner may not be the particular point at the determined global position. As discussed below, for a push-broom scanner, as well as for LiDAR camera systems, biases inherent in the physical construct of the scanner/camera can lead to differences in the actual offsets $r_c^b$, $R_c^b$ and $r_i^c$ from the assumed offsets. The calibration methods disclosed herein seeks to determine those differences and to modify the global position data accordingly to provide an accurate location of the particular point being imaged. This correction is applied to all of the image and location data generated by the UAV or mobile platform.

Bias Impact Analysis for Boresight Angles

Figure 1B:
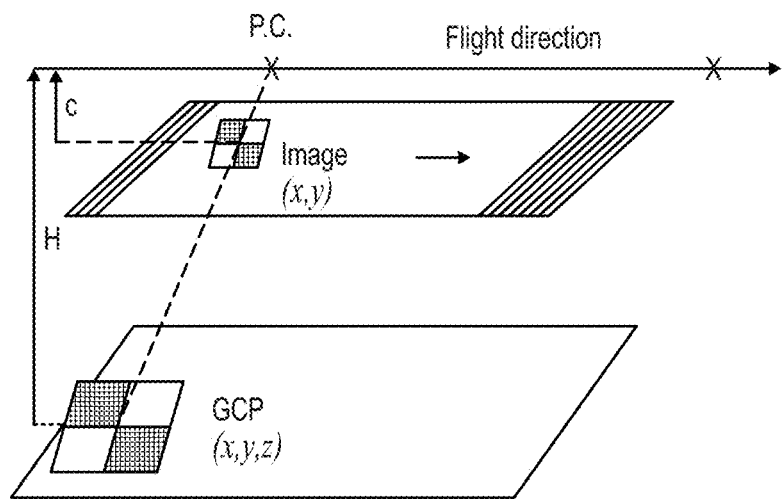

In prior techniques, the boresight angles for a GNSS/INS-assisted push-broom scanner are determined with the help of a DEM together with a set of ground control points (GCPs). In the present disclosure, the boresight angles are determined using either a set of GCPs or a set of tie features that are manually identified in overlapping push-broom scanner scenes. When using GCPs, the boresight estimation strategy disclosed herein aims at ensuring the collinearity of the GCP, corresponding image point, and perspective center of the scan line encompassing the image point. This feature is illustrated in FIG. 1b which shows the perspective center PC offset from the image plane by the focal length c (or f) and offset from the physical GCP by an altitude H. When relying on tie features, the boresight angle estimation strategy enforces the intersection of the light rays connecting the perspective centers of the scan lines encompassing corresponding image points of the tie feature and the respective conjugate image points. In other words, the calibration target function aims at estimating the boresight angles that ensures the coplanarity of conjugate image features and the respective perspective centers for the scan lines where these image points are identified.

Figure 2:
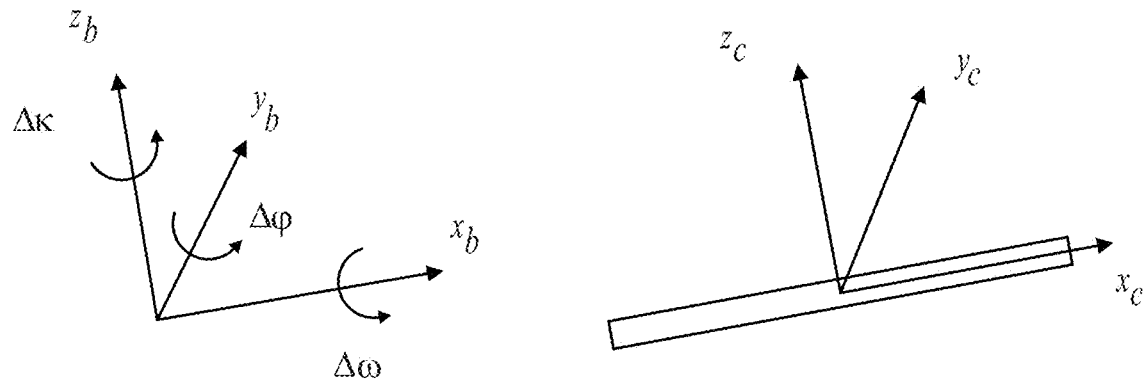
FIG. 2 is a diagram of the coordinate systems of the IMU body and the scanner.

Thus, in accordance with one aspect of the present disclosure, an optimal flight and control/tie point configuration is the one that will exhibit large deviations from the respective target functions—i.e., collinearity or coplanarity—due to small changes in the boresight angles, namely angles $\Delta\omega$, $\Delta\phi$, and $\Delta\kappa$ (FIG. 2). Therefore, the optimal flight and control/tie point configuration can be set only after analyzing the impact of biases in the boresight angles on the collinearity/coplanarity target functions. Such bias impact can be established by considering the collinearity equations and evaluating the changes in the ground coordinates of derived object points as a result of biases ($\delta$) in the boresight angles, namely $\delta\Delta\omega$, $\delta\Delta\phi$, and $\delta\Delta\kappa$. Evaluating the bias impact on derived ground coordinates is directly related to the GCP-based approach since the bias impact will violate the collinearity objective. On the other hand, the impact on the ground coordinates is indirectly related to the tie feature-based approach since the bias impact on the ground coordinates will also cause deviations from the coplanarity of corresponding light rays associated with the image points for the tie feature in question.

To facilitate the process, certain assumptions are made regarding the system setup, flight trajectory, and topography of the covered area—more specifically, following assumptions:

1) The IMU is setup in the platform with its x-, y-, and z-axes pointing in the starboard, forward, and up directions, respectively.
2) The z-axis of the IMU coordinate system is aligned along the vertical direction—i.e., the $\omega$ and $\phi$ angles of the $R_b^m(t)$ rotation matrix are zeros.
3) The platform is traveling in the South-to-North (denoted as forward) and North-to-South (denoted as backward) directions while maintaining a constant heading. Thus, the $\kappa$ angles for the forward and backward directions will be 0° and 180°, respectively.
4) The push-broom scanner coordinate system is almost parallel to the IMU body frame such that the angular offsets between these coordinate systems—$\Delta\omega$, $\Delta\phi$, and $\Delta\kappa$—are within +5°, as shown in FIG. 2.
5) The push-broom scanner is flying at a constant elevation while covering a relatively flat terrain.

These assumptions are only introduced to facilitate the bias impact analysis. Assumptions 2 and 3 results in $R_b^m(t)$ being defined according to Equation 2a, below, where the top and bottom signs refer to the forward and backward flight directions, respectively. Assumption 4 results in a boresight matrix $R_c^b$ that is defined by the incremental rotation, according to Equation 2b below, where $\Delta\omega$, $\Delta\phi$, and $\Delta\kappa$ represent the boresight pitch, roll, and heading angles, respectively.

$$R_b^m(t) = \begin{bmatrix} \pm 1 & 0 & 0 \\ 0 & \pm 1 & 0 \\ 0 & 0 & 1 \end{bmatrix} \quad (2.a)$$

$$R_c^b = \begin{bmatrix} 1 & -\Delta\kappa & \Delta\varphi \\ \Delta\kappa & 1 & -\Delta\omega \\ -\Delta\varphi & \Delta\omega & 1 \end{bmatrix}. \quad (2.b)$$

Following the above assumptions, the point positioning equation for a push-broom scanner reduce to the form of Equations 3a-3c, below, where once again the top and bottom signs refer to the forward and backward flight directions, respectively. In Equations 3a-3c, $[\Delta X\ \Delta Y\ \Delta Z]^T$ represents the lever arm vector relating the IMU body frame and scanner while $[x_i\ 0\ -f]^T$ represents the vector $r_i^c$ connecting the perspective center and the image point in question (with f being the focal length). The impact of a bias in the boresight angles on the ground coordinates of the derived object point can be derived using Equation 3c through partial derivatives with respect to the boresight pitch, roll, and heading angles and its multiplication with assumed biases (namely, $\delta\Delta\omega$, $\delta\Delta\phi$, and $\delta\Delta\kappa$).

$$r_I^m = r_b^m(t) + \begin{bmatrix} \pm\Delta X \\ \pm\Delta Y \\ \Delta Z \end{bmatrix} + \begin{bmatrix} \pm 1 & 0 & 0 \\ 0 & \pm 1 & 0 \\ 0 & 0 & 1 \end{bmatrix} \begin{bmatrix} 1 & -\Delta\kappa & \Delta\varphi \\ \Delta\kappa & 1 & -\Delta\omega \\ -\Delta\varphi & \Delta\omega & 1 \end{bmatrix} \begin{bmatrix} x_i \\ 0 \\ -f \end{bmatrix} \quad (3.a)$$

$$r_I^m = r_b^m(t) + \begin{bmatrix} \pm\Delta X \\ \pm\Delta Y \\ \Delta Z \end{bmatrix} + \lambda_i \begin{bmatrix} \pm 1 & \mp\Delta\kappa & \pm\Delta\varphi \\ \pm\Delta\kappa & \pm 1 & \mp\Delta\omega \\ -\Delta\varphi & \Delta\omega & 1 \end{bmatrix} \begin{bmatrix} x_i \\ 0 \\ -f \end{bmatrix} \quad (3.b)$$

$$r_I^m = r_b^m(t) + \begin{bmatrix} \pm\Delta X \\ \pm\Delta Y \\ \Delta Z \end{bmatrix} + \lambda_i \begin{bmatrix} \pm x_i \mp f\Delta\varphi \\ \pm x_i \Delta\kappa \pm f\Delta\omega \\ -x_i \Delta\varphi - f \end{bmatrix}. \quad (3.c)$$

Figure 3:
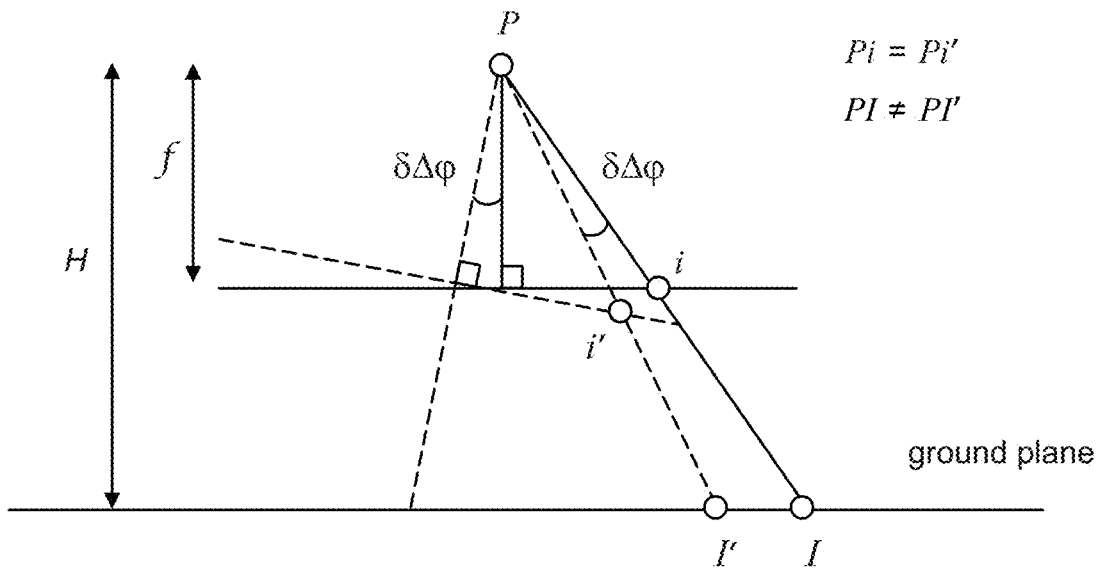
FIG. 3 is a diagram illustrating the impact of boresight roll angle on scale factor for a push-broom scanner.

It can be noted that owing to the push-broom scanning mechanism, a variation in the boresight roll angle ($\Delta\phi$) will result in a tilt of the scan line relative to the covered terrain, thus leading to a variation in the scale factor ($\lambda_i$) along the scan line, as shown in diagram of FIG. 3. Alternatively, variations in boresight pitch ($\Delta\omega$) and boresight heading ($\Delta\kappa$) angles will not affect the scale factor as the scan line would still remain parallel to the terrain. Therefore, the dependence of the scale factor ($\lambda_i$) on the boresight roll angle ($\Delta\phi$) is considered within the present bias impact analysis.

Figure 4:
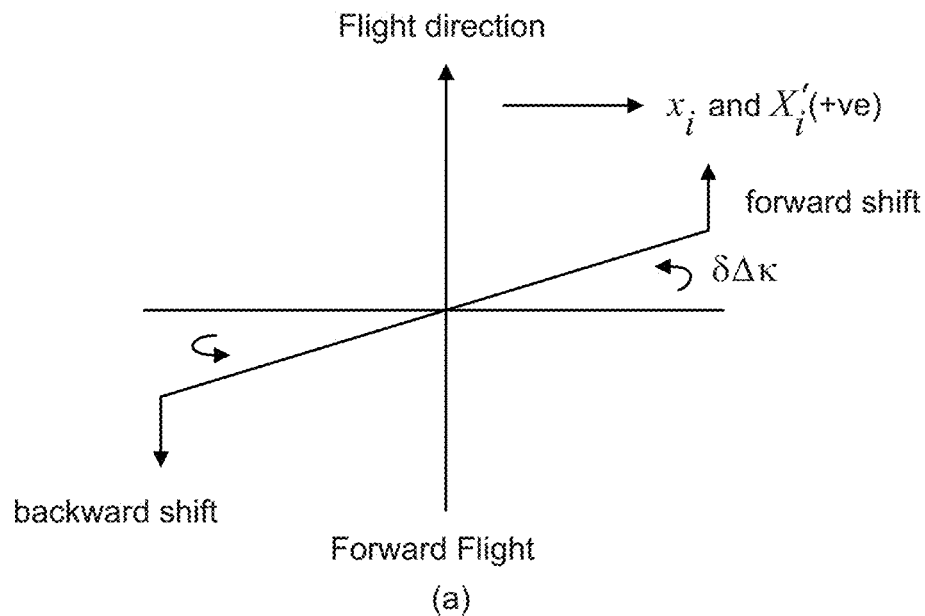
FIG. 4 is a diagram illustrating the impact of boresight heading angle on ground coordinates.
Figure 4:
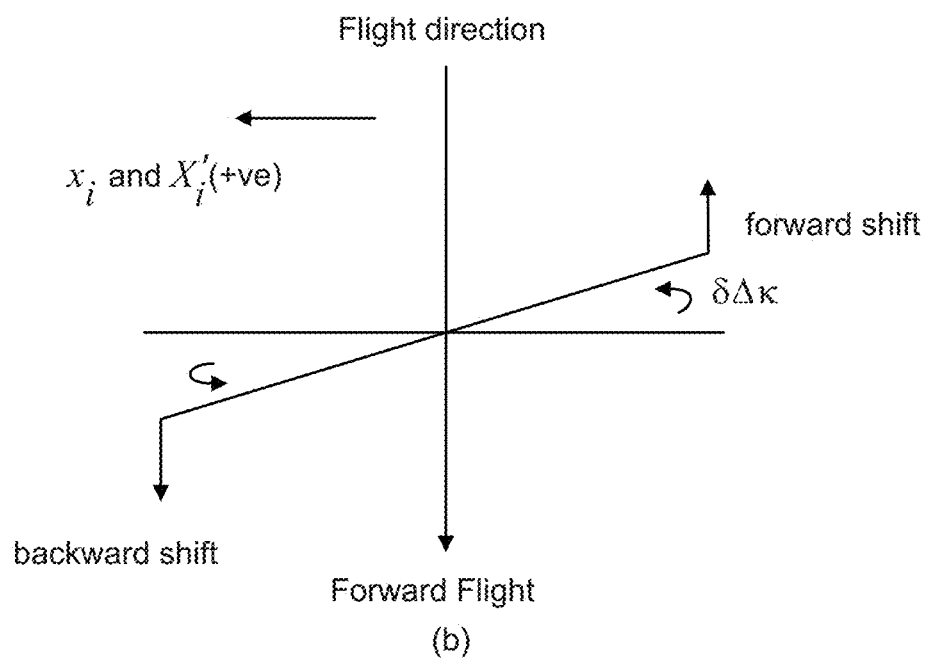

Starting with the simplified collinearity Equation 3c, the impact of variation in the boresight pitch angle ($\delta\Delta\omega$) can be presented by Equation 4, below, where the scale factor is approximated as $$\lambda_i = \frac{H}{f},$$

owing to the assumption of having a vertical scanner over relatively flat terrain. Similarly, the impact of variation in the boresight heading angle ($\delta\Delta\kappa$) can be given by Equation 5, below. The variable $X'_I$ in Equation 5 represents the lateral distance, while considering the appropriate sign, between the object point and the flight trajectory. For a given object point, $x_i$ and $X'_I$ will change their sign depending on the flying direction, as depicted in FIG. 4.

$$\delta r_I^m(\delta\Delta\omega) = \lambda_i \begin{bmatrix} 0 \\ \pm f\delta\Delta\omega \\ 0 \end{bmatrix} = \begin{bmatrix} 0 \\ \pm H\delta\Delta\omega \\ 0 \end{bmatrix} \quad (4)$$

$$\delta r_I^m(\delta\Delta\kappa) = \lambda_i \begin{bmatrix} 0 \\ \pm x_i \delta\Delta\kappa \\ 0 \end{bmatrix} = \begin{bmatrix} 0 \\ \pm X_I' \delta\Delta\kappa \\ 0 \end{bmatrix} \quad (5)$$

where $X_I' = \lambda_i x_i \approx \frac{H}{f} x_i$

A complete evaluation of the impact of variation in the boresight roll angle ($\delta\Delta\phi$) also considers the impact of such variation on the scale factor. Thus, the combined impact on the ground coordinates can be represented by Equation 6, below, which, in turn, can be expanded to Equation 7 after replacing $$\frac{\partial \lambda i}{\partial \Delta\phi} \delta\Delta\phi$$

with $\delta\lambda_i(\delta\Delta\phi)$. Considering that the boresight angles and the impact of boresight roll angle variation on the scale factor—$\delta\lambda_i(\delta\Delta\phi)$—are small values, the second order incremental terms in Equation 7 can be ignored. Thus, Equation 7 can be reduced to the form in Equation 8. To simplify Equation 8 further, the impact of variation in the boresight roll on the scale factor ($\delta\lambda_i(\delta\Delta\phi)$) can be derived with the help of FIG. 5. For a vertical scanner, given an image point i and corresponding object point I, the scale factor can be defined as $$\lambda_i = P_I/P_i = \frac{H}{f},$$

where P denotes the perspective center of the push-broom scanner.

$$\delta r_I^m(\delta\Delta\varphi) = \lambda_i \begin{bmatrix} \mp f\Delta\varphi \\ 0 \\ -x_i\delta\Delta\varphi \end{bmatrix} + \frac{\partial \lambda i}{\partial \Delta\varphi} \delta\Delta\varphi \begin{bmatrix} \pm x_i \mp f\Delta\varphi \\ \pm x_i \Delta\kappa \pm f\Delta\omega \\ -x_i\Delta\varphi - f \end{bmatrix} \quad (6)$$

$$\delta r_I^m(\delta\Delta\varphi) = \lambda_i \begin{bmatrix} \mp f\Delta\varphi \\ 0 \\ -x_i\delta\Delta\varphi \end{bmatrix} + \begin{bmatrix} \pm x_i\delta\lambda_i(\delta\Delta\varphi) \mp f\Delta\varphi\,\delta\lambda_i(\delta\Delta\varphi) \\ \pm x_i\Delta\pi\delta\lambda_i(\delta\Delta\varphi) \pm f\Delta\omega\,\delta\lambda_i(\delta\Delta\varphi) \\ -x_i\Delta\varphi\delta\lambda_i(\delta\Delta\varphi) - f\delta\lambda_i(\delta\Delta\varphi) \end{bmatrix} \quad (7)$$

$$\delta r_I^m(\delta\Delta\varphi) = \lambda_i \begin{bmatrix} \mp f\Delta\varphi \\ 0 \\ -x_i\delta\Delta\varphi \end{bmatrix} + \begin{bmatrix} \pm x_i\delta\lambda_i(\delta\Delta\varphi) \\ 0 \\ -f\delta\lambda_i(\delta\Delta\varphi) \end{bmatrix} \quad (8)$$

Figure 5:
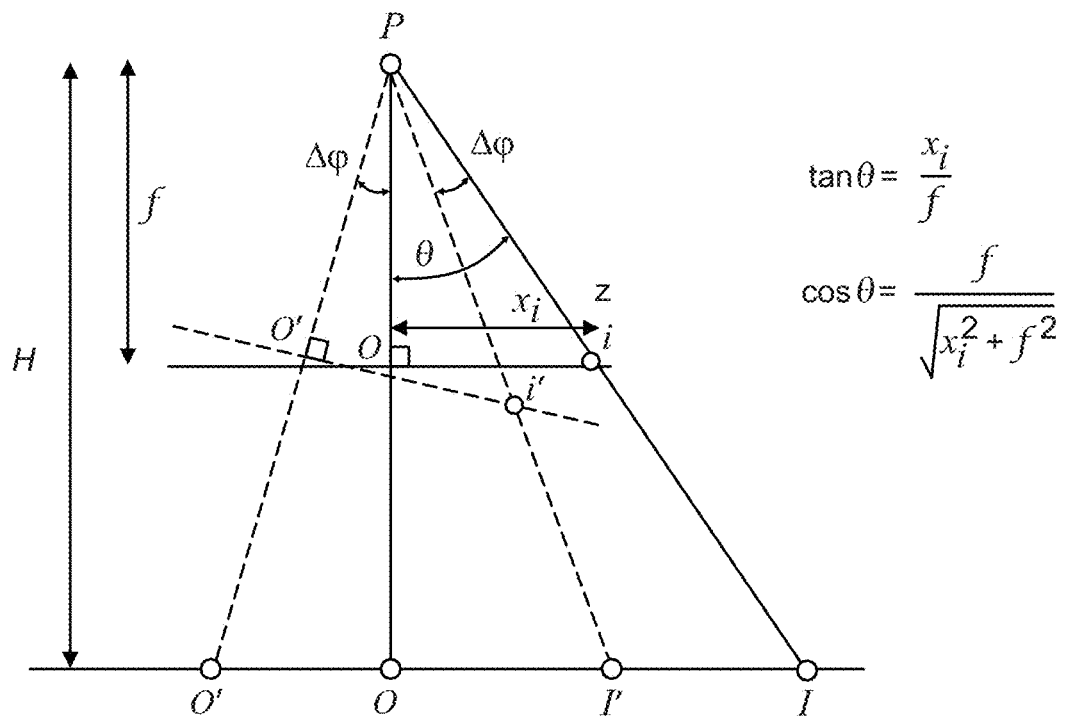
FIG. 5 is a diagram illustrating an incremental change in scale factor due to boresight roll angle.

As can be seen in FIG. 5, the scale factor as a function of the boresight roll angle ($\Delta\phi$) is represented by Equation 9 below, where the term $\cos(\theta-\Delta\phi)$ can be expanded according to Equation 10 while assuming a small boresight roll angle AO. As per FIG. 5, the distance PI' can be derived according to Equation 11. Since $P'_i = P_i = (f^2 + x_i^2)^{0.5}$, the scale factor as a function of the boresight roll angle ($\Delta\phi$) can be represented by Equation 12. As a result, the change in the scale factor due to incremental change in the boresight roll angle can be derived according to Equation 13. Then, the impact of incremental change in the boresight roll angle ($\delta\Delta\phi$) on the ground coordinates can be presented by Equation 14b below, where $X'_I$ is the lateral distance between the object point and flight trajectory.

$$\lambda_i'(\Delta\varphi) = \frac{PI'}{Pi} = \frac{PI'}{(f^0 + x_2^i)^{0.5}}, \quad (9)$$

where $PI' = H/\cos(\theta - \Delta\varphi)$ $$\cos(\theta - \Delta\varphi) = \cos\theta\,\cos\Delta\varphi + \sin\theta\,\sin\Delta\varphi \quad (10)$$
$$\cong \cos\theta + \Delta\varphi\,\sin\theta$$

$$PI' = \frac{H}{\cos\theta + \sin\theta\,\Delta\varphi} = \frac{H/\cos\theta}{1 + \tan\theta\Delta\varphi} \quad (11.a)$$
$$\cong \frac{H}{\cos\theta}(1 - \tan\theta\,\Delta\varphi)$$

$$PI' = \frac{H}{f/(f^0 + x_2^i)^{0.5}}\left(1 - \frac{x_i}{f}\Delta\varphi\right) \quad (11.b)$$

$$\lambda_i'(\Delta\varphi) = \frac{H}{f}\left(1 - \frac{x_i}{f}\Delta\varphi\right) = \frac{H}{f} - \frac{H}{f^0}x_i\Delta\varphi \quad (12)$$

$$\delta\lambda_i(\delta\Delta\varphi) = -\frac{H}{f^0}x_i\delta\Delta\varphi \quad (13)$$

$$\delta r_I^m(\delta\Delta\varphi) = \lambda_i \begin{bmatrix} \mp f\delta\Delta\varphi \\ 0 \\ -x_i\delta\Delta\varphi \end{bmatrix} + \begin{bmatrix} \pm x_i\left(-\frac{H}{f^2}\right)x_i\,\delta\Delta\varphi \\ 0 \\ -f\left(-\frac{H}{f^2}\right)x_i\,\delta\Delta\varphi \end{bmatrix} \quad (14.a)$$

$$\delta r_I^m(\delta\Delta\varphi) = \begin{bmatrix} \mp H\delta\Delta\varphi \mp \frac{x_I'^2}{H}\delta\Delta\varphi \\ 0 \\ -X'_I\delta\Delta\varphi + X'_I\delta\Delta\varphi \end{bmatrix} \quad (14.b)$$

$$= \begin{bmatrix} \mp\left(H + \frac{x_I'^2}{H}\right)\delta\Delta\varphi \\ 0 \\ 0 \end{bmatrix}$$

$$\delta r_I^m(\delta\Delta\omega, \delta\Delta\varphi, \delta\Delta\kappa) = \begin{bmatrix} \mp\left(H + \frac{x_I'^2}{H}\right)\delta\Delta\varphi \\ \pm H\delta\Delta\omega \pm X'_I\delta\Delta\kappa \\ 0 \end{bmatrix} \quad (15)$$

According to the above bias impact analysis, the total impact of boresight angle variations on the ground coordinates is given by Equation 15. The following conclusions can be drawn based on Equation 15:

1) A bias in the boresight pitch angle ($\delta\Delta\omega$) will impact the coordinates along the flight direction. The impact of this bias on the ground coordinates depends on the platform's flying height and flying direction.
2) A bias in the boresight roll angle ($\delta\Delta\phi$) will impact the coordinates across the flight direction. The impact of this bias on the ground coordinates depends on flying height, flight direction, and lateral distance between the point in question and the flight trajectory.
3) A bias in the boresight heading ($\delta\Delta\kappa$) will impact the coordinates along the flight direction. The impact of such variation on the ground coordinates is flying direction independent (as the impact of the ±signs will be nullified by the sign of the lateral distance $X'_I$ when flying in different directions). The impact increases as the lateral distance between the control/tie feature in question and trajectory increases. For control/tie features that are directly below the flight trajectory (i.e., $x_i$ and X'$_I$≅0), then δr$_I^m$ (δΔκ)=0, which implies that the boresight heading angle cannot be estimated if the control/tie features are aligned along the center of the swath covered by the push-broom scan lines.

Figure 6A:
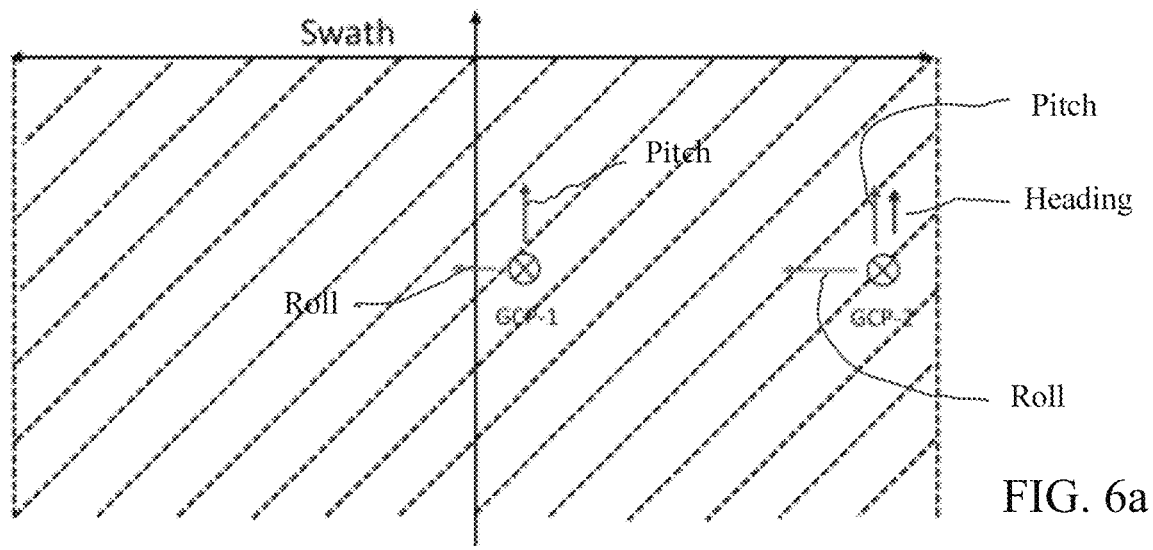
FIG. 6a is a diagram of an optimal/minimal flight path for a GCP-based boresight calibration method according to the present disclosure.

In accordance with the boresight calibration methods disclosed herein, the optimal/minimal configuration of flight lines and control/tie points for the estimation of the boresight angles can thus be summarized as follows:

1) For a ground control point (GCP)-based approach according to the present disclosure, a single flight line and two GCPs are needed, in which one GCP is aligned along the center of the covered swath and the second GCP is aligned along the edge of the covered swath, as illustrated in the diagram of FIG. 6a. (In the figure, the left upward facing arrow corresponds to the impact of a bias in the boresight pitch angle co, the right upward facing arrow corresponds to the impact of a bias in boresight heading angle κ, and the lateral arrow corresponds to the impact of a bias in boresight roll angle ϕ.) The GCP aligned along the swath center will allow for the estimation of the boresight pitch and roll angles (Δω and Δϕ) by minimizing the discrepancies along and across the flight line. The point at the edge of the swath will allow for the estimation of the boresight heading angle (Δκ).

Figure 6B:
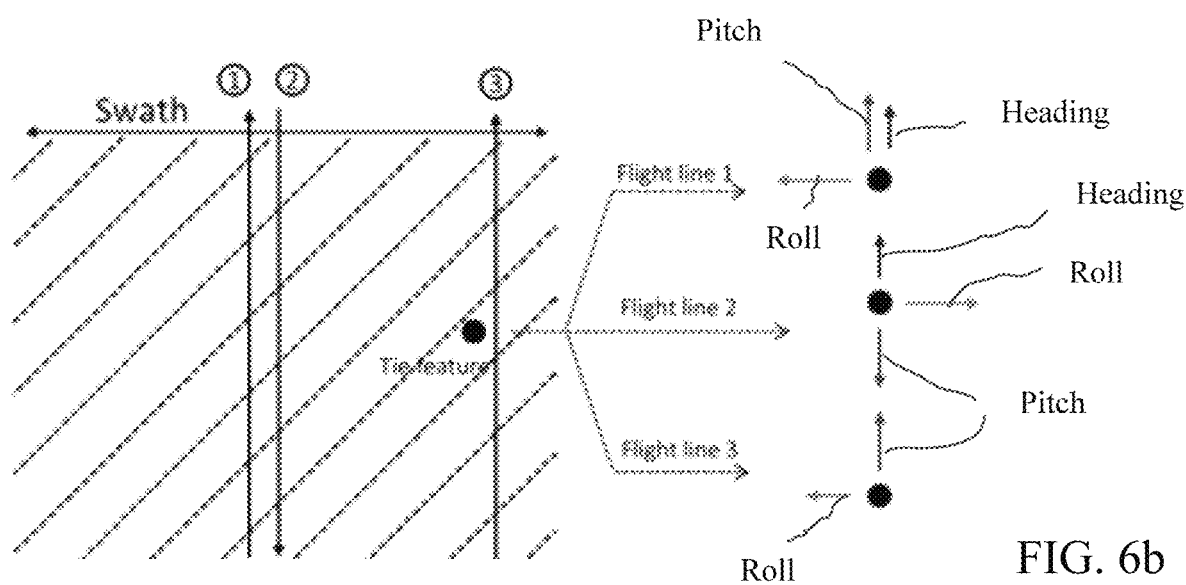
FIG. 6b is a diagram of an optimal/minimal flight path for a tie feature-based boresight calibration method according to the present disclosure.

2) For a tie feature-based approach according to the present disclosure, three flight lines and a single tie feature are needed. Two of the flight lines are in opposite directions and have 100% overlap. The third flight line is parallel to one of the first two with an overlap of roughly 50% with that flight line. The tie point is located along the center of the scan covered by the third flight line as shown in the diagram of FIG. 6b. Enforcing the coplanarity of the light rays associated with the identified tie point in the opposite scans with 100% overlap allows for the estimation of the boresight pitch and roll angles (Δω and Δϕ). It can be noted that the impact of a bias in the boresight heading is flying direction independent, meaning that δΔκ will not impact the coplanarity of the conjugate light rays for those flight lines. On the other hand, enforcing the coplanarity of the light rays associated with the identified tie point in the parallel flight lines with 50% overlap will ensure the estimation of the boresight heading angle (Δκ).

In practice, it can be beneficial to use more GCPs/tie point features to derive an estimate of the evaluated boresight angles while minimizing the impact of random errors in the system measurements as well as improve the ability to detect gross errors in such measurements (i.e., improving the reliability of the adjustment procedure).

Boresight Calibration Methods According to the Present Disclosure

Boresight calibrations methods according to the present disclosure are based on the bias impact analysis described above. The present method further contemplates the application of two rigorous approaches which use GCPs and tie features and which are based on enforcing the collinearity and coplanarity of light rays connecting the perspective centers of the imaging scanner, object point, and the respective image points. It is understood that the data generated by the boresight calibration methods described herein are the boresight angles for push-broom scanner systems, and the boresight angles and lever arm for LiDAR camera systems, or corrections to the nominal pre-determined boresight angle and lever arm for the particular scanner or camera system. The calibration methods disclosed herein can be implemented by software to correct point cloud and global position data generated within or received from the UAV or mobile platform. The GNSS/INS generates global position data based on the nominal scanner/camera parameters (boresight angle and lever arm). The calibration software contemplated in the present disclosure corrects these parameters, either as the data is being generated by the GNSS/INS or in a post-processing procedure using the data received from the UAV or mobile platform. The corrected global positioning data based on the calibration methods described herein can be provided to geospatial analysis software, such as ENVI, ESRI and QGIS, to generate geospatially accurate data.

Thus, in one embodiment, the calibration methods described herein are implemented in post-processing software separate from the UAV or mobile platform that operates on the point cloud and/or global positioning data received from the UAV/mobile platform. The software takes the positioning data, sensor data and calibration files associated with the particular mobile platform and processes that data into positionally corrected, orthorectified datasets in industry standard formats (i.e., formats readable by the geospatial analysis software noted above).

Approximate Boresight Calibration Using Tie Features

In one approach of the present disclosure, boresight calibration for push-broom scanners is conducted in which the boresight angles are estimated by enforcing the intersection of the light rays connecting the perspective centers of the scan lines encompassing the corresponding image points of the tie feature and the respective conjugate image points (i.e., enforcing the coplanarity constraint). To relax the requirement for having almost parallel IMU and scanner coordinate systems, a virtual scanner coordinate system, denoted by c', is introduced that is almost parallel to the original scanner frame, denoted by c. The boresight matrix relating the virtual scanner c' to the IMU body frame $R_{c'}^b$ can be set by the user to represent the nominal relationship between the scanner and IMU body frame coordinate systems. Therefore, the boresight rotation matrix $R_c^b$ can be decomposed into two rotation matrices as $R_c^b = R_{c'}^b R_c^{c'}$, where $R_c^{c'}$ is an unknown incremental boresight rotation matrix that is defined by incremental boresight pitch, roll, and heading angles (Δω, Δϕ, Δκ). Thus, the collinearity equations can be represented by Equation 16:

$$r_I^m = r_b^m(t) + R_b^m(t)r_c^b + \lambda_i R_c^m(t) R_c^d r_i^c \qquad (16)$$

where $R_{c'}^m(t) = R_c^b(t) R_{c'}^b$.

Another assumption that can be relaxed related to having a push-broom scanner, is that the UAV is flown along the South-to-North and North-to-South directions. In cases where the flight lines do not adhere to this assumption, the trajectory position and orientation matrices $r_b^m(t)$ and $R_c^b(t)$ can be manipulated so that they are defined relative to a mapping frame that is parallel to the flight directions. After such manipulation, the rotation matrix $R_{c'}^m(t)$ will take the form in Equation 2a above. It can be noted that the decomposition of the boresight matrix also eliminates the need for having the IMU body frame axes aligned along the starboard, forward, and up directions since the calibration proceeds with $R_{c\alpha}^m(t)$ rather than $R_c^b(t)$.

The present method retains the strict requirements for the scanner to be almost vertical over a relatively flat terrain. For an identified tie point in multiple flight lines, the derived ground coordinates using the nominal values for the boresight angles (i.e., assuming $\Delta\omega$, $\Delta\phi$, $\Delta\kappa$ to be zeros) can be derived according to Equation 17, below. So, for a tie point in overlapping scenes, the difference between the estimated ground coordinates from the respective flight lines, denoted as a and b, can be represented by Equation 18, below, where $X'_a$ and $X'_b$ represent the lateral distance between the corresponding object point and the a and b flight trajectories If a tie feature is captured in n image strips, one of them is regarded as a reference and the remaining (n−1) occurrences are paired with the n image strip to produce (n−1) set of equations of the form in Equation 18. Using a flight and tie point configuration that meets the stated layout in FIG. 6b above yields four equations of the form of Equation 18 from the formulated pairs in three unknowns. (The Z-difference between the projected points will not be used as they are not related to biases in the incremental boresight angles). Thus, these equations can be used in least squares adjustment (LSA) to solve for biases in the boresight angles $\delta\Delta\omega$, $\delta\Delta\phi$, and $\delta\Delta\kappa$. Since this approach estimates biases in the boresight angles, the boresight angles defining the matrix $R_c^{c'}$ will be $-\delta\Delta\omega$, $-\delta\Delta\phi$, $-\delta\Delta\kappa$. Finally, the boresight rotation matrix $R_c^b$ is derived by multiplying the nominal boresight rotation matrix $R_c^b$, and the incremental boresight matrix $R_c^{c'}$, which is defined by ($-\delta\Delta\omega$, $-\delta\Delta\phi$, and $-\delta\Delta\kappa$). This calibrated boresight rotation matrix $R_c^b$ is used to adjust the geospatial position information acquired by the mobile platform or UAV to correct for offsets in the boresight angles from the pre-determined nominal boresight parameters.

$$r_I^m(\text{estimated}) = r_I^m(\text{true}) + \delta r_I^m(\delta\Delta\omega, \delta\Delta\varphi, \delta\Delta\kappa) \quad (17)$$

$$= r_I^m(\text{true}) + \begin{bmatrix} \mp\left(H + \frac{x_I'^2}{H}\right)\delta\Delta\varphi \\ \pm H\delta\Delta\omega \pm X'_I\delta\Delta\kappa \\ 0 \end{bmatrix}$$

$$r_I^m(a, \text{estimated}) - r_I^m(b, \text{estimated}) = \quad (18)$$

$$\begin{bmatrix} \mp\left(H + \frac{x_I'^2}{H}\right)\delta\Delta\varphi \\ \pm H\delta\Delta\omega \pm X_a'\delta\Delta\kappa \\ 0 \end{bmatrix} - \begin{bmatrix} \mp(H + ?)\delta\Delta\varphi \\ \pm H\delta\Delta\omega \pm X_b'\delta\Delta\kappa \\ 0 \end{bmatrix}.$$

Rigorous Boresight Calibration Using GCPs

In accordance with a further aspect of the present disclosure, a rigorous boresight calibration procedure that uses identified GCPs in the acquired push-broom hyperspectral scenes is based on a reformulated collinearity equation model where the image coordinates are represented as a function of the GNSS/INS position and orientation, ground coordinates of the GCP, lever arm components, and the boresight angles as represented by Equation 19 below. To avoid running into a gimbal lock problem (i.e., the secondary rotation angle of $R_c^b$ is 90°), the boresight matrix $R_c^b$ is decomposed into the product of two rotation matrices $R_{c'}^b$, and $R_c^{c'}$ where c' represents a virtual scanner. Similar to the approximate approach described above, the virtual scanner coordinate system c' is set up to be almost parallel to the original scanner coordinate system c. In such a case, $R_{c'}^b$, will be a known rotation matrix that depends on the alignment of the scanner relative to the IMU body frame and $R_c^{c'}$ will be defined by the unknown incremental rotation in Equation 2b above. Therefore, Equation 19 can be reformulated to the form of Equation 20, which can be simplified into Equation 21, below, that defines the vector if from the scanner perspective center PC to the image point i (see FIG. 1). It can be noted that $[N_X N_Y D]^T$ in Equation 21 is fully defined by the measured image coordinates, internal characteristics of the scanner, GNSS/INS position and orientation information, lever arm components, and nominal boresight matrix $R_{c'}^b$. To eliminate the unknown scale factor $\lambda_i$ from Equation 21, the first and second rows can be divided by the third row to produce Equations 22a, 22b, which is nonlinear in the unknown boresight angles ($\Delta\omega$, $\Delta\phi$, $\Delta\kappa$). Adopting a similar approach to the direct linear transformation of Equation 21, this nonlinear relationship can be re-expressed in a linear form as per Equations 23a, 23b, below. For each image point corresponding to a given GCP, two equations in three unknowns can be derived. Having a minimal flight path configuration similar to the one represented by FIG. 6a, four equations can be formulated and used to solve for the incremental boresight angles defining $R_c^{c'}$, which could be used to derive the boresight matrix $R_c^b$ as the product of $R_{c'}^b$, and $R_c^{c'}$. This calibrated boresight rotation matrix $R_c^b$ is used to adjust the geospatial position information acquired by the mobile platform or UAV to correct for offsets in the boresight angles from the pre-determined nominal boresight parameters.

$$r_i^c = 1/\lambda_i R_b^c \{R_m^b(t)[r_I^m - r_b^m(t)] - r_c^b\} \quad (19)$$

$$r_i^c = 1/\lambda_i R_{c'}^c R_c^{c'} \{R_m^b(t)[r_I^m - r_b^m(t)] - r_c^b\} \quad (20)$$

$$r_i^c = 1/\lambda_i \begin{bmatrix} 1 & -\Delta\kappa & \Delta\varphi \\ \Delta\kappa & 1 & -\Delta\omega \\ -\Delta\varphi & \Delta\omega & 1 \end{bmatrix} \begin{bmatrix} N_x \\ N_y \\ D \end{bmatrix} \quad (21)$$

where $\begin{bmatrix} N_x \\ N_y \\ D \end{bmatrix} = R_c^{c'}\{R_m^b(t)[r_I^m - r_b^m(t)] - r_c^b\}$ $$\frac{x_i}{-f} = \frac{N_x - N_y\Delta\kappa + D\Delta\varphi}{-N_x\Delta\varphi + N_y\Delta\omega + D} \quad (22.a)$$

$$\frac{y_i}{-f} = \frac{N_x\Delta\kappa + N_y - D\Delta\omega}{-N_x\Delta\varphi + N_y\Delta\omega + D} \quad (22.b)$$

$$x_i(-N_x\Delta\varphi + N_y\Delta\omega + D) = -f(N_x - N_y\Delta\kappa + D\Delta\varphi) \quad (23.a)$$

$$x_i(-N_x\Delta\varphi + N_y\Delta\omega + D) = -f(N_x\Delta\kappa + N_y - D\Delta\omega). \quad (23.b)$$

Rigorous Boresight Calibration Using Tie Features

Rather than using GCPs, tie features in the push-broom scanner scenes can be used to estimate the boresight angles. As stated earlier, the boresight angles are estimated by enforcing the coplanarity constraint relating conjugate features in overlapping push-broom hyperspectral scenes. Similar to the previous approach, situations leading to a gimbal lock are mitigated by introducing a virtual scanner c' that is almost parallel to the original scanner and using a known nominal boresight rotation matrix $R_{c'}^b$, relating the IMU body frame and the virtual scanner coordinate systems. Therefore, the unknown boresight angles would be the incremental angles ($\Delta\omega$, $\Delta\phi$, $\Delta\kappa$) defining $R_c^{c'}$. Equations 22a, 22b represent the mathematical model, where both the incremental boresight angles ($\Delta\omega$, $\Delta\phi$, $\Delta\kappa$) and the ground coordinates of the tie features $r_I^m$ are unknowns. An iterative LSA procedure is used starting from approximate values of the unknowns. For the incremental boresight angles, $\Delta\omega$, $\Delta\phi$, and $\Delta\kappa$ can be assumed to be zeros. The approximate values for the ground coordinates of the tie features can be derived using Equation 16 above, while assuming vertical imagery over relatively flat terrain. In this case the scale factor can be approximated by the ratio between the flying height above ground and the scanner principal distance, i.e., $$\lambda_l = \frac{H}{f}$$

With the optimal/minimal flight and tie point configuration illustrated in FIG. 6b, there will be six equations in six unknowns; namely the incremental boresight angles and the ground coordinates of the tie feature in question. Similar to the previous calibration strategies, the boresight rotation matrix $R_c^b$ is derived by multiplying the nominal boresight rotation matrix $R_{c'}^b$ and the incremental boresight matrix $R_c^{c'}$.

Experimental Results

In one test, hyperspectral data was acquired using a Headwall nanohyperspec push-broom scanner shown in FIG. 7a. This sensor covers 272 spectral bands ranging between 400 and 1000 nm with a band width of 2.2 nm. Each scan line contains 640 pixels with a pixel pitch of 7.4 μm. The focal length of the used nanohyperspec push-broom scanner was 12.7 mm, which corresponds to roughly 3.5 cm GSD when flying at 60 m above ground. A Trimble APX-15 UAV (V2), shown in FIG. 7b, is integrated with the nanohyperspec to directly provide the position and orientation of the scanner. The APX unit, fitted in a housing to accommodate a wiring harness, is attached to the nanohyperspec via threaded fasteners, as shown in FIG. 7c. A POSPac MMS differential GNSS inertial post-processing software from Applanix was used for post processing of the raw GNSS/IMU data. After post processing of the integrated GNSS/IMU data, the accuracy of position and orientation estimation was expected to be around 2-5 cm for position, 0.025° for pitch and roll angles, and 0.080° for the heading angle.

Figure 9:
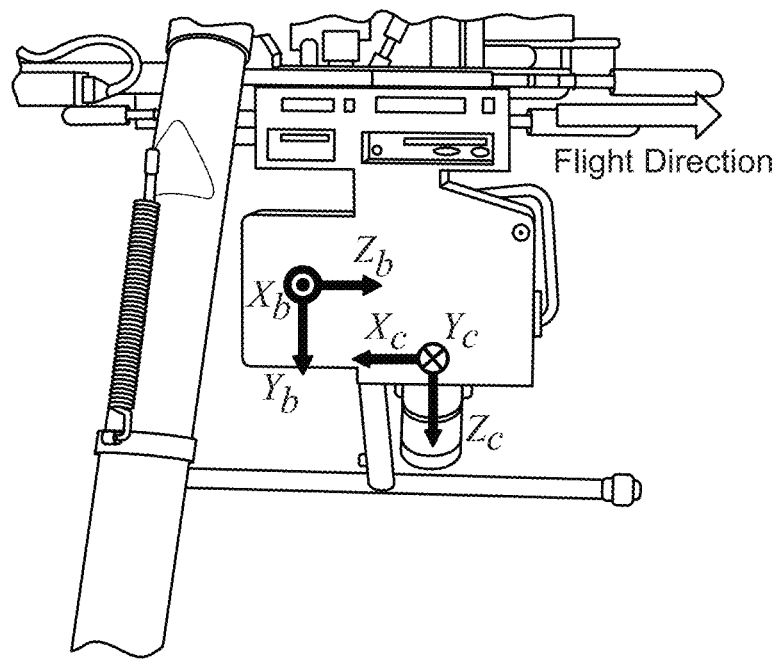
FIG. 9 is picture of a UAV with the UAV and scanner coordinate systems superimposed on the image.

In the tests, two different unmanned aerial platforms from Dá-Jiäng Innovations (DJI) were used to acquire the hyperspectral data. The first platform was the Spreading Wings S1000+ shown in FIG. 8a, and the second was the Matrice 600 Pro (M600) shown in FIG. 8b. These two platforms are designed for professional aerial photography and industrial applications. Unlike the M600, the S1000+ did not use a standard DJI A2 flight controller. Instead, an open-source Pixhawk 2 flight controller was installed. For integrating the nanohyperspec with the airframes, two methods were used. The S1000+, the nanohyperspec was rigidly mounted directly to the airframe. However, a DJI Ronin MX three-axis brushless gimbal stabilizer, shown in FIG. 8c, was used on the larger M600 airframe. By using the gimbal, the sensor maintains a nadir view regardless of airframe orientation. This capability produced clearer scenes for identifying the required control/tie features for the different boresight calibration strategies. FIG. 9 shows the coordinate systems definition for the push-broom scanner and IMU systems mounted on S1000+ and M600, such that the nominal boresight matrix relating the IMU and virtual scanner coordinate systems ($R_{cb}^{c'}$) can be defined as $R_Z(-90) R_Y(0) R_X(90)$. The IMU body frame is not setup with its xyz-axes aligned along the starboard, forward, and up directions, respectively.

Figure 10:
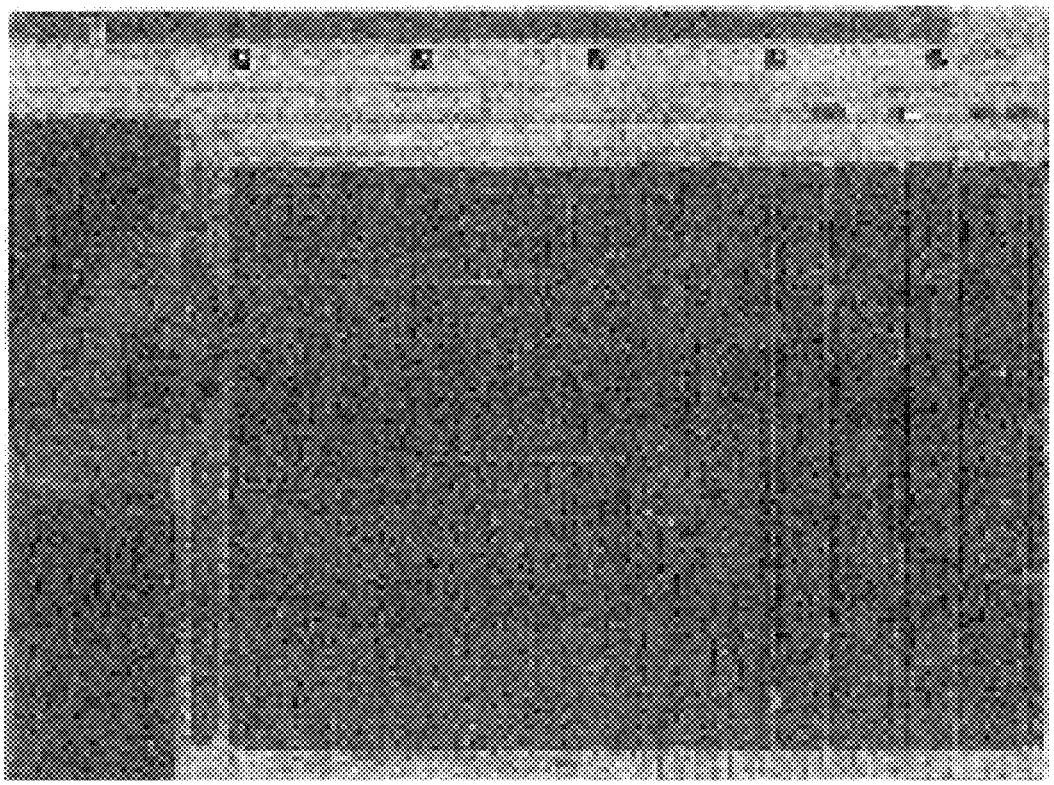
FIG. 10 is an overhead picture of a field used in testing the boresight calibration methods disclosed herein.

Six dataset were acquired in this test in which the experimental location was an agricultural test field as shown in FIG. 10. The field included five checkerboard targets, which were used as either tie features or GCPs. The ground coordinates of all the checkerboard targets were surveyed by a Topcon GR-5 GNSS receiver. The checkerboard targets were identified in the original hyperspectral scenes and the image point measured using Envi 4.5.4 software. Table I describes the collection date, platform used, and altitude/ground speed for each flight.

TABLE I

FLIGHT SPECIFICATIONS OF THE COLLECTED DATASETS

| Collection Date | UAV | Gimbal stabilizer | Altitude | Speed |
|---|---|---|---|---|
| July 12th, 13th, 18th, and 25th | S1000 + M600 | No | 60 m | 5 m/s |
| July 30th and August 1st | | Yes | | |

Figure 11:
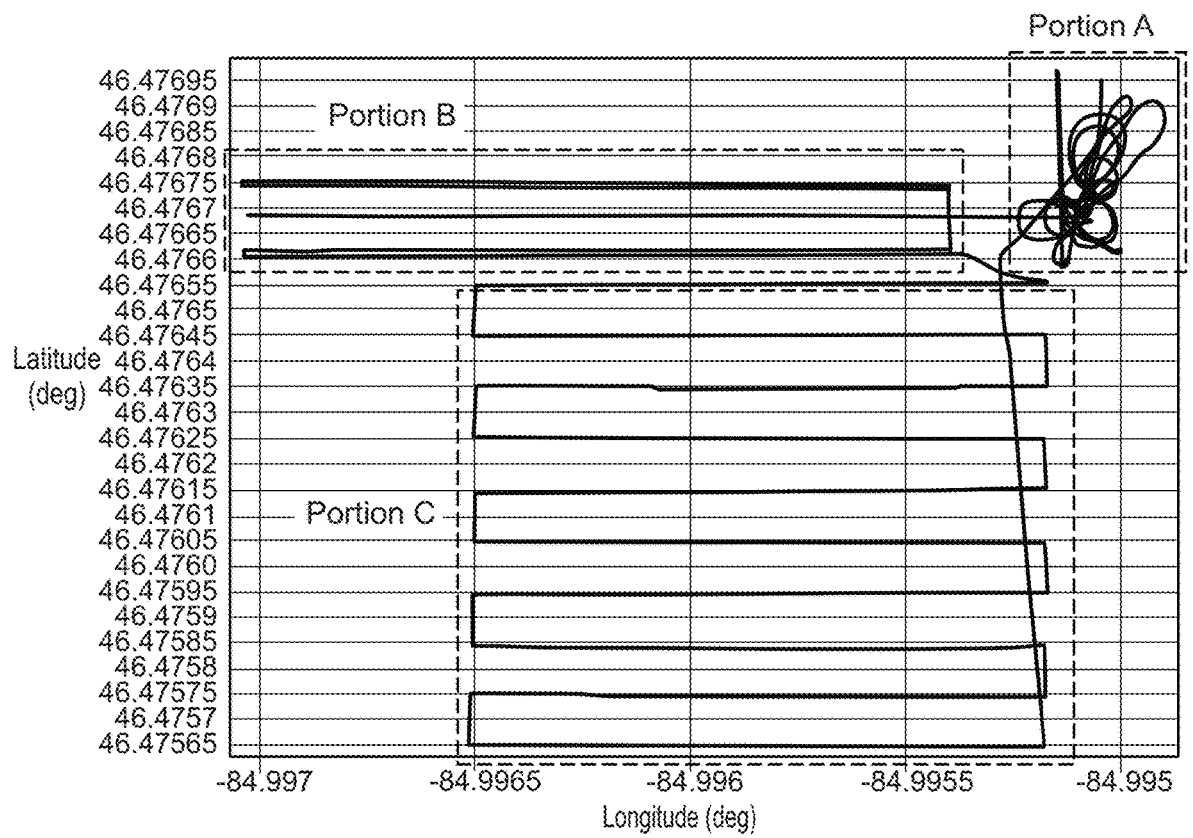
FIG. 11 is a plan view of a flight trajectory for test flights implementing the boresight calibration methods disclosed herein.

FIG. 11 shows a top view of the flight trajectory for a first dataset with three highlighted segments. Portion A in the figure includes the UAV trajectory while performing required GNSS/IMU dynamic alignment before and after the flight mission. Portion B depicts the flight lines used for boresight calibration over the checkerboard targets. Calibration flight lines are oriented in the East-West direction (contrary to the South-North assumption) with two overlapping flight lines in opposite directions over the targets, two flight lines 7 m north of the targets, and two flight lines 7 m south of the targets. The nanohyperspec unit collected data in Portion C, which data was used to qualitatively evaluate the performance of the boresight calibration through the generated orthorectified mosaics over the field.

Figures 12A, 12B:
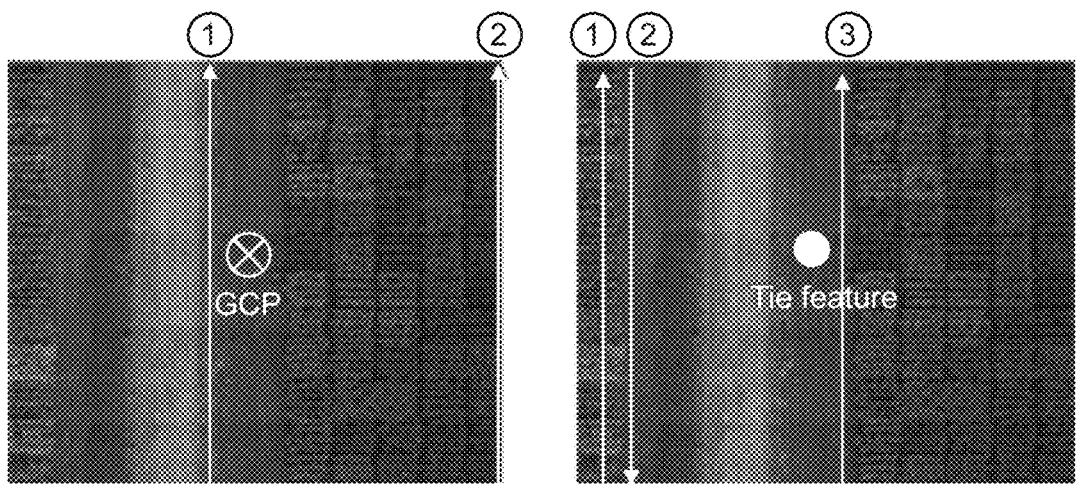
FIG. 12a is a plan view of a test field with an optimal/minimal flight path for the GCP-based boresight calibration method according to the present disclosure.
FIG. 12b is a plan view of a test field with an optimal/minimal flight path for a tie feature-based boresight calibration method according to the present disclosure.
Figure 13A:
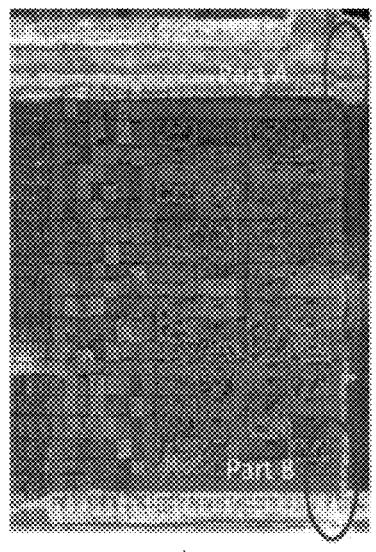
FIGS. 13a-d are overhead views of an orthorectified mosaics of one test field based on a first test dataset comparing the use of nominal boresight angles and the use of the tie feature-based calibration process disclosed herein.
Figure 13B:
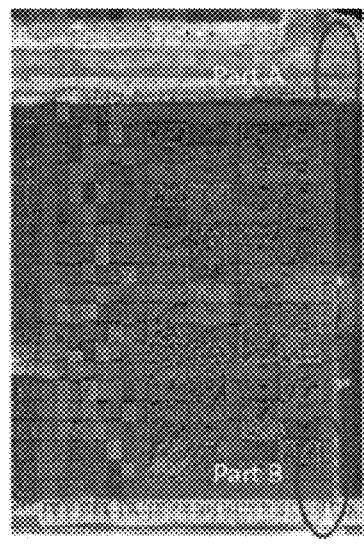
Figure 13C:
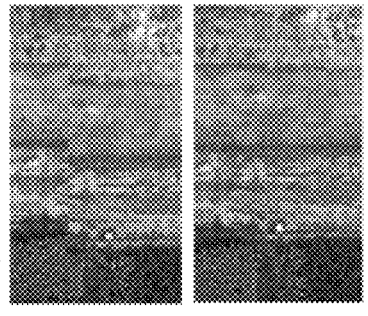
Figure 13D:
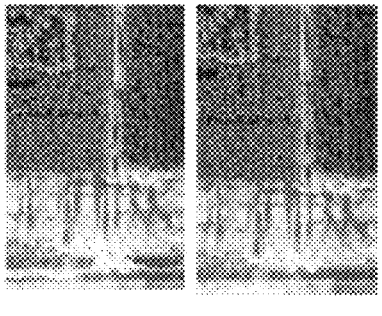
Figure 14A:
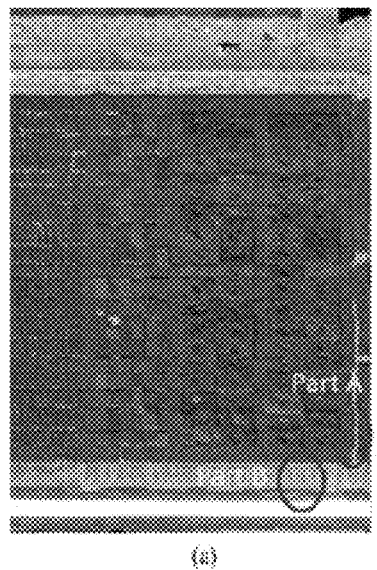
FIG. 14 a-d are overhead views of an orthorectified mosaics of one test field based on a second test dataset comparing the use of nominal boresight angles and the use of the tie feature-based calibration process disclosed herein.
Figure 14B:
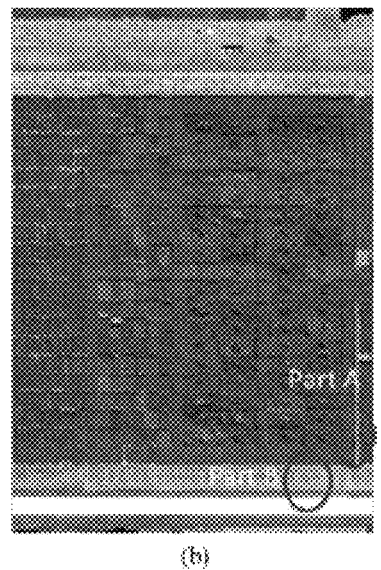
Figure 14C:
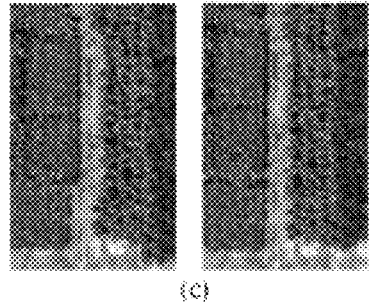
Figure 14D:
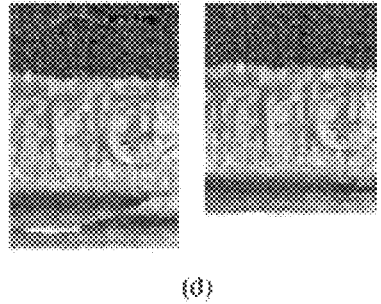
Figure 15A:
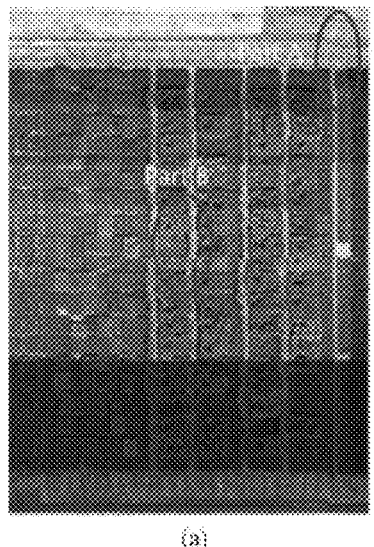
FIG. 15 a-d are overhead views of an orthorectified mosaics of one test field based on a third test dataset comparing the use of nominal boresight angles and the use of the tie feature-based calibration process disclosed herein.
Figure 15B:
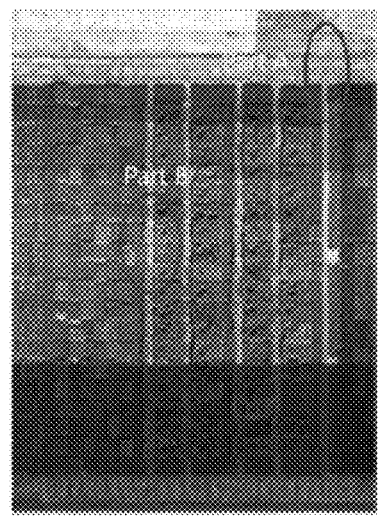
Figure 15C:
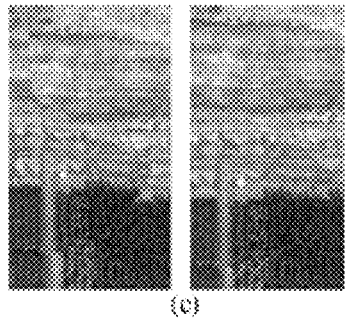
Figure 15D:
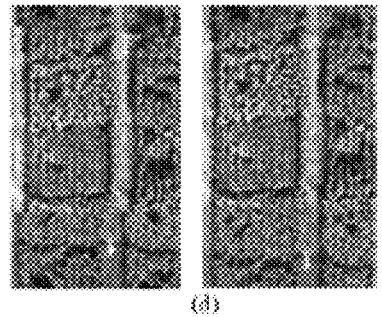

The GCP-based and tie-feature-based rigorous calibration procedures described above were used with the configurations shown in FIG. 12, which are derived from the first dataset. Since the field incorporated only collinear control targets, instead of using a single flight line and two control points for the GCP-based rigorous approach (as contemplated in FIG. 6a), a single GCP and two flight lines separated by a lateral distance were used. Tables II and III below report the estimated boresight angles together with the associated correlation matrix for both approaches. The data in Table II demonstrates the bias impact for boresight angles determined according to the methods disclosed herein. In accordance with the methods, the boresight angles "Rigorous—GCP" and "Rigorous—Tie Features" can be substituted for or used to correct the nominal boresight angle values used to generate the geospatial position data, to thereby correct for actual offsets in the boresight from is nominal orientation.

TABLE II

NORMAL AND ESTIMATED BORESIGHT ANGLES FROM THE GCP-BASED AND TIE-FEATURE-BASED RIGOROUS CALIBRATION STRATEGIES FOR THE OPTIMAL/MINIMAL FLIGT AND CONTROL/TIE POINT CONFIGURATION IN FIG. 12

| Aproach | $\omega(°)$ | $\phi(°)$ | $\kappa(°)$ |
|---|---|---|---|
| Nominal value | 90 | 0 | −90 |
| Rigorous-GCP | 90.253 ± 0.063 | 0.524 ± 0.069 | −90.389 ± 0.869 |
| Rigorous-Tie Features | 90.260 | 0.469 | −90.179 |

TABLE III

CORRELATED MATRIX FOR THE ESTIMATED BORESIGHT ANGLES USING (A) A GCP-BASED AND (B) A TIE-FEATURE-BASED RIGOROUS CALIBRATION STRATEGIES FOR THE OPTIMAL/MINIMAL FLIGHT AND CONTROL/TIE POINT CONFIGURATION IN FIG. 12

| | (a) | | | | (b) | | |
|---|---|---|---|---|---|---|---|
| | $\Delta\omega$ | $\Delta\varphi$ | $\Delta\kappa$ | | $\Delta\omega$ | $\Delta\varphi$ | $\Delta\kappa$ |
| $\Delta\omega$ | 1.000 | −0.025 | 0.064 | $\Delta\omega$ | 1.000 | −0.240 | 0.082 |
| $\Delta\varphi$ | −0.025 | 1.000 | −0.393 | $\Delta\varphi$ | −0.240 | 1.000 | −0.094 |
| $\Delta\kappa$ | 0.064 | −0.393 | 1.000 | $\Delta\kappa$ | 0.082 | −0.094 | 1.000 |

The GCP-based rigorous calibration strategy contemplates four equations in three unknowns (the incremental boresight angles), so an estimate for the standard deviation of the estimated parameters can be derived. For the tie feature-based rigorous calibration, on the other hand, there are six equations in six unknowns (the incremental boresight angles and the ground coordinates of the tie point). For this calibration approach, the minimal configuration cannot provide an estimate for the standard deviation of the derived boresight angles. As reflected in Table II above, the standard deviation of the boresight heading angle for the GCP-based rigorous calibration is significantly higher when compared to those for the boresight pitch and roll angles. This is mainly attributed to the relatively small lateral distance (7 m) between the GCP and the flight trajectory, which lateral distance is crucial for the estimation of the boresight heading angle. Based on the reported results (especially the correlation matrices which show a low correlation among the estimated boresight angles), it can be seen that the minimal flight path configuration is capable of deriving an estimate of the boresight angles.

The initial nominal values for the boresight angles and the estimated values along with their standard deviations from the three proposed calibration strategies, while using the six calibration flights and five targets as GCPs/tie features, are presented in Table IV, below, which show that the boresight calibration results from the GCP-based rigorous and tie-feature-based rigorous approaches are almost identical. This similarity should be expected since these approaches adopt the rigorous collinearity equations without incurring any assumptions. For the approximate strategy, on the other hand, the reported standard deviations for the estimated boresight angles are larger than those for the rigorous approaches. The correlation matrices for the estimated boresight angles from the different strategies/dates are presented in Tables V-X. Such correlation matrices indicate that none of the parameters are highly correlated, which verifies the validity of the suggested optimal calibration configuration.

TABLE IV

NORMAL AND ESTIMATED BORESIGHT ANGLES FROM THE APPROXIMATE GCP-BASED RIGOROUS AND TIE-FEATURE-BASED RIGOROUS CALIBRATION STRATEGIES

| Collection Date | Approach | $\omega(°)$ | $\varphi(°)$ | $\kappa(°)$ |
|---|---|---|---|---|
| | Nominal value | 90 | 0 | −90 |
| July 12th, 2017 | Approximate-Tie Features | 90.208 ± 0.024 | 0.637 ± 0.024 | −92.093 ± 0.425 |
| | Rigorous-GCP | 90.284 ± 0.018 | 0.545 ± 0.018 | −91.169 ± 0.206 |
| | Rigorous-Tie Features | 90.244 ± 0.017 | 0.549 ± 0.024 | −91.329 ± 0.256 |
| July 15th, 2017 | Approximate-Tie Features | 90.214 ± 0.025 | 0.488 ± 0.021 | −91.146 ± 0.487 |
| | Rigorous-GCP | 90.262 ± 0.013 | 0.527 ± 0.013 | −90.212 ± 0.118 |
| | Rigorous-Tie Features | 90.259 ± 0.012 | 0.522 ± 0.014 | −90.218 ± 0.110 |
| July 18th, 20117 | Approximate-Tie Features | 90.262 ± 0.027 | 0.533 ± 0.026 | −88.570 ± 0.429 |
| | Rigorous-GCP | 90.209 ± 0.026 | 0.498 ± 0.027 | −90.468 ± 0.225 |
| | Rigorous-Tie Features | 90.206 ± 0.022 | 0.502 ± 0.025 | −90.641 ± 0.181 |
| July 25th, 2017 | Approximate-Tie Features | 90.273 ± 0.037 | 0.512 ± 0.023 | −89.939 ± 0.456 |
| | Rigorous-GCP | 90.251 ± 0.019 | 0.511 ± 0.019 | −90.386 ± 0.194 |
| | Rigorous-Tie Features | 90.232 ± 0.019 | 0.508 ± 0.022 | −90.337 ± 0.193 |
| July 30th, 2017 | Approximate-Tie Features | 90.268 ± 0.014 | 0.495 ± 0.012 | −89.972 ± 0.255 |
| | Rigorous-GCP | 90.270 ± 0.012 | 0.512 ± 0.012 | −90.429 ± 0.114 |
| | Rigorous-Tie Features | 90.277 ± 0.010 | 0.500 ± 0.010 | −90.366 ± 0.105 |
| August 1st, 2017 | Approximate-Tie Features | 90.236 ± 0.013 | 0.489 ± 0.013 | −90.820 ± 0.285 |
| | Rigorous-GCP | 90.271 ± 0.011 | 0.492 ± 0.011 | −90.510 ± 0.107 |
| | Rigorous-Tie Features | 90.259 ± 0.013 | 0.493 ± 0.014 | −90.485 ± 0.115 |

TABLE IV

NORMAL AND ESTIMATED BORESIGHT ANGLES FROM THE APPROXIMATE GCP-BASED RIGOROUS AND TIE-FEATURE-BASED RIGOROUS CALIBRATION STRATEGIES

| Collection Date | Approach<br>Nominal value | $\omega(°)$<br>90 | $\varphi(°)$<br>0 | $\kappa(°)$<br>−90 |
|---|---|---|---|---|
| July 12th, 2017 | Approximate-Tie Features | 90.208 ± 0.024 | 0.637 ± 0.024 | −92.093 ± 0.425 |
| | Rigorous-GCP | 90.284 ± 0.018 | 0.545 ± 0.018 | −91.169 ± 0.206 |
| | Rigorous-Tie Features | 90.244 ± 0.017 | 0.549 ± 0.024 | −91.329 ± 0.256 |
| July 15th, 2017 | Approximate-Tie Features | 90.214 ± 0.025 | 0.488 ± 0.021 | −91.146 ± 0.487 |
| | Rigorous-GCP | 90.262 ± 0.013 | 0.527 ± 0.013 | −90.212 ± 0.118 |
| | Rigorous-Tie Features | 90.259 ± 0.012 | 0.522 ± 0.014 | −90.218 ± 0.110 |
| July 18th, 2017 | Approximate-Tie Features | 90.262 ± 0.027 | 0.533 ± 0.026 | −88.570 ± 0.429 |
| | Rigorous-GCP | 90.209 ± 0.026 | 0.498 ± 0.027 | −90.468 ± 0.225 |
| | Rigorous-Tie Features | 90.206 ± 0.022 | 0.502 ± 0.025 | −90.641 ± 0.181 |
| July 25th, 2017 | Approximate-Tie Features | 90.273 ± 0.037 | 0.512 ± 0.023 | −89.939 ± 0.456 |
| | Rigorous-GCP | 90.251 ± 0.019 | 0.511 ± 0.019 | −90.386 ± 0.194 |
| | Rigorous-Tie Features | 90.232 ± 0.019 | 0.508 ± 0.022 | −90.337 ± 0.193 |
| July 30th, 2017 | Approximate-Tie Features | 90.268 ± 0.014 | 0.495 ± 0.012 | −89.972 ± 0.255 |
| | Rigorous-GCP | 90.270 ± 0.012 | 0.512 ± 0.012 | −90.429 ± 0.114 |
| | Rigorous-Tie Features | 90.277 ± 0.010 | 0.500 ± 0.010 | −90.366 ± 0.105 |
| August 1st, 2017 | Approximate-Tie Features | 90.236 ± 0.013 | 0.489 ± 0.013 | −90.820 ± 0.285 |
| | Rigorous-GCP | 90.271 ± 0.011 | 0.492 ± 0.011 | −90.510 ± 0.107 |
| | Rigorous-Tie Features | 90.259 ± 0.013 | 0.493 ± 0.014 | −90.485 ± 0.115 |

TABLE V

CORRELATION MATRIX OF BORESIGHT ANGLES ESTIMATES FOR JULY 12TH DATASET(A) APPROXIMATE, (B) GCP-BASED RIGOROUS, AND (C) TIE-FEATURE-BASED RIGOROUS CALIBRATION STRATEGIES

| | (a) | | | | (b) | | | | (c) | | |
|---|---|---|---|---|---|---|---|---|---|---|---|
| | $\Delta\omega$ | $\Delta\varphi$ | $\Delta\kappa$ | | $\Delta\omega$ | $\Delta\varphi$ | $\Delta\kappa$ | | $\Delta\omega$ | $\Delta\varphi$ | $\Delta\kappa$ |
| $\Delta\omega$ | 1.000 | 0.000 | −0.121 | $\Delta\omega$ | 1.000 | 0.004 | 0.056 | $\Delta\omega$ | 1.000 | −0.050 | 0.094 |
| $\Delta\varphi$ | 0.000 | 1.000 | 0.000 | $\Delta\varphi$ | 0.004 | 1.000 | 0.072 | $\Delta\varphi$ | −0.050 | 1.000 | 0.001 |
| $\Delta\kappa$ | −0.121 | 0.000 | 1.000 | $\Delta\kappa$ | 0.056 | 0.072 | 1.000 | $\Delta\kappa$ | 0.094 | 0.001 | 1.000 |

TABLE VI

CORRELATION MATRIX OF BORESIGHT ANGLES ESTIMATES FOR JULY 15TH DATASET (A) APPROXIMATE, (B) GCP-BASED RIGOROUS, AND (C) TIE-FEATURE-BASED RIGOROUS CALIBRATION STRATEGIES

| | (a) | | | | (b) | | | | (c) | | |
|---|---|---|---|---|---|---|---|---|---|---|---|
| | $\Delta\omega$ | $\Delta\varphi$ | $\Delta\kappa$ | | $\Delta\omega$ | $\Delta\varphi$ | $\Delta\kappa$ | | $\Delta\omega$ | $\Delta\varphi$ | $\Delta\kappa$ |
| $\Delta\omega$ | 1.000 | 0.000 | 0.472 | $\Delta\omega$ | 1.000 | −0.002 | 0.040 | $\Delta\omega$ | 1.000 | 0.004 | 0.042 |
| $\Delta\varphi$ | 0.000 | 1.000 | 0.000 | $\Delta\varphi$ | −0.002 | 1.000 | −0.037 | $\Delta\varphi$ | 0.004 | 1.000 | −0.087 |
| $\Delta\kappa$ | 0.472 | 0.000 | 1.000 | $\Delta\kappa$ | 0.040 | −0.037 | 1.000 | $\Delta\kappa$ | 0.042 | −0.087 | 1.000 |

TABLE VII

CORRELATION MATRIX OF BORESIGHT ANGLES ESTIMATES FOR JULY 18TH DATASET (A) APPROXIMATE, (B) GCP-BASED RIGOROUS, AND (C) TIE-FEATURE-BASED RIGOROUS CALIBRATION STRATEGIES

| | (a) | | | | (b) | | | | (c) | | |
|---|---|---|---|---|---|---|---|---|---|---|---|
| | $\Delta\omega$ | $\Delta\varphi$ | $\Delta\kappa$ | | $\Delta\omega$ | $\Delta\varphi$ | $\Delta\kappa$ | | $\Delta\omega$ | $\Delta\varphi$ | $\Delta\kappa$ |
| $\Delta\omega$ | 1.000 | 0.000 | 0.240 | $\Delta\omega$ | 1.000 | −0.002 | 0.031 | $\Delta\omega$ | 1.000 | −0.014 | 0.063 |
| $\Delta\varphi$ | 0.000 | 1.000 | 0.000 | $\Delta\varphi$ | 0.002 | 1.000 | −0.058 | $\Delta\varphi$ | −0.014 | 1.000 | −0.078 |
| $\Delta\kappa$ | 0.240 | 0.000 | 1.000 | $\Delta\kappa$ | 0.031 | −0.056 | 1.000 | $\Delta\kappa$ | 0.063 | −0.078 | 1.000 |

TABLE VIII

CORRELATION MATRIX OF BORESIGHT ANGLES ESTIMATES FOR JULY 29TH DATASET (A) APPROXIMATE, (B) GCP-BASED RIGOROUS, AND (C) TIE-FEATURE-BASED RIGOROUS CALIBRATION STRATEGIES

| | (a) | | | | (b) | | | | (c) | | |
|---|---|---|---|---|---|---|---|---|---|---|---|
| | $\Delta\omega$ | $\Delta\varphi$ | $\Delta\kappa$ | | $\Delta\omega$ | $\Delta\varphi$ | $\Delta\kappa$ | | $\Delta\omega$ | $\Delta\varphi$ | $\Delta\kappa$ |
| $\Delta\omega$ | 1.000 | 0.000 | 0.589 | $\Delta\omega$ | 1.000 | 0.005 | 0.043 | $\Delta\omega$ | 1.000 | −0.049 | 0.047 |
| $\Delta\varphi$ | 0.000 | 1.000 | 0.000 | $\Delta\varphi$ | 0.005 | 1.000 | 0.126 | $\Delta\varphi$ | −0.049 | 1.000 | 0.141 |
| $\Delta\kappa$ | 0.589 | 0.000 | 1.000 | $\Delta\kappa$ | 0.043 | 0.126 | 1.000 | $\Delta\kappa$ | 0.047 | −0.141 | 1.000 |

TABLE IX

CORRELATION MATRIX OF BORESIGHT ANGLES ESTIMATES FOR JULY 30TH DATASET (A) APPROXIMATE, (B) GCP-BASED RIGOROUS, AND (C) TIE-FEATURE-BASED RIGOROUS CALIBRATION STRATEGIES

| | (a) | | | | (b) | | | | (c) | | |
|---|---|---|---|---|---|---|---|---|---|---|---|
| | $\Delta\omega$ | $\Delta\varphi$ | $\Delta\kappa$ | | $\Delta\omega$ | $\Delta\varphi$ | $\Delta\kappa$ | | $\Delta\omega$ | $\Delta\varphi$ | $\Delta\kappa$ |
| $\Delta\omega$ | 1.000 | 0.000 | 0.485 | $\Delta\omega$ | 1.000 | 0.005 | 0.045 | $\Delta\omega$ | 1.000 | −0.008 | 0.046 |
| $\Delta\varphi$ | 0.000 | 1.000 | 0.000 | $\Delta\varphi$ | 0.005 | 1.000 | −0.006 | $\Delta\varphi$ | −0.008 | 1.000 | 0.010 |
| $\Delta\kappa$ | 0.485 | 0.000 | 1.000 | $\Delta\kappa$ | 0.045 | −0.005 | 1.000 | $\Delta\kappa$ | 0.045 | 0.000 | 1.000 |

TABLE X

CORRELATION MATRIX OF BORESIGHT ANGLES ESTIMATES FOR AUGUST 1ST DATASET (A) APPROXIMATE, (B) GCP-BASED RIGOROUS, AND (C) TIE-FEATURE-BASED RIGOROUS CALIBRATION STRATEGIES

| | (a) | | | | (b) | | | | (c) | | |
|---|---|---|---|---|---|---|---|---|---|---|---|
| | $\Delta\omega$ | $\Delta\varphi$ | $\Delta\kappa$ | | $\Delta\omega$ | $\Delta\varphi$ | $\Delta\kappa$ | | $\Delta\omega$ | $\Delta\varphi$ | $\Delta\kappa$ |
| $\Delta\omega$ | 1.000 | 0.000 | 0.235 | $\Delta\omega$ | 1.000 | 0.003 | 0.045 | $\Delta\omega$ | 1.000 | 0.010 | 0.041 |
| $\Delta\varphi$ | 0.000 | 1.000 | 0.000 | $\Delta\varphi$ | 0.003 | 1.000 | 0.065 | $\Delta\varphi$ | 0.010 | 1.000 | 0.049 |
| $\Delta\kappa$ | 0.235 | 0.000 | 1.000 | $\Delta\kappa$ | 0.045 | 0.065 | 1.000 | $\Delta\kappa$ | 0.041 | 0.049 | 1.000 |

The accuracy of the estimated boresight angles is qualitatively checked by visually inspecting the orthorectified mosaics of Portion C in FIG. 11 for the different dataset/dates generated using the nominal and estimated boresight angles from the different calibration strategies. The orthorectified mosaics were generated by the Spectral View software from Headwall. Due to the visual similarity of the post-calibration orthorectified mosaics, only the results from the tie-feature-based rigorous calibration are shown. FIG. 13 shows the orthorectified mosaics for a second dataset. Visible misalignments in parts A and B while using the nominal boresight angles are obvious. Zoomed-in areas at those locations are also included in FIG. 13 for closer inspection. These misalignments are eliminated in the post-calibrated orthorectified mosaics. The orthorectified mosaics for the second and first data sets are presented in FIG. 14 and FIG. 15, respectively.

In terms of quantitative evaluation of the boresight calibration accuracy, derived ground coordinates from different calibration strategies can be compared with the surveyed coordinates of the checkerboard targets. For the approximate and GCP-based rigorous calibration strategies, the ground coordinates are derived by projecting the image points onto the object space assuming flat terrain. Before calibration the nominal values of the boresight angles were used. For the tie-feature-based boresight calibration strategy, the XYZ coordinates of the tie features were derived from the calibration procedure together with the boresight angles. The evaluated ground coordinates were then compared with the surveyed coordinates by the Topcon GR-5 GNSS receiver. Table XI below summarizes the RMSE of the differences along the XYZ directions. Assuming that the targets/features are well identified, the RMSE value that can be tolerated is at the level of the GSD of the used sensor.

TABLE XI

RMSE OF THE DIFFERENCES BETWEEN THE DERIVED AND SURPRESSED GROUND COORDINATES BEFORE AND AFTER THE DIFFERENT BORESIGHT CALIBRATION STRATEGIES

| Collection Date | Approach | RMSE of X coordinate residuals (m) | RMSE of Y coordinate residuals (m) | RMSE of Z coordinate residuals (m) |
|---|---|---|---|---|
| July 12th, 2017 | Before Boresight Calibration | 0.305 | 0.648 | 1.096 |
|  | Approximate-Tie Features | 0.125 | 0.135 | 1.096 |
|  | Rigorous-GCP | 0.118 | 0.129 | 1.096 |
|  | Rigorous-Tie Features | 0.062 | 0.055 | 0.594 |
| July 15th, 2017 | Before Boresight Calibration | 0.273 | 0.538 | 0.870 |
|  | Approximate-Tie Features | 0.150 | 0.106 | 0.870 |
|  | Rigorous-GCP | 0.106 | 0.099 | 0.870 |
|  | Rigorous-Tie Features | 0.054 | 0.035 | 0.352 |
| July 18th, 2017 | Before Boresight Calibration | 0.277 | 0.490 | 0.770 |
|  | Approximate-Tie Features | 0.287 | 0.115 | 0.770 |
|  | Rigorous-GCP | 0.165 | 0.105 | 0.770 |
|  | Rigorous-Tie Features | 0.116 | 0.045 | 0.288 |
| July 25th, 2017 | Before Boresight Calibration | 0.311 | 0.505 | 0.739 |
|  | Approximate-Tie Features | 0.145 | 0.086 | 0.739 |
|  | Rigorous-GCP | 0.145 | 0.096 | 0.739 |
|  | Rigorous-Tie Features | 0.057 | 0.029 | 0.387 |
| July 30th, 2017 | Before Boresight Calibration | 0.295 | 0.560 | 0.419 |
|  | Approximate-Tie Features | 0.080 | 0.069 | 0.419 |
|  | Rigorous-GCP | 0.063 | 0.066 | 0.419 |
|  | Rigorous-Tie Features | 0.050 | 0.040 | 0.173 |
| August 1st, 2017 | Before Boresight Calibration | 0.262 | 0.540 | 0.456 |
|  | Approximate-Tie Features | 0.085 | 0.042 | 0.456 |
|  | Rigorous-GCP | 0.080 | 0.042 | 0.456 |
|  | Rigorous-Tie Features | 0.033 | 0.012 | 0.223 |

It can be seen from Table XI that all the calibration strategies had a major impact in improving the planimetric accuracy of derived ground coordinates with the tie-feature-based calibration producing the most accurate results. Since the GCP derivation for the approximate and GCP-based rigorous calibration procedures projects the image points onto a flat terrain, the vertical differences are quite similar to those derived using the nominal values. The vertical differences are mainly attributed to the flat terrain assumption and not due to the quality of the available boresight angles since the derived Z coordinate is based on nominal average flying height. This hypothesis is confirmed by the bias impact analysis that shows that biases in the boresight angles will not lead to biases in the vertical ground coordinates (see Equation 15). For the tie-feature-based calibration strategy, the RMSE in the vertical direction is much better; however, it is significantly worse than the planimetric RMSE. Based on the previous analysis, biases in the boresight angles is shown to have no impact on the height of derived points along relatively flat terrain. If the terrain elevation variation is expected to be quite significant relative to the flying height, then neither of the rigorous approaches disclosed herein can be expected to yield good results.

The relatively worse vertical accuracy as represented by the RMSE is hypothesized to be caused by the intersection geometry for conjugate light rays. To verify or reject this hypothesis, an evaluation was made of the average standard deviations of the estimated ground coordinates of the tie points from the tie feature-based rigorous adjustment procedure (the mean standard deviations are reported in Table XII).

TABLE XII

MEAN STANDARD DEVIATIONS FOR THE ESTIMATED GROUND COORDINATES OF THE FEATURES FROM THE TIE-FEATURE-BASED RIGOROUS CALIBRATION STRATEGY

| Collection Date | Mean STD of estimated X coordinates (m) | Mean STD of estimated Y coordinates (m) | Mean STD of estimated Z coordinates (m) |
|---|---|---|---|
| July 12th, 2017 | ±0.049 | ±0.050 | ±0.447 |
| July 13th, 2017 | ±0.029 | ±0.036 | ±0.291 |
| July 18th, 2017 | ±0.048 | ±0.049 | ±0.367 |
| July 25th, 2017 | ±0.049 | ±0.045 | ±0.430 |
| July 30th, 2017 | ±0.026 | ±0.027 | ±0.325 |
| August 1st, 2017 | ±0.031 | ±0.030 | ±0.263 |

The compatibility of the RMSE and mean standard deviations for the XYZ directions as derived from the tie-feature-based rigorous calibration proves that the above hypothesis (i.e., the quality of the vertical coordinates depends on the intersection geometry rather than the quality of the boresight angles) is correct. Moreover, it also shows the absence of systematic errors/biases. A final observation that can be drawn from the presented results is the impact of having a gimbal on the data acquisition platform. As can be seen in Tables XI and XII, the two datasets, which were captured by the M600 using a gimbal, produced the best results (almost at the same level as the GSD of the sensor). This performance is attributed to the clearer scenes, which contributed to better identification of the image space features.

The procedures described herein rely on manually identified features from the acquired dataset. However, it is contemplated that the tie features and control features can be automatically identified in overlapping imagery. It is further contemplated that the calibration methods disclosed herein can be augmented through the incorporation of RGB frame cameras to simultaneously estimate the mounting parameters for the imaging sensors. It is contemplated that the calibration methods disclosed herein produce a boresight calibration matrix that adjusts the boresight coordinates matrix used to calculate the XYZ data for each image point. Further details of the push-broom calibration method and experimental results are included in Appendices E and F, the disclosure of which are incorporated in their entirety herein by reference.

LiDAR Camera System Calibration

Similar boresight calibration techniques can be applied in the calibration of UAV-based LiDAR (light detection and ranging) systems. Certain features and experimental results of the techniques as applied to LiDAR calibration are provided in Appendix A, the entire disclosure of which is incorporated herein by reference. In contrast to the push-broom scanner described above, the LiDAR system uses laser beams to measure ranges and generate precise 3D information about a scanned area. Like the methods described above, the LiDAR calibration techniques disclosed herein directly estimate the mounting parameters for the laser scanners of the LiDAR through an outdoor calibration procedure, and in particular using overlapping point clouds derived from different flight lines, similar to the fight lines discussed above. These techniques can simultaneously estimate the mounting parameters for camera and LiDAR units onboard the mobile mapping platform other than the optimal configuration for boresight/lever system calibration. In one aspect, an approach is provided for simultaneous consideration of LiDAR/camera system calibration using point/linear/planar features through a pairing scheme for discrepancy minimization.

Figure 16:
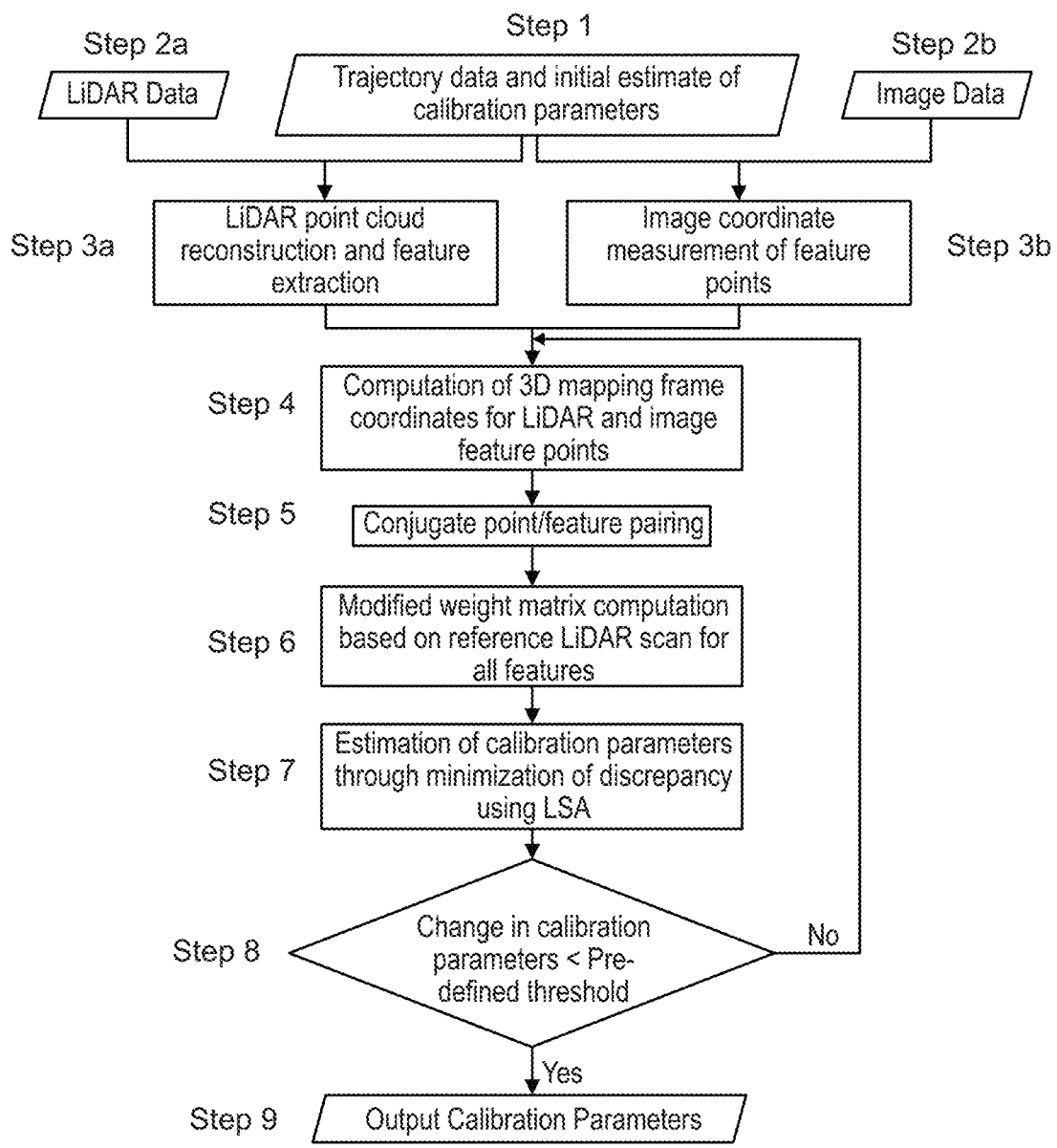
FIG. 16 is a flowchart of steps in a calibration method according to one aspect of the present disclosure

FIG. 16 is a flowchart of the steps involved in the LiDAR calibration method disclosed herein. In general terms, the method starts in Step 1 with obtaining trajectory data and an initial estimate of the calibration parameters of the mobile LiDAR vehicle. LiDAR data acquired in along the trajectory in Step 2a is accumulated to construct a 3D point cloud in Step 3a from which features used in the calibration process are extracted. Image data collected in Step 2b is used in Step 3b to conduct image coordinate measurement of the feature points extracted in Step 3a. The 3D mapping frame coordinates for the LiDAR and the image feature points are computed in Step 4, followed by conjugate point/feature pairing (as discussed herein) in Step 5. A modified weight matrix is calculated in Step 6 based on the LiDAR scan. The calibration parameters are estimated through minimization of discrepancies using least squares adjustment (LSA) in Step 7 and if that change in calibration is determined in Step 7 to be greater than a pre-defined threshold the process returns to Step 4. On the other hand, if the change in calibration parameters falls below the pre-determined threshold, the calibration parameters are outputted in Step 9 and stored for use in adjusting the 3D point cloud data.

As with the push-broom calibration methods described above, the LiDAR calibration methods disclosed herein suggest an optimal/minimal flight and feature configuration for a reliable estimation of the mounting parameters of the LiDAR on the UAV. Thus, a minimal number of flight lines are required for accurate calibration. Moreover, the optimal flight and feature configuration decouples the various components of the mounting parameters. As with the approaches discussed above, this optimal/minimal feature is obtained through a bias impact analysis that evaluates the effect of biases in the mounting on features with different configurations.

Figure 17:
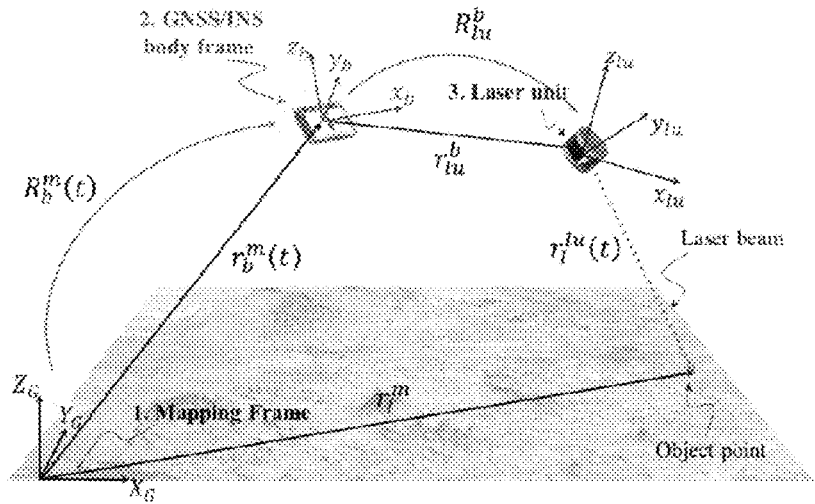
FIG. 17 is a diagram illustrating the point positioning of a UAV-based LiDAR system.
Figure 18:
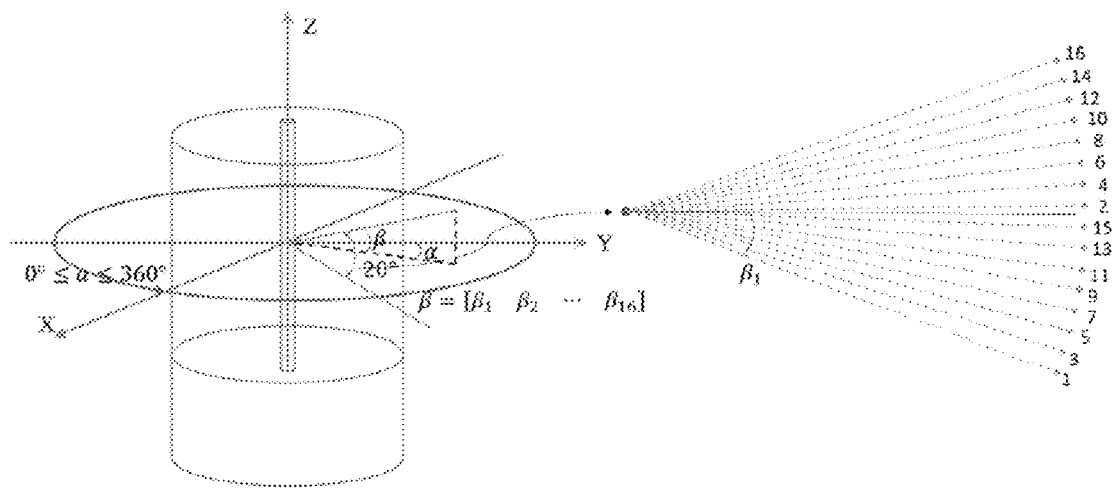
FIG. 18 is a diagram illustrating the coordinate system of a spinning LiDAR unit.

The point positioning of a UAV-based LiDAR system is shown in FIG. 17 and the coordinate system for a spinning LiDAR unit is shown in FIG. 18. Accordingly, the boresight bias impact analysis proceeds from a modification of Equation 1 above, as reflected in Equations 24 and 25 below:

$$r_I^m = r_b^m(t) + R_b^m(t) r_{lu}^b + R_b^m(t) R_{lu}^b r_I^{lu}(t) \tag{24}$$

$$r_I^{lu}(t) = \begin{pmatrix} x \\ y \\ z \end{pmatrix} = \begin{pmatrix} \rho(t)\cos\beta(t)\cos\alpha(t) \\ \rho(t)\cos\beta(t)\sin\alpha(t) \\ \rho(t)\sin\beta(t) \end{pmatrix} \tag{25}$$

As discussed in more detail in Appendix A, the entire disclosure of which is incorporated herein by reference, the optimal flight configuration for calibration of a UAV-based LiDAR system is based on the following:

1. The lever arm $\Delta X$ can be estimated using opposite flight lines while scanning vertical planar features parallel to the flight direction.

2. The lever arm $\Delta Y$ can be estimated using opposite flight lines while scanning vertical planar features perpendicular to the flight direction.

3. The lever arm $\Delta Z$ for a given spinning multi-beam laser scanner can be estimated only using vertical control, which can be in the form of horizontal planar patches.

4. The boresight pitch $\Delta\omega$ can be estimated using opposite flight lines along with another flight line at a different height while scanning horizontal planar features and vertical planar features perpendicular to the flight direction. Another alternative for having a flight line at different flying height is to have vertical planar features whose extent in the vertical direction is significant with respect to the flying height or having vertical planar patches at different heights.

5. The boresight roll $\Delta\Phi$ can be estimated using opposite flight lines along with another flight line at a different height while scanning horizontal planar features and vertical planar features parallel to the flight direction. Another alternative for having a flight line at different flying height is to have vertical planar features with significant height with respect to the flying height or having vertical planar patches at different heights. Additionally, increasing the lateral distance between the tracks and between horizontal patches and the tracks would improve the boresight roll estimation.

6. The boresight heading $\Delta\kappa$ can be estimated by scanning vertical planes from two flight lines in the same direction with a significant lateral separation between them. This configuration would eliminate any discrepancies caused by lever-arm components.

Applying these optimal flight configurations, the mounting parameters that are derived from the calibration are the lever arm ($\Delta X$, $\Delta Y$) and boresight angles ($\Delta\omega$, $\Delta\phi$, $\Delta\kappa$) for the LiDAR unit. The lever arm $\Delta Z$ for the LiDAR unit cannot be estimated in the calibration procedure since any change in $\Delta Z$ will not introduce discrepancies among the different versions of the same feature captured from different flight lines. The mounting parameters for each sensor are derived by minimizing the discrepancies between non-conjugate point pairings among conjugate features in overlapping flight lines according to the flight configurations described above. Finally, the mounting parameters for the laser unit can be derived by minimizing the discrepancies among the conjugate features arising from the above-mentioned pairs.

Terrestrial Mobile LiDAR Camera System Calibration

The techniques discussed above regarding calibration of a UAV-based LiDAR system can be applied in a similar fashion to a ground-based or terrestrial platform. Features of the calibration and bias impact analysis for a terrestrial-based LiDAR system are disclosed in Appendix B, the entire disclosure of which is incorporated herein by reference. The drive run and target configurations for the terrestrial-based LiDAR are similar to the UAV-based LiDAR:

1. The lever arm $\Delta X$ can be estimated using opposite drive runs while scanning vertical planar features parallel to the drive run direction.

2. The lever arm $\Delta Y$ can be estimated using opposite drive runs while scanning vertical planar features perpendicular to the drive run direction.

3. The lever arm $\Delta Z$ for a given spinning multi-beam laser scanner can be estimated only using vertical control.

4. The boresight pitch ($\Delta\omega$) can be estimated using horizontal planar features in addition to using two opposite drive runs while scanning vertical planar features perpendicular to the drive run direction. The height of the planar features is critical to decouple this parameter from the lever-arm component ($\Delta Y$).

5. The boresight roll ($\Delta\phi$) can be estimated using two opposite drive runs while scanning vertical planar features parallel to the drive run direction. The height of the planar features is critical to decouple this parameter from the lever-arm component ($\Delta X$). The setup should also include horizontal planar features scanned from opposite drive runs at different lateral distances from the features and scanned from drive runs in the same direction but with different lateral separations.

6. The boresight heading ($\Delta\kappa$) can be estimated by scanning vertical planes from two drive runs in the same direction with a significant lateral separation between them. This configuration would eliminate any discrepancies caused by lever-arm components. This setup should also include horizontal planar features scanned from opposite drive runs at different lateral distances from the features and scanned from drive runs in the same direction but with different lateral separations.

Simultaneous Calibration of a Multi-LiDAR Multi-Camera Systems

In some mapping applications, multiple cameras/LiDAR scanners are desirable. This aspect of the disclosure contemplates simultaneous calibration of the multiple cameras/LiDAR scanners, rather than calibration of each camera/

LiDAR scanner separately. The system calibration simultaneously estimates the mounting parameters relating the individual laser scanners, cameras, and the onboard GNSS/INS unit using an iterative calibration procedure that minimizes the discrepancy between conjugate points and linear/planar features in overlapping point clouds and images derived from different drive-runs/flight lines. The simultaneous estimation of all the mounting parameters increases the registration accuracy of the point clouds derived from LiDAR and photogrammetric data. This also allows for forward and backward projection between image and LiDAR data, which in turn is useful for high-level data processing activities, such as object or feature extraction.

Figure 19:
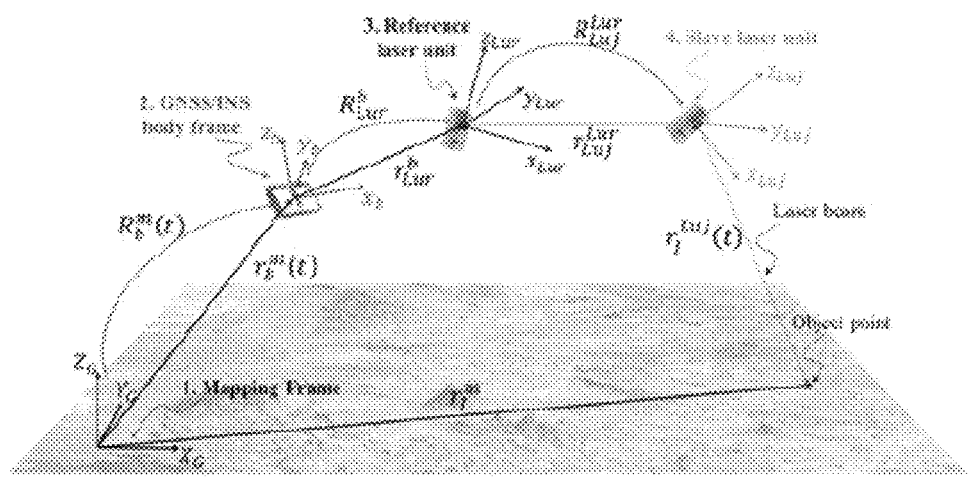
FIG. 19 is a diagram illustrating the point positioning of a UAV-based multi-LiDAR system.

The point positioning of a UAV-based multiple LiDAR system is shown in FIG. 19, in which, $r_a^b$ denotes the coordinates of point "a" relative to point "b" in the coordinate system associated with point "b" and $R_a^b$ denotes the rotation matrix that transforms a vector-defined relative to the coordinate system "a" into a vector-defined relative to the coordinate system "b." For the laser unit frame, the origin is defined at the laser beams firing point and the z-axis is along the axis of rotation of the laser unit. A given point I acquired from a mobile mapping system equipped with multiple scanners can be reconstructed in the mapping coordinate system using Equation 26:

$$r_I^m = r_b^m(t) + R_b^m(t) r_{lur}^b + R_b^m(t) R_{lur}^b r_{luj}^{lur} + R_b^m(t) R_{lur}^b R_{luj}^{lur} r_I^{luj}(t) \quad (26)$$

For a spinning multi-beam laser scanner, each laser beam is fired at a fixed vertical angle β; the horizontal angle α is determined based on the rotation of the unit; and the range ρ is derived from the time of flight between the firing point and the laser beam footprint. The coordinates of a 3-D point relative to the laser unit coordinate system $r_I^{luj}(t)$ are defined by Equation 27:

$$r_I^{luj}(t) = \begin{pmatrix} x \\ y \\ z \end{pmatrix} = \begin{pmatrix} \rho(t)\cos\beta(t)\cos\alpha(t) \\ \rho(t)\cos\beta(t)\sin\alpha(t) \\ \rho(t)\sin\beta(t) \end{pmatrix} \quad (27)$$

For a multi-beam LiDAR system, one of the laser scanners is set as a reference and the rest are considered to be slave sensors. The reference sensor (lur) is related to the IMU body frame by a rigidly defined lever arm $r_{lur}^b$ and boresight matrix $R_{lur}^b$. Similarly, each slave sensor (luj) is related to the reference sensor (lur) by a rigidly defined lever arm $r_{luj}^{lur}$ and boresight matrix $R_{luj}^{lur}$. The GNSS/INS integration provides the time-dependent position $r_b^m(t)$ and rotation $R_b^m(t)$ relating the mapping frame and IMU body frame coordinate systems.

A given point I captured in an image as point from a mobile mapping system comprising multiple cameras can be reconstructed in the mapping coordinate system using Equation 28:

$$r_I^m = r_i^m(t) + R_b^m(t) r_{Cr}^b + R_b^m(t) R_{Cr}^b r_{Cj}^{Cr} + \lambda(i,Cj,t) R_b^m(t) R_{Cr}^b R_{Cj}^{Cr} r_i^{Cj}(t) \quad (28)$$

For the camera coordinate frame, the origin is defined at the perspective center and the x, y-axes are defined along the direction of the rows and columns of the image, respectively. So, the coordinates of a point i in an image captured by camera Cj relative to the camera coordinate system $r_i^{Cj}(t)$ are defined by Equation 29, where $x_{pj}$ and $y_{pj}$ denote the location of the principal point, $f_j$ denotes the principal distance, and $distx_{ij}$ and $disty_{ij}$ denote the distortion in image coordinate measurements for point i in the $j^{th}$ camera. These intrinsic parameters ($x_{pj}$, $y_{pj}$, $f_j$, $distx_{ij}$ and $disty_{ij}$) are known a priori for a calibrated camera. For a multi-camera system, one of the cameras is set as reference and the rest are considered to be slave cameras. The reference camera (Cr) is related to the IMU body frame by a rigidly defined lever arm $r_{Cr}^b$ and boresight matrix $R_{Cr}^b$. Similarly, each slave camera (Cj) is related to the reference one (Cr) by a rigidly defined lever arm $r_{Cj}^{Cr}$ and boresight matrix $R_{Cj}^{Cr}$. Finally, each point i in an image captured by camera Cj at time t has a scaling factor associated with it, which is denoted by λ(i, Cj, t).

$$r_i^{Cj}(t) = \begin{pmatrix} x_{ij} - x_{pj} - dist_{x_{ij}} \\ y_{ij} - y_{pj} - dist_{y_{ij}} \\ -f_j \end{pmatrix} \quad (29)$$

Equation 28 can be modified to eliminate the scaling factor, and then simplified to Equations 30a, 30b:

$$x_{ij} = x_{pj} - f_j \frac{N_x}{D} + dist_{x_{ij}} \quad (30a)$$

$$y_{ij} = y_{pj} - f_j \frac{N_y}{D} + dist_{y_{ij}} \quad (30b)$$

The basic steps in the simultaneous calibration of the multiple LiDARs/cameras follow the flowchart of FIG. 16 according to one aspect of the present disclosure. Features of this method are provided in Appendix C, the entire disclosure of which is incorporated herein by reference. In the context of this disclosure "pairings" refers to a point I observed in two LiDAR scans, in two images or in one LiDAR scan and one image. The method of the present disclosure contemplates point-pairing based bundle adjustment in which Equation 28 is utilized and the scaling factors λ are retained and treated as unknowns. This is achieved by imposing an equality constraint on the 3-D mapping frame coordinates computed for different image points representing the same object point by pairing them together. For instance, for a point I captured in two different images-one by camera $C_j$ at time $t_I$ and another by camera $C_k$ at time $t_2$-the difference between the mapping coordinates computed from both images should be zero. Here, the unknowns include the scaling factors for the two image points λ(i, $C_j$, $t_1$) and λ(i', $C_k$, $t_2$).

A multi-LiDAR multi-camera system calibration aims to simultaneously estimate all the system parameters so as to minimize the discrepancies among conjugate points, linear features, and/or planar features obtained from different laser scanners, cameras, and/or drive-runs/flight lines. The method of the present disclosure adopts a feature representation scheme, a feature extraction technique, and an optimal pairing strategy for the different types of features based on their representation in imagery and LiDAR data.

In Steps 1, 2a and 2b, the trajectory data for the UAV/mobile platform, LiDAR data and Image data are obtained, along with an initial estimate of the calibration parameters for the LiDAR based on the pre-determined assumed physical orientation and positioning mounting parameters of the LiDAR relative to the GNSS/INS unit. These parameters include a scaling factor λ(i, Cj, t)), the lever arm (ΔX, ΔY, ΔZ), and boresight angles (Δω, Δϕ, Δκ) for all the laser scanners and cameras (C). This data is collected from several drive-runs/flight lines. A LiDAR-based 3D point cloud relative to a global reference frame is derived and conjugate features are identified and extracted in Step 3a. The image data acquired in Step 2b is used to identify the image coordinates of the conjugate features in Step 3b. The 3D mapping frame coordinates for the LiDAR and image conjugate features are calculated by an on-board or remote computer/processor in Step 4, with the calculations using the pre-determined assumed mounting parameters.

Representation Scheme and Feature Extraction

With respect to the extraction of conjugate features in Steps 3a, 3b, a linear feature appearing in an image or a LiDAR scan is represented by a sequence of pseudo-conjugate points lying along the feature. Here, the term "pseudo-conjugate points" refers to points that are not distinctly identifiable in different images or LiDAR scans but are known to belong to the same feature. In outdoor calibration various linear features can be extracted and used, such as flag poles, light poles, physical intersections of neighboring planar features, and so on. Features like flag poles or light poles are extracted from LiDAR data by specifying the two end points. A buffer radius is set to define a cylinder around the linear feature of interest, then, a line-fitting is done for the points lying within this cylindrical buffer, after which the points that lie within a normal distance threshold from the best fitting line are extracted. On the other hand, points belonging to intersections of neighboring planar features are extracted by first determining the best-fitting planes for each of the two planar surfaces, then determining their intersection line. All the points lying within a normal distance threshold from this line are extracted. In the case of image data, linear features are extracted by manually measuring image coordinates for pseudo-conjugate points along corresponding features.

A planar feature appearing in a LiDAR scan is represented by a sequence of pseudo-conjugate points lying along the feature. However, in the case of an image, a planar feature is represented by distinct points, such as the corners, along the feature. LiDAR points belonging to each planar feature will have the same labels (which are specific to the feature) but the corresponding image points (i.e., corners of a board) will have distinct labels (specific to the corresponding object point). Highly reflective boards, ground patches, wall patches, and other surfaces are optimal as planar features for calibration.

Development of an Optimal Pairing Scheme for Calibration

In Step 4, the mapping frame coordinates of a point I captured in a LiDAR scan and an image can be derived using Equations 26 and 28, respectively. In Step 5, the conjugate features are paired in order to achieve the calibration objective function of finding the system parameters that minimize the discrepancies between the 3-D coordinates of a point derived from different drive-runs/flight lines. In a multi-LiDAR multi-camera system, these discrepancies can arise from three types of pairings: LiDAR-to-LiDAR pairings as represented by Equation 31a, image-to-image pairings as represented by Equation 31b, and LiDAR-to-image pairings as represented by Equation 31c, where the term "pairing" refers to a point (j or k) observed in two LiDAR scans, two images, or one LiDAR scan and one image:

$$r_I^m(Lu_j,t_1) - r_I^m(Lu_k,t_2) = 0 \quad (31a)$$

$$r_I^m(C_j,t_1) - r_I^m(C_k,t_2) = 0 \quad (31b)$$

$$r_I^m(Lu_j,t_1) - r_I^m(C_k,t_2) = 0 \quad (31c)$$

Each point pair serves two purposes: first in the derivation of 3-D mapping frame coordinates of the involved points and second in the estimation of system calibration parameters. In order to determine the contribution from a pairing toward system calibration, the point definition redundancy is computed, i.e., the redundancy for the derivation of the 3-D mapping frame coordinates of LiDAR/image points, as a result of LiDAR-to-LiDAR, image-to-image and LiDAR-to-image pairings. For a point I captured in n different LiDAR scans and m different images there can be a total of (n−1) independent LiDAR-to-LiDAR pairings, (m−1) independent image-to-image pairings, and one additional pairing between a LiDAR scan and an image for this point. Each point pairing will result in a random misclosure vector ($\vec{e}$), as represented in Equation 32:

$$r_I^m(\text{LiDAR scan/image 1}) - r_I^m(\text{LiDAR scan/image 2}) = (\vec{e}) \quad (32)$$

For a conjugate point pairing, the discrepancy ($\vec{e}$) is minimized along the X, Y, and Z directions of the mapping frame, thus resulting in three equations for each point pair. So, a LiDAR-to-LiDAR point pairing will result in three equations with no additional unknowns, and hence, the point definition redundancy is 3. An image-to-image point pairing would introduce a scaling factor corresponding to each image so that there will be three equations and two unknowns, i.e., the point definition redundancy is 1. Similarly, a LiDAR-to-image point pairing will give rise to three equations and one unknown (scaling factor corresponding to the image point), and thus, the point definition redundancy is 2.

As discussed above, a linear feature is represented by a sequence of pseudo-conjugate points along the feature. Each pseudo-conjugate point pairing will result in a random misclosure vector (e) along with a nonrandom misclosure vector ($\vec{D}$) which can be expressed mathematically as Equation 33:

$$r_I^m(\text{LiDAR scan/image 1}) - r_I^m(\text{LiDAR scan/image 2}) = \vec{D} + \vec{e} \quad (33)$$

In this case, the discrepancy of the resultant point pair is minimized only along the two directions that are normal to the axial direction of the linear feature, thus resulting in two equations from each pseudo-conjugate point pair. This is achieved by applying a modified weight matrix to the point pair in Step 6, which nullifies the component of their discrepancy along the axial direction of the linear feature. This modified weight matrix is derived in Step 6 according to the estimated direction of the linear feature using the points from a reference LiDAR scan encompassing this feature. The weight matrix can be calculated as disclosed in "Featured-based registration of terrestrial laser scans with minimum overlap using photogrammetric data," E. Renaudin, A. Habib, and A. P. Kersting, ETRI J., vol. 33, no. 4, pp. 517-527, 2011, the entire disclosure of which is incorporated herein by reference. The scan with the largest number of points belonging to a feature is set as the reference scan as it would result in the most reliable estimate of the feature direction. All the images and LiDAR scans are paired to a reference LiDAR scan, so that there are no image-to-image pairings in the case of linear features.

As discussed above, a planar feature is represented by a sequence of pseudo-conjugate points along the feature. Again, each pseudo-conjugate point pairing results in a random misclosure vector ($\vec{e}$) along with a non-random misclosure vector ($\vec{D}$). The discrepancy of the resultant point pair is minimized only along the direction normal to the planar surface, thus resulting in only one equation from each pseudo-conjugate point pair. Again, this is achieved by deriving a modified weight matrix using the normal direction of the planar surface based on the points from the corresponding reference LiDAR scan that encompass this feature. Similar to the discussion for linear features, all the images and LiDAR scans are paired to a reference LiDAR scan. For a planar feature captured in n different LiDAR scans and m different images there will be a total of (n−1) independent LiDAR-to-LiDAR pairings and m independent LiDAR-to-image pairings for each pseudo-conjugate point along the feature. A pseudo-conjugate LiDAR-to-LiDAR point pairing will lead to one equation and no unknowns.

Thus, an optimal pairing scheme produced in Step 5 to conduct multi-LiDAR multi-camera system calibration is:

1. Image-to-image conjugate,
2. LiDAR-to-LiDAR and LiDAR-to-image pairings of pseudo-conjugate points belonging to corresponding linear features,
3. LiDAR-to-LiDAR pairings of pseudo-conjugate points along corresponding planar features, or
4. LiDAR-to-image pairings of pseudo-conjugate points belonging to corresponding planar features along with image-to-image conjugate point pairs for the same feature.

Iterative Calibration Method

In accordance with one feature of the present disclosure, the method is provided to simultaneously calibrate the mounting parameters of several spinning multi beam laser scanners and cameras onboard a mobile platform using tie points and tie features (e.g., planar and linear features), is reflected in the flowchart of FIG. 16. After collecting data from several drive-runs/flight lines, a LiDAR-based 3-D point cloud relative to a global reference frame is derived using the GNSS/INS-based position/orientation and initial estimates for the mounting parameters. Then, conjugate features are identified, as discussed above, and the conjugate features are extracted from the reconstructed point cloud. Similarly, images captured from different cameras and drive runs/flight lines are used to measure the image coordinates of the points belonging to these conjugate features. The 3-D coordinates for the image points are computed using initial estimates of their scaling factors and camera mounting parameters along with the GNS SANS position and orientation information.

The multi-LiDAR multi-camera system calibration is based on minimizing the discrepancies among conjugate points, linear features, and/or planar features obtained from different laser scanners, cameras, and/or drive-runs/flight lines. An optimal configuration maximizes the impact of biases in calibration parameters so as to ensure an accurate estimation of the bias. Thus, the configuration used in a calibration mission is one where there are sufficient target primitives to establish a control in all three directions (along track, across track, and vertical directions). Moreover, the drive-run/flight line configuration should include tracks in the same as well as opposite directions with different lateral separations between them. The present method contemplates an iterative calibration procedure where first the discrepancy among extracted points/features is minimized using a modified weight matrix generated in Step 6 to derive mounting parameters through an LSA process. Then, the 3-D mapping frame coordinates for all the LiDAR and image points along the extracted features are recomputed using the newly estimated mounting parameters and scaling factors in Step 7. The modified weight matrix is redefined depending on the newly obtained best-fitting line or plane from the reference LiDAR scan, and the discrepancy ($\vec{e}$) among conjugate features is minimized again using least squares adjustment (LSA) with the newly defined modified weight matrix. The above-mentioned steps are repeated until the change in the estimates of the mounting parameters is below a predefined threshold, as reflected in Step 8 of the flowchart of FIG. 16. When control returns to Step 4 from Step 8, the derived mounting or calibration parameters are carried forth for a new computation of the 3D mapping frame coordinates for the LiDAR and image features.

As indicated above, the parameters that need to be estimated are the scaling factors for all the points measured in different images ($\lambda(i, C_j, t)$), the lever arm ($\Delta X, \Delta Y, \Delta Z$), and the boresight angles ($\Delta\omega, \Delta\varphi, \Delta\kappa$;) for all the laser scanners and cameras. If the change in mounting parameters in the iterations of Steps 4-8 is less than the pre-defined threshold, the mounting parameters are output and/or are used to calibrate the LiDAR camera system as described herein. The vertical lever arm component $\Delta Z$ of the reference laser scanner is fixed during the calibration procedure and will not introduce discrepancies among the different versions of the same feature captured from different laser scanners, cameras, and/or drive-runs/flight lines. The vertical component will only result in a shift of the point cloud in the vertical direction as a whole, so, it can either be manually measured or determined using vertical control (such as horizontal planar patches with known elevation). The method can incorporate ground control points, which can be paired to the corresponding image points or pseudo-conjugate LiDAR points along the corresponding feature. Ground control features can also be paired with LiDAR or image points belonging to the corresponding feature.

Fully Automated Profile-Based Calibration of LiDAR Scanners

The present disclosure contemplates a fully automated approach for calibrating airborne and terrestrial mobile LIDAR mapping systems (MLMS) that include spinning multi-beam laser scanners and a GNSS/INS unit for direct geo-referencing. The MLMS is operable to generate point clouds of an area or field being mapped over multiple drive runs along flight lines for airborne systems or travel paths for ground-based systems The disclosed calibration technique can accurately estimate the mounting parameters, i.e., the lever-arm and boresight angles, relating the onboard LiDAR units to the GNSS/IMU position and orientation system. Inaccurate estimates of mounting parameters will result in a discrepancy between point clouds for the same area captured from different sensors along different drive-runs/flight lines. The goal of calibrating an MLMS is to minimize the above-mentioned discrepancy between point clouds.

For the present disclosure, the point cloud captured by a single LiDAR unit in a given drive-run/flight line is regarded as an individual track. Given the number of onboard sensors ($n_{sensors}$) and number of drive-runs/flight lines ($n_{runs}$), there will be a total of ($n_{sensors} * n_{runs}$) tracks that are used in the system calibration method disclosed herein. The calibration method contemplates two primary steps:

(1) defining of an optimal set of calibration primitives and an optimal drive-run/flight line configuration, and (2) development of a point-pairing strategy along with an optimization function for calibration.

An optimal track and calibration primitive configuration described above includes calibration primitives that provide variability in three-dimensional coordinates of constituent points with respect to the tracks capturing these primitives to ensure sufficient control for an accurate calibration. In this embodiment, an automated targetless calibration procedure is provided that uses profiles, in the form of thin slices of a feature oriented along the fight/driving direction and across the flight/driving direction, as the calibration primitives. A flowchart of the calibration method is shown in FIG. 20.

The object of the first primary step is to extract an optimal set of profiles that will ensure sufficient control along the X, Y, and Z directions for an accurate estimation of the mounting parameters. An automated two-step profile extraction strategy, shown in Block 1 of the flowchart in FIG. 20, contemplates:

1. Template Profile Selection, Block 1a: An inspection of all the tracks of a vehicle are examined to identify and extract template profiles that are comprised of multiple linear segments with sufficient angular variability of the fitted lines; and 2. Matching Profile Identification, Block 1b: The selected template profiles are used to automatically identify their corresponding matches in the remaining tracks (drive-runs/flight lines and sensors) using a height map correlation-based strategy.

Figure 20:
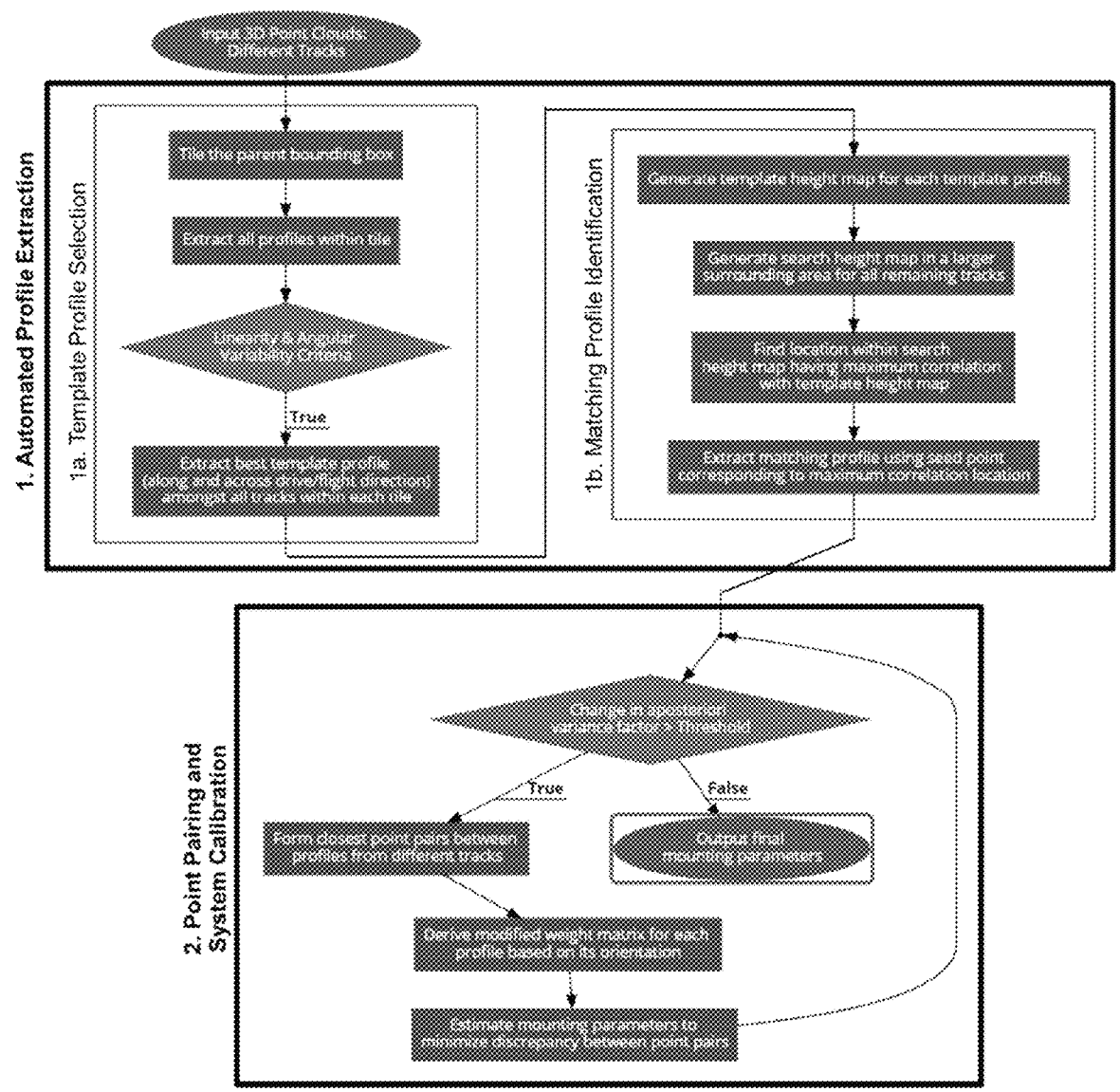
FIG. 20 is a flowchart of steps in an automated calibration method according to one feature of the present disclosure.

A point-pairing scheme is applied to the extracted template and matched profiles from different tracks and an optimization function is used to estimate the system calibration parameters, namely the lever-arm and boresight angles for all the LiDAR units onboard the mobile system, that minimize the discrepancy between the generated point pairs, as shown in Block 2 of the flowchart in FIG. 20.

Figure 21:
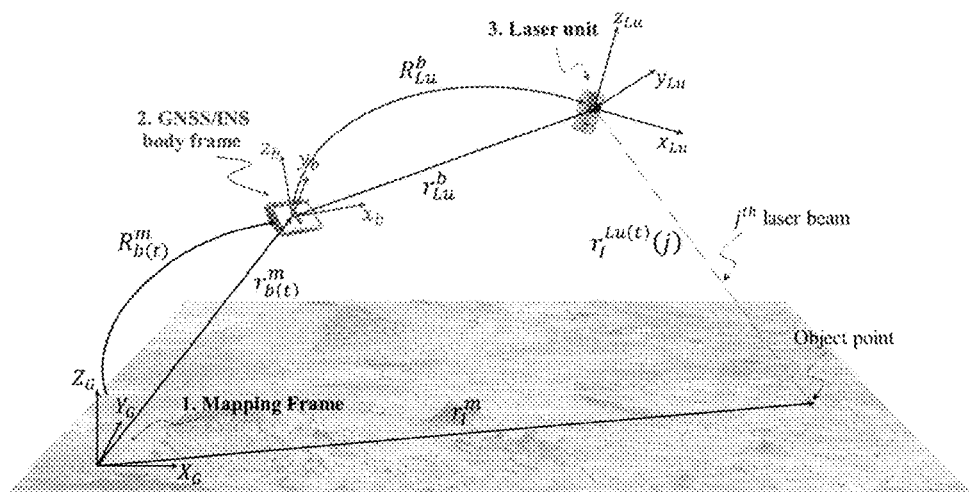
FIG. 21 is a diagram illustrating the point positioning for the automated calibration method disclosed herein.

The point positioning for a multi-laser LiDAR system is illustrated in FIG. 21. A given point, I, acquired from an MLMS can be reconstructed in the mapping coordinate system using Equation 34:

$$r_I^m = r_{b(t)}^m + R_{b(t)}^m r_{Lu}^b + R_{b(t)}^m R_{Lu}^b r_I^{Lu(t)}(j) \quad (34)$$

The reconstruction is done by applying a coordinate transformation based on the relationship between the laser unit frame, IMU body frame, and the mapping frame. For the laser unit frame, the origin is defined at the laser beam's firing point and the z-axis is defined along the axis of rotation of the laser unit. For a spinning multi-beam LiDAR unit, each laser beam is fired at a fixed vertical angle, $\beta$ (FIG. 18); the horizontal angle, $\alpha$ (FIG. 18), is determined based on the rotation of the unit; and the range, $\rho$, is defined by the distance between the firing point and its footprint on the mapped area. So, the coordinates of the 3D point, I, captured by the $j^{th}$ laser beam relative to the laser unit coordinate system, $r_I^{Lu(t)}(j)$, is defined by Equation 35:

$$r_i^{Lu(t)}(j) = \begin{pmatrix} x \\ y \\ z \end{pmatrix} = \begin{pmatrix} \rho(t)\cos\beta_j\cos\alpha(t) \\ \rho(t)\cos\beta_j\sin\alpha(t) \\ \rho(t)\sin\beta_j \end{pmatrix} \quad (35)$$

The laser unit frame is related to the IMU body frame by a rigidly defined lever arm, $r_{Lu}^b$, and boresight matrix, $R_{Lu}^b$. The GNSS/INS integration provides the time dependent position, $r_{b(t)}^m$, and rotation, $R_{b(t)}^m$, relating the IMU body frame and mapping coordinate systems.

As indicated above, the basis for the profile-based calibration method disclosed herein is to use thinly sliced profiles extracted from different tracks and treat them as two dimensional entities to minimize the discrepancy between them in the vertical and along-profile directions. In other words, each profile will contribute to discrepancy minimization in two directions. To accomplish this extraction, the subject profiles are selected for certain desired characteristics of the profile that ensure its contribution towards establishing sufficient control in three-dimensional space for an accurate calibration.

1. Since a profile contributes towards discrepancy minimization in the vertical and profile-length directions, the profile should have a unique definition along these directions. Profiles which are mainly constituted of points with planar neighborhoods are not desirable for the calibration methods disclosed herein. Instead, profiles with a majority of linear neighborhoods will facilitate an accurate point pairing for discrepancy minimization in the two aforementioned directions.

Figure 26A:
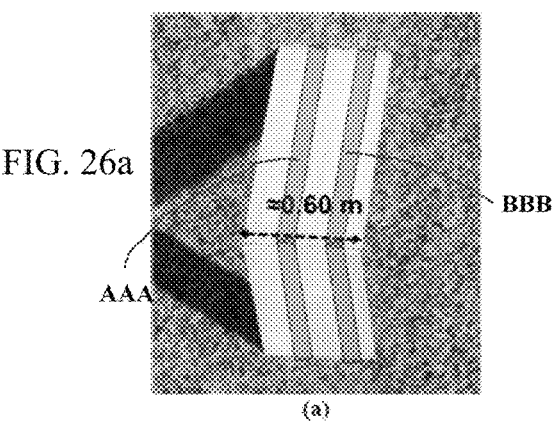
FIGS. 26a-c show sample templates and matched profiles for a pre-defined target being imaged according to the method disclosed herein.

2. In order to ensure discrepancy removal in the vertical and profile-length directions, a profile should not be monotonous, i.e., there should be variability within the points constituting the profile. This criterion is ensured by selecting profiles that are comprised of multiple linear segments with sufficient angular variability of the fitted line segments. An example of a feature capable of yielding a suitable profile is the "hut" shown in FIG. 26a which includes two linear segments at an angle relative to each other and extending upward to form a peak.

Template Profile Selection

Figure 22:
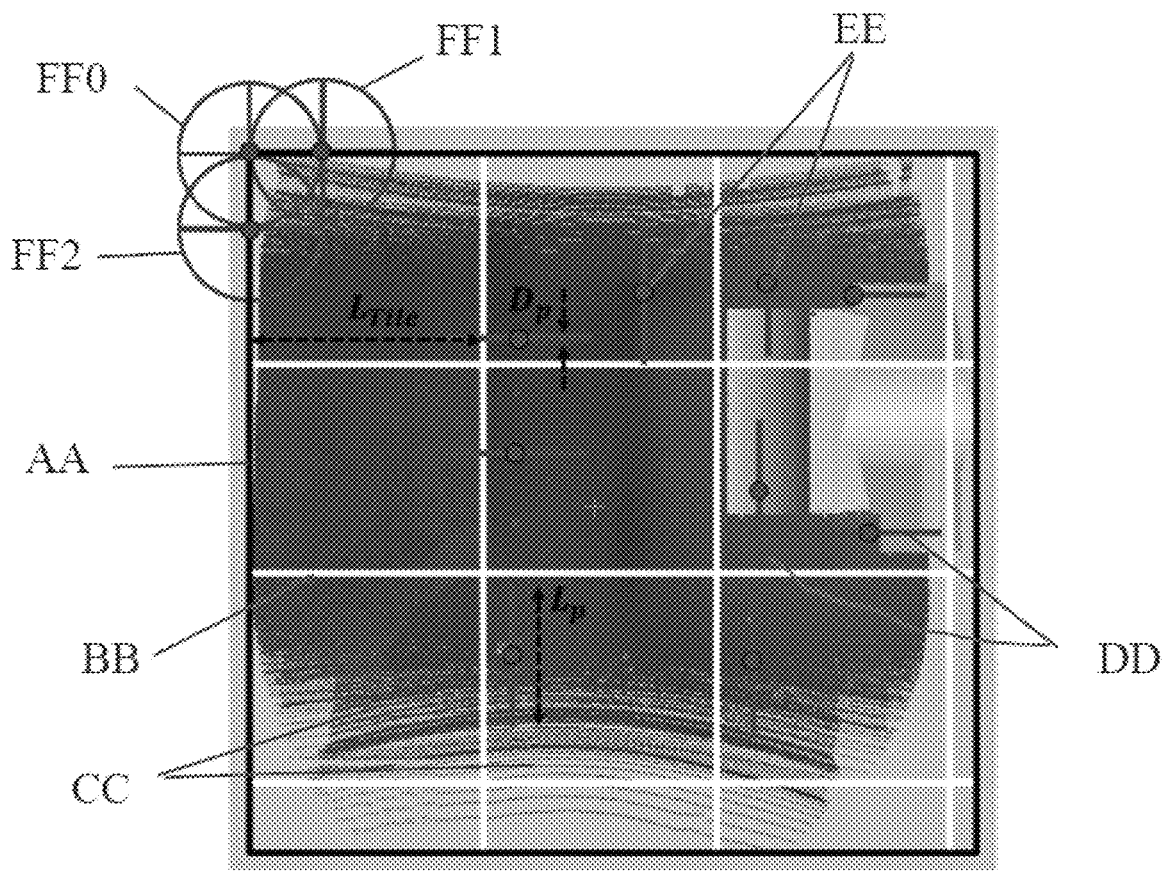
FIG. 22 is representative 3D point cloud used in template profile selection according to the method of the flowchart in FIG. 20.

The template profiles are selected by analyzing the angular variability of individual line segments constituting the profile. The selection of template profiles from the given point clouds captured from different tracks is conducted heuristically. In other words, the entire point cloud is parsed to analyze the characteristics of candidate profiles and decide whether each profile qualifies as a template for calibration. FIG. 22 shows a representative 3D point cloud used to demonstrate the steps involved in the template profile selection disclosed herein. The flight/driving direction in FIG. 22 is laterally left-to-right and right-to-left in the figure.

In order to select template profiles for calibration, a bounding box is defined that contains the union of the point clouds captured from all the tracks, denoted henceforth as the parent bounding box, shown as the solid-line rectangle AA encompassing the 3D point cloud in FIG. 22. The parent bounding box is tiled using pre-defined dimensions $L_{Tile}$, shown in FIG. 22 as white grid lines BB that separate the box into tiles CC. The profiles are represented by the lines EE with a center-point scattered throughout the parent bounding box. The desired length $L_p$ and width $D_p$ of the profiles are pre-defined by the user and these parameters are used as the basis for extracting the profiles that will be assessed for their validity to be used as a template profile. Once the point clouds are tiled collectively, each tile CC corresponding to each track is processed separately to extract the best candidate template profiles along and across flight/driving directions. The best profile in each direction is designated to be the one with the highest angular variability of the fitted line segments within the profile.

Within each tile CC, a seed point for profile extraction, represented by circle $FF_0$, is chosen at one of the corners of the tile, such as the uppermost left tile shown in FIG. 22, to extract two profiles with the user-designated profile width $D_p$. One profile within the tile is selected along the flight/driving direction and a second profile within the tile is selected across the flight/driving direction extending on either side of the seed point to result in the desired profile length, such as the profiles DD in the right middle tile in FIG. 22. The extracted profile points are allowed to extend beyond the tile boundaries when the seed points are located at the edges to ensure that the algorithm does not miss the extraction of a qualifying template profile that is located at the edge between two adjacent tiles. This profile extraction step is repeated by shifting the seed points throughout the tile bounds in the X and Y directions with a step size of half the designated profile length, as represented in FIG. 22 by the circles $FF_1$ and $FF_2$ inside the top left tile. Once all the profiles within the tile are extracted, each profile is treated as a two-dimensional entity, so all the points within the profile are transformed to obtain the corresponding two-dimensional coordinates which are aligned along the vertical and profile-length directions of the profiles. The variability of the points along the profile depth (which should be small enough to treat the profile as a 2D entity) is eliminated.

Next, the transformed 2D profile points undergo the first screening criterion discussed above which targets the removal of any profile that is predominantly planar, such as profiles extracted along a building wall face. Point pairings along such profiles cannot be used to minimize discrepancies in the vertical and profile length directions. Each 2D point within the profile is labeled as linear or planar by conducting a Principal Component Analysis (PCA) of its neighborhood (with a user-defined search radius determined based on the local point spacing of the point cloud) and any profile with a majority of planar points is rejected. A sample of profiles—one accepted and one rejected—using this linearity criterion is shown in FIG. 23a-b, where non-linear neighborhoods are in the region GG and linear neighborhoods are in the regions HH The retained profiles shown in FIG. 23b undergo further processing wherein the identified linear neighborhood points within the profile are used to conduct a 2D segmentation to cluster the points into different line segments. The line segments are tested on their lengths and the number of points to ensure that segments that are too short or sparsely populated are not considered for further assessment of angular variability. A further profile is shown in FIG. 24, where the points classified as a part of planar neighborhoods are in the region II, the points classified as belonging to linear neighborhoods—which are ignored due to their sparse nature—are in the region JJ, and the remaining points in region KK correspond to individual line segments. The angles subtended by the fitted line segments and the axis denoting the direction along the profile length are also computed. In this profile, the line segments defined by the points in region KK in this example have angles of 3.08°, 89.03°, and 0.32°. These angles of each qualifying line segment within a profile are recorded and are used to derive the angular variability within the profile. All the profiles oriented along the flight/driving direction within a tile are sorted based on the angular variability and the profile with the highest angular variability that also exceeds a user-defined variability threshold is selected and stored as the template profile within that particular tile.

The same steps are repeated to select the best profile spanning across (rather than along) the flight/driving direction within each tile. Within each tile the point cloud from each of the tracks/sensors is analyzed individually and the best profiles along and across the flight/driving direction within the tile are extracted by comparing the angular variability of the profiles coming from all the tracks covering this tile. The same approach is repeated for each tile within the parent bounding box. This results in a maximum of two qualifying template profiles from each tile, as shown in FIG. 22 as lines DD within each tile with a central solid circle denoting the corresponding seed point. Some tiles may have no template profiles because none of the candidate profiles within the tile satisfy the selection criteria illustrated above using FIGS. 23-24. Given the heuristic approach that exhaustively searches through the entire point cloud, the resultant set of template profiles is bound to have the best possible distribution of profile orientation along and across the flight/driving direction for a given test field, as required for an accurate system calibration.

Matching Profile Identification

Figure 25A:
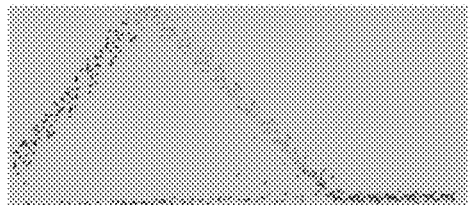
FIGS. 25a, b show a sample template and the sample template with matched profiles generated according to the method disclosed herein.

Once the template profiles are extracted with each template coming from a specific track (denoted henceforth as the reference track), the next step is to identify the corresponding matching profiles in the remaining (non-reference) tracks. In one aspect of the present disclosure, the method uses an automated profile matching technique based on height map correlation. Using the seed point for each extracted template profile as the center, a template height map is generated for points belonging to a square window around the seed point with dimensions equal to the extracted profile length $L_p$. The generated height map is gridded into smaller cells whose dimensions are determined based on the local point spacing of the point cloud. Each cell within the template height map is assigned the $95^{th}$ percentile height of all points inside the cell. Next, a larger search window with the tile dimensions used for template profile selection ($L_{Tile}$) is created around the seed point and the points from the non-reference tracks covering this window are isolated to generate a gridded search height map. A moving window of size $L_p$ is used to find the location within the search height map that has the highest correlation (more than 90%) with the previously established template height map. A highly correlated $95^{th}$ percentile height map indicates the similarity of the two neighborhoods being compared. The central point for this highest correlation location is then designated as the seed point for the matching profile within the non-reference track and is used to extract the matching profile with the same profile length and depth as the template profile. This procedure is applied to each non-reference track and for each extracted template profile to find and extract the matching profiles for calibration. A sample template profile is shown in FIG. 25a. The same profile along with its corresponding matches in 17 other tracks having discrepancies ranging up to 2 m are illustrated in FIG. 25b.

Point Pairing Scheme and Optimization Function for Calibration

Figure 25B:
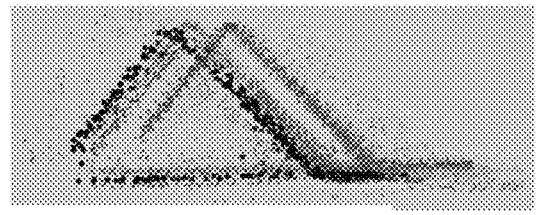
Figure 26B:
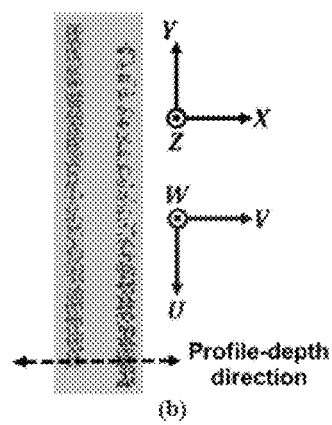
Figure 26C:
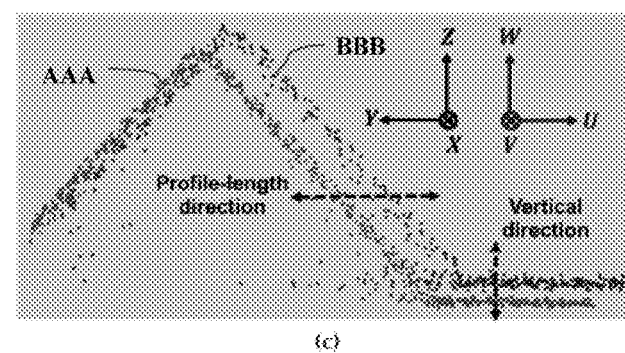

Once the template and matching profiles are extracted, as reflected in FIG. 25b, the next step 2 in the flowchart of FIG. 20 is to proceed with the calibration and establish a suitable point pairing scheme along with an appropriate objective function for the estimation of mounting parameters for all the LiDAR units onboard the mobile system. In order to conduct a profile-based calibration, the objective is to minimize the discrepancy between the mapping frame coordinates for all the point pairs formed between different tracks for each extracted profile. Each pairing between conjugate points will result in a random misclosure vector ($\vec{e}$), as given in Equation 36. The point pairs for each profile are formed by first sorting all the tracks for this profile in a decreasing order in terms of the number of points. Starting from the track with the second most number of points, each point within this track is used to find its closest counterpart in the first track, which is also closer than a pre-defined distance threshold. A similar procedure is adopted for all the tracks to pair them with the closest point found in the preceding tracks, starting with the reference one. Once the point pairs are formed for all the extracted profiles, the last step is to estimate the mounting parameters by minimizing the discrepancy between the point pair coordinates. The profile matching strategy described above ensures the profile uniqueness only along the profile length but not along its depth. For instance, for the hut-shaped target (approximately 0.60 m wide) shown in FIGS. 26a-c, the selected template profile AAA is on the left side and the corresponding matched profile BBB is on the right side. The profile uniqueness is guaranteed in the vertical and profile-length directions, whereas the uniqueness cannot be ensured along the profile depth direction since the hut will have very similar variation for all the profiles extracted anywhere within the 0.60 m wide area of the hut-shaped target. In this case, non-conjugate point pairs will be formed, which will result in an additional non-random component ($\vec{D}$) in the misclosure vector, as reflected in Equation 37. This non-random component is aligned in the profile-depth direction. As noted above, the objective function for calibration is to minimize the discrepancy between profile point pairs only in the vertical and corresponding profile-length directions. Mathematically, this can be achieved by defining a modified weight matrix (P') which nullifies the non-random component of the misclosure vector, ($\vec{D}$), as given in Equation 38. From the automated profile extraction strategy, the orientation of each profile is known, denoted henceforth by $\theta_p$, which is the angle between the profile length direction and the X-axis of the mapping frame coordinate system. Then, the rotation matrix given in Equation 39 will relate the mapping frame coordinate system (XYZ) to the profile coordinate system (UVW). Here, the U-axis is oriented along the profile length, the V-axis is oriented along the profile depth, and the W-axis is in the vertical direction, as shown in FIGS. 26b-c. The weight matrix, $P_{xyz}$ (which depends on the point cloud accuracy), in the mapping coordinate system is transformed to a weight matrix, $P'_{uvw}$, in the profile coordinate system according to the law of error propagation (Equation 40). Next, the weight matrix, $P_{uvw}$, is modified by assigning zero weights to the elements corresponding to the direction along the profile depth (Equation 41) and the modified weight matrix, $P'_{uvw}$, is transformed back into the mapping frame to obtain $P'_{xyz}$ using Equation 42. Finally, the obtained modified weight matrix is applied to the condition in Equation 37 to only retain the discrepancy between non-conjugate point pairs in the vertical and profile-length directions. The mounting parameters are estimated with the objective to minimize the resultant discrepancies $\vec{e}$ between the non-conjugate point pairs. After each iteration of mounting parameters estimation, the point pairing is conducted again by identifying the closest points using the newly reconstructed point coordinates from the revised estimates of mounting parameters.

$$r_I^m(\text{drive-run/flight line 1}) - r_I^m(\text{drive-run/flight line 2}) = \vec{e}, \quad (36)$$

$$r_I^m(\text{drive-run/flight line 1}) - r_I^m(\text{drive-run/flight line 2}) = \vec{D} + \vec{e}, \quad (37)$$

$$P'\vec{D} = P' \begin{bmatrix} d_x \\ d_y \\ d_z \end{bmatrix} = 0 \quad (38)$$

$$R_{XYZ}^{UVW} = \begin{bmatrix} \cos(\theta_p) & -\sin(\theta_p) & 0 \\ \sin(\theta_p) & \cos(\theta_p) & 0 \\ 0 & 0 & 1 \end{bmatrix} \quad (39)$$

$$P_{UVW} = R_{XYZ}^{UVW} P_{XYZ} R_{XYZ}^{UVW^T} = \begin{bmatrix} P_U & P_{UV} & P_{UW} \\ P_{VU} & P_V & P_{VW} \\ P_{WU} & P_{WV} & P_W \end{bmatrix} \quad (40)$$

$$P'_{UVW} = \begin{bmatrix} P_U & 0 & P_{UW} \\ 0 & 0 & 0 \\ P_{WU} & 0 & P_W \end{bmatrix} \quad (41)$$

$$P'_{XYZ} = R_{XYZ}^{UVW^T} P'_{UVW} R_{XYZ}^{UVW} \quad (42)$$

The modified weight matrix $P'_{xyz}$ is applied to the condition in Equation 36 to only retain the discrepancy between non-conjugate point pairs in the vertical and profile-length directions. The mounting parameters are estimated with the objective to minimize the resultant discrepancies $\vec{e}$ between the non-conjugate point pairs. After each iteration of mounting parameters estimation, the point pairing is conducted again by identifying the closest points using the newly reconstructed point coordinates from the revised estimates of mounting parameters. The results are camera parameters, lever arm and boresight angles that can be used as described above to adjust or calibrate the geospatial position data. Features and experimental results for the fully automated profile-based calibration of LiDAR camera systems are disclosed in Appendix G, the entire disclosure of which is incorporated herein by reference.

Calibration for Time-Delay in Imaging Systems

A UAV-based GNSS/INS-assisted imaging system is comprised of the UAV, an imaging system, and a GNSS/INS unit. For UAV-based imaging systems to have accurate geo-positioning capability, special attention must be paid to system calibration, which includes estimating both internal characteristics of the camera, known as camera calibration, as well as system mounting parameters. Camera calibration for push-broom and LiDAR-based detection systems are discussed above and in the attached Appendices. However, even with accurate mounting parameters, precise time tagging is essential for accurate derivation of 3-D spatial information. Accurate time synchronization between the imaging sensor and the GNSS/INS unit is an important part of this integration. For consumer-grade systems, a time delay between image exposure and the corresponding GNSS/INS event recording often exists and 3-D spatial accuracy can be greatly reduced if this time delay is not taken into account. It can be appreciated that the equations described above for the boresight calibration have a time dependence. For instance in Equation 1 above, $r_b^m(t)$ and $R_b^m(t)$ are the GNSS/INS-based position and orientation information of the IMU body frame coordinate system relative to the mapping frame and each are time dependent. The scale factor A, can also be time dependent.

In accordance with a direct approach in one aspect of the present disclosure, the UAV is directed to a particular flight pattern to calibrate the system parameters to account for the time delay. To derive the time delay and decouple this parameter from the lever arm components and boresight angles, multiple ground speeds and a good distribution of image points are required. The disclosed technique uses opposite flying directions at different flying heights as well as a variation in the linear and angular velocities and good distribution of the image points. This optimal flight configuration ensures that the impact of biases in system parameters on the ground coordinates is maximized and that the parameters are decoupled as much as possible. Using the optimal flight configuration, systematic errors can be easily detected, estimated and removed, and therefore resulting in more accurate 3-D reconstruction.

As discussed above, a UAV-based GNSS/INS-assisted imaging system involves three coordinate systems—a mapping frame, an IMU body frame and a camera frame. The mathematical model of the collinearity principle is illustrated in FIG. 1 and defined in Equation 1 above (with $\lambda_i$ modified as $\lambda(i, c, t)$), in which:

$r_I^m$ are the ground coordinates of the object point I;

$$r_i^c = \begin{bmatrix} x_i - x_p - dist_{x_i} \\ y_i - y_p - dist_{y_i} \\ -c \end{bmatrix}$$

is a vector connecting the perspective center to the image point;

$x_i$, $y_i$ are the image point coordinates;
$x_p$, $y_p$ are the principal point coordinates;
$dist_x$, $dist_y$ are distortion values in x and y directions for image point I;
c is the principal distance;
t is the time of exposure;
$r_{b(t)}^m$ is the position of the IMU body frame relative to the mapping reference frame at timer t derived from the GNSS/INS integration process;
$R_{b(t)}^m$ is the rotation matrix from the IMU body frame to the mapping reference frame at timer t derived from GNSS/INS integration process;
$r_c^b$ is the lever arm from camera to IMU body frame;
$R_c^b$ is the rotation (boresight) matrix from the camera to the IMU body frame;
$\lambda(i, c, t)$ is an unknown scale factor for point i captured by camera c at time t.

Equation 1 can be reformulated to solve for the vector connecting the perspective center to the image point, $r_i^c$. This equation is further reduced to Equation 43:

$$r_i^c = \frac{1}{\lambda(i, c, t)} \begin{bmatrix} N_x \\ N_y \\ D \end{bmatrix}, \text{where} \quad (43)$$

$$\begin{bmatrix} N_x \\ N_y \\ D \end{bmatrix} = R_b^c [R_m^{b(t)} [r_i^m - r_{b(t)}^m] - r_c^b]$$

The unknown scale factor $\lambda(i, c, t)$ is removed to produce Equations 44a, 44b, which are non-linear models:

$$x_i - x_p - dist_{x_i} = -c \frac{N_x}{D} \quad (44a)$$

$$y_i - y_p - dist_{y_i} = -c \frac{N_y}{D} \quad (44b)$$

In the direct approach disclosed herein, the time delay is directly estimated in a bundle adjustment with a self-calibration process. Bundle block adjustment theory is a well-known method for increasing geospatial precision and accuracy of imagery by improving geometric configuration while reducing the quantity of ground control points (GCPs). See, for instance, Mikhail, E. M., Bethel, J. S., & McGlone, J. C. (2001), Introduction to Modern Photogrammetry; New York, John Wiley & Sons, pages 68-72, 123-125, which is incorporated herein by reference. Bundle adjustment processes can incorporate either GCPs or tie features into the mathematical model. When using GCPs, the process aims to ensure collinearity of the GCP, corresponding image point and perspective center of the image encompassing the image point. When relying on tie features, a bundle adjustment procedure enforces intersection of the light rays connecting the perspective centers of the images encompassing corresponding image points of the tie feature and the respective conjugate image points. In other words, the target function aims at estimating the unknown parameters that ensures the best intersection of light rays connecting the perspective centers and conjugate image features.

The models above are modified to incorporate a time delay parameter. Given the position and orientation at $t_0$, initial event marker time, the objective is to find the correct position and orientation at the actual mid-exposure time, t by taking into account the time (delay) between actual exposure time and initial event marker time. Based on the collinearity equations (1), it is clear that a time delay between the mid-exposure and the recorded event marker by the GNSS/INS unit will directly affect the position $r_{b(t)}^m$ and orientation $R_{b(t)}^m$ of the body frame. Therefore, one must estimate the changes in position and orientation caused by the time delay.

To estimate the updated position and orientation, expressions of the mathematical model are derived that consider the potential time delay and include it as a parameter. When dealing with a potential time delay, there will be different times to consider. The initial event marker time is denoted as $t_0$, the time delay as $\Delta t$, and the actual time of exposure as t. The actual time of exposure equals the initial event marker time plus the time delay, $t=t_0+\Delta t$. The position at the correct time, $r_{b(t)}^m$, can then be expressed by using the position at the initial event marker time tag and adding the displacement caused by the time delay, expressed in Equation 45.

$$r_{b(t)}^m = r_{b(t_0)}^m + \Delta t \dot{r}_{b(t_0)}^m \quad (45)$$

The displacement is calculated from the time delay and the instantaneous velocity, $\dot{r}_{b(t_0)}^m$, at the initial event marker time. The instantaneous velocity is expressed in Equation 46.

$$\dot{r}_{b(t_0)}^m = \frac{1}{dt} [r_{b(t_0+dt)}^m - r_{b(t_0)}^m] \quad (46)$$

The GNSS and INS units typically have data rates of 10 and 200 Hz, 200 respectively. The GNSS/INS integration process produces the position and orientation of the IMU body frame at a given time interval which is usually interpolated to that of the data rate of the INS, which is 200 Hz in this study. Given this trajectory, a time interval, dl, is used to compute the instantaneous linear and angular velocities.

Figure 27:
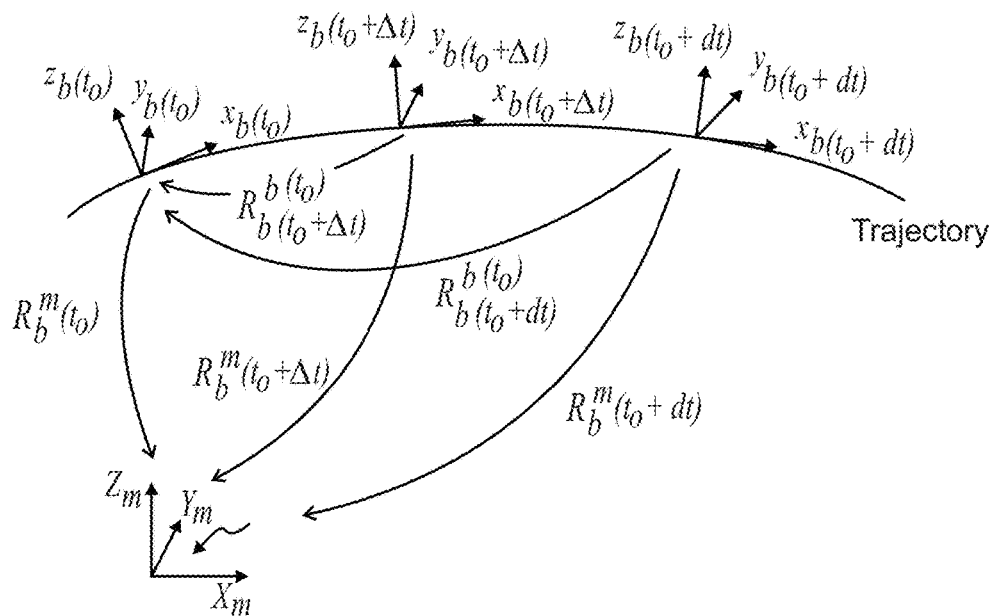
FIG. 27 is a graph illustrating aspects of correcting an IMU body frame orientation in the presence of a time delay.

Next, an expression for the orientation of the IMU body frame, $R_{b(t)}{}^m$, at the correct mid-exposure time can be derived. The changes in the attitude of the IMU body frame at different times can be examined using FIG. 27, which reveals that the rotation matrix at the correct exposure time, $R_{b(t)}{}^m$, can be derived from the attitude of the body frame at time $t_0$ as well as the angular velocity and time delay. The angular velocity is derived based on the attitude at time $t_0$ and attitude at time $t_0+dt$ as shown in Equation 47. More specifically, the attitude at time $t_0$ and the attitude at time $t_0+di$ can be used to derive the changes in the attitude angles denoted by $d\omega_b(t_0)$, $d\varphi_b(t_0)$, and, $d\kappa_b(t_0)$. These attitude changes along with a user-defined time interval, dt, can then be used to derive the angular velocity as per Equations 48a-48c. Using the angular velocities and the time delay, the change in rotation caused by the existing time delay can be derived. It should be noted that an expression for the incremental rotation matrix is used in Equation 49 since the angular changes caused by the time delay are relatively small. Finally, using the IMU body orientation at the initial event marker time, expressed in $R_{b(t0)}{}^m$, along with the attitude changes caused by the time delay, expressed in $R_{b(t0+\Delta t)}{}^{b(t0)}$ the IMU body orientation at the actual exposure time, $R_{b(t)}{}^m$, can be derived per Equation 50. The collinearity equation from above can thus be rewritten as in Equation 51.

$$R^{b(t_0)}_{b(t_0+dt)} = R^{b(t_0)}_m R^m_{b(t_0+dt)} = \text{Rotation}(d\omega_b(t_0), d\varphi_b(t_0), d\kappa_b(t_0)) \tag{47}$$

$$\dot{\omega}_b(t_0) = \frac{d\omega_b(t_0)}{dt} \tag{48a}$$

$$\dot{\varphi}_b(t_0) = \frac{d\varphi_b(t_0)}{dt} \tag{48b}$$

$$\dot{\kappa}_b(t_0) = \frac{d\kappa_b(t_0)}{dt} \tag{48b}$$

$$R^{b(t0)}_{b(t0+\Delta t)} = \text{Rotation}(\dot{\omega}_b(t_0)\Delta t, \dot{\varphi}_b(t_0)\Delta t, \dot{\kappa}_b(t_0)\Delta t) \cong \begin{bmatrix} 1 & -\dot{\kappa}_b(t_0)\Delta t & \dot{\varphi}_b(t_0)\Delta t \\ \dot{\kappa}_b(t_0)\Delta t & 1 & -\dot{\omega}_b(t_0)\Delta t \\ -\dot{\varphi}_b(t_0)\Delta t & \dot{\omega}_b(t_0)\Delta t & 1 \end{bmatrix} \tag{49}$$

$$R^m_{b(t)} = R^m_{b(t_0)} R^{b(t_0)}_{b(t_0+\Delta t)} \tag{50}$$

$$r^c_i = \frac{1}{\lambda(i,c,t)} R^c_b \left[ R^{b(t_0+\Delta t)}_{b(t_0)} \; R^{b(t_0)}_m \left( r^m_I - r^m_{b(t_0)} - \dot{r}^m_{b(t_0)}\Delta t \right) - r^b_c \right] \tag{51}$$

The direct approach implements a bundle block adjustment, but the mathematical model is modified so that the image coordinate measurements are a function of the trajectory information, interior orientation parameters (IOPs), lever arm components, boresight angles, ground coordinates, and time delay. More specifically, during the least squares adjustment, time delay is treated as an unknown parameter. The initial value of time delay is set to zero. The first iteration is performed and the lever arm components, boresight angles, ground coordinates of tie points, and time delay are solved for. The time delay is applied to adjust position and orientation for the next iteration, and the time delay is set back to zero before the next iteration. The iterations continue until the time delay estimate is approximately zero and the corrections to the other unknown parameters are sufficiently small.

A bias impact analysis, similar to the analysis for boresight angle bias discussed above, can be conducted to ascertain an optimal flight configuration for system calibration while considering time delay. The objective is to determine an optimal flight configuration which results in an accurate estimation of the system parameters, including the lever arm components, boresight angles, and time delay. The optimal flight configuration is the one that maximizes the impact of biases or any possible errors in the system parameters while also decoupling those parameters. A thorough way of doing this is to derive the impact of biases in the system parameters on the derived ground coordinates. Bias impact analysis can be done by deriving the partial derivatives of the point positioning equation with respect to the system parameters.

Equation 52 reformulates Equation 51 to express the ground coordinates as a function of the measurements and system parameters. Partial derivatives are derived from Equation 52. Based on this analysis one can come up with the optimal flight configuration that will exhibit significant shift in the derived ground coordinates due to small changes in the system parameters.

For system calibration, the unknown parameters, denoted henceforth by x, consist of the lever arm components, $\Delta X$, $\Delta Y$, $\Delta Z$, boresight angles, $\Delta\omega$, $\Delta\varphi$, $\Delta\kappa$, and time delay, $\Delta t$ Generalizing Equation 52 to Equation 53 shows that the ground coordinate, $r_I^m$, is a function of the system parameters, x. In addition to these above-mentioned explicit system parameters, the scale, $\lambda$, is implicitly a function of the boresight angles, $\Delta\omega$, $\Delta\varphi$. This functional dependency is based on the fact that a bias in the boresight angles will lead to a sensor tilt which causes a variation in the scale. This dependency should be considered in this bias impact analysis. As shown in Equation 54, a systematic shift in the estimated ground coordinates will be produced by changes in the system parameters. Therefore, taking the partial derivatives of the collinearity equations with respect to each system parameter and multiplying by the discrepancy in the system parameters, $\delta x$, show which flight configuration produce a change in the ground coordinates, $\delta r_I^m$, as expressed in Equation 54.

$$r^m_I = r^m_{b(t_0)} + \Delta t \dot{r}^m_{b(t_0)} + R^m_{b(t_0)} R^{b(t_0)}_{b(t_0+\Delta t)} r^b_c + \lambda(i,c,t) R^m_{b(t_0)} R^{b(t_0)}_{b(t_0+\Delta t)} R^b_c r^c_i \tag{52}$$

$$r^m_I = f(x), \text{ where } x = (\Delta X, \Delta Y, \Delta Z, \Delta\omega, \Delta\varphi, \Delta\kappa, \Delta t) \tag{53}$$

$$\delta r^m_I = \frac{\partial r^m_I}{\partial x}\delta x, \text{ where } \delta x = (\delta\Delta X, \delta\Delta Y, \delta\Delta Z, \delta\Delta\omega, \delta\Delta\varphi, \delta\Delta\kappa, \delta\Delta t) \tag{54}$$

For this analysis it is assumed that the sensor and IMU body frame coordinate systems are vertical. Also, it can be assumed that the sensor is travelling with a constant attitude in the south-to-north and north-to-south directions. As mentioned above, the double signs, ± and ∓, refer to the direction of the flight, with the top sign pertaining to the south-to-north flight and the bottom sign referring to the north-to-south flight. It is also assumed that the sensor and IMU body frame coordinate systems are almost parallel and that the flight/travel is over a flat horizontal terrain, where the scale is equal to the flying height over the principal distance, $$\lambda = \frac{H}{c}.$$

The bias analysis proceeds by taking the partial derivatives with respect to each system parameter. Examining Equation 52 it can be seen that there are three terms that are comprised of system parameters and needed for the computation of the partial derivatives are $\Delta t \dot{r}_{b(t0)}{}^m$, $R_{b(t)}{}^m r_c{}^b$ and $\lambda(i, c, t) R_{b(t)}{}^m r_c{}^b r_i{}^c$. The first term, $\Delta t \dot{r}_{b(t0)}{}^m$, only includes the time delay system parameter and its partial derivative will simply be the instantaneous linear velocity. To derive an expression for $R_{b(t)}{}^m r_c{}^b$, $R_{b(t)}{}^m$, is expanded. Based on the sensor flight direction assumption and the incremental rotation resulting from the time delay, shown in Equation 49, $R_{b(t)}{}^m$ can be expanded to form Equation 55. Using Equation 55 and ignoring second order incremental terms, $R_{b(t)}{}^m r_c{}^b$, can then be expressed as in Equation 56. For the third term, $\lambda(i, c, t) R_{b(t)}{}^m r_c{}^b r_i{}^c$, the second order incremental terms are again ignored. After multiplication of the image coordinate vector, boresight matrix, IMU body frame rotation matrix, and scale factor, the third term is expressed in Equation 57.

$$R_{b(t)}^m = \begin{bmatrix} \pm 1 & 0 & 0 \\ 0 & \pm 1 & 0 \\ 0 & 0 & 1 \end{bmatrix} \begin{bmatrix} 1 & -\dot{\kappa}_b(t_0)\Delta t & \dot{\varphi}_b(t_0)\Delta t \\ \dot{\kappa}_b(t_0)\Delta t & 1 & -\dot{\omega}_b(t_0)\Delta t \\ -\dot{\varphi}_b(t_0)\Delta t & \dot{\omega}_b(t_0)\Delta t & 1 \end{bmatrix} \quad (55)$$

$$= \begin{bmatrix} \pm 1 & \mp\dot{\kappa}_b(t_0)\Delta t & \pm\dot{\varphi}_b(t_0)\Delta t \\ \mp\dot{\kappa}_b(t_0)\Delta t & \pm 1 & \mp\dot{\omega}_b(t_0)\Delta t \\ -\dot{\varphi}_b(t_0)\Delta t & \dot{\omega}_b(t_0)\Delta t & 1 \end{bmatrix}$$

$$R_{b(t)}^m r_c^b = \begin{bmatrix} \pm \Delta X \\ \pm \Delta Y \\ \Delta Z \end{bmatrix} \quad (56)$$

$$\lambda(i, c, t) R_{b(t)}^m R_c^b r_i^c = \quad (57)$$

$$\lambda(i, c, t) \begin{bmatrix} \pm x_i \mp \Delta \kappa y_i \mp \dot{\kappa}_b(t_0)\Delta t y_i \mp \Delta \varphi c \mp \dot{\varphi}_b(t_0)\Delta t c \\ \pm \dot{\kappa}_b(t_0)\Delta t x_i \pm \Delta \kappa x_i \pm y_i \pm \Delta \omega c \mp \dot{\omega}_b(t_0)\Delta t c \\ -\dot{\varphi}_b(t_0)\Delta t x_i - \Delta \varphi x_i + \dot{\omega}_b(t_0)\Delta t y_i + \Delta \omega y_i - c \end{bmatrix}$$

Equations 56 and 57 provide the terms needed for the partial derivatives needed for the bias impact analysis, namely the teens relative to the lever arm components, boresight angles and time delay. These partial derivatives are expressed in Equations 58a-58c, respectively.

$$\delta r_I^m |_{\delta r_c^b} = \begin{bmatrix} \pm \delta \Delta X \\ \pm \delta \Delta Y \\ \delta \Delta Z \end{bmatrix} \quad (58a)$$

$$\delta r_I^m |_{\delta \Delta \omega, \delta \Delta \varphi, \delta \Delta \kappa} = H \begin{bmatrix} \pm \frac{x_i y_i}{c^2} \delta \Delta \omega \mp \left(1 + \frac{x_i^2}{c^2}\right) \delta \Delta \varphi \mp \frac{y_i}{c} \delta \Delta \kappa \\ \pm \left(1 + \frac{y_i^2}{c^2}\right) \delta \Delta \omega \mp \frac{x_i y_i}{c^2} \delta \Delta \varphi \pm \frac{x_i}{c} \delta \Delta \kappa \\ 0 \end{bmatrix} \quad (58b)$$

$$\delta r_I^m |_{\delta \Delta t} = \dot{r}_{b(t_0)}^m \delta \Delta t + \lambda(i, c, t) \begin{bmatrix} \pm \dot{\kappa}_b(t_0) y_i \delta \Delta t \mp \dot{\varphi}_b(t_0) c \delta \Delta t \\ \pm \dot{\kappa}_b(t_0) x_i \delta \Delta t \mp \dot{\omega}_b(t_0) c \delta \Delta t \\ -\dot{\varphi}_b(t_0) x_i \delta \Delta t + \dot{\omega}_b(t_0) y_i \delta \Delta t \end{bmatrix} \quad (58c)$$

As reflected in these equations, the lever arm component changes depend on the flying direction. The impact of the boresight angles on the ground coordinates is a function of the flying height, flying direction, and the ratio of the image point coordinates and the principal distance, $\frac{xi}{c}$ and $\frac{yi}{c}$.

The impact of the time delay is a function of the linear and angular velocities, scale, image point coordinates, principal distance, and flying direction. With this information, an optimal flight configuration for system calibration can be designed while considering time delay. As a result of this analysis it can be concluded that the horizontal components of the lever arm can be estimated using different flying directions while its vertical component is independent of flight configuration. On the other hand, to estimate boresight angles while decoupling them from lever arm components, different flying directions and flying heights are needed as well as a good distribution of image points. Finally, to derive the time delay and decouple this parameter from the lever arm components and boresight angles, multiple ground speeds and a good distribution of image points are required.

In summary, the system parameters are derived using opposite flying directions at different flying heights as well as having a variation in the linear and angular velocities and good distribution of the image points. This optimal flight configuration ensures that the impact of biases in system parameters on the ground coordinates is maximized and that the parameters are decoupled as much as possible. Using the optimal flight configuration, systemic errors can be easily detected, estimated and removed, resulting in more accurate 3-D reconstruction. Other details and experimental results of the direct calibration method of the present disclosure are provided in Appendices D and H, the entire disclosures of which is incorporated herein by reference.

Figure 28:
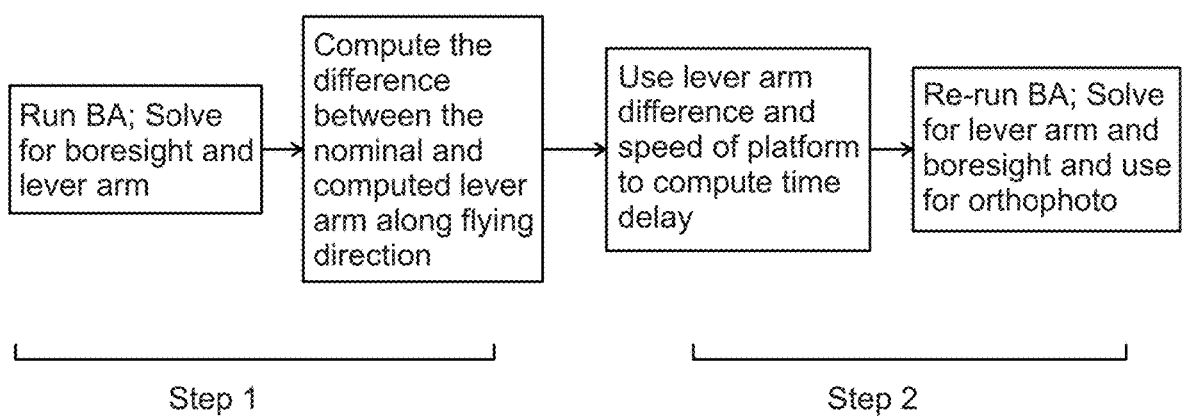
FIG. 28 is a flowchart of an indirect method for time delay estimation and calibration according to one aspect of the present disclosure.

An indirect approach is also contemplated that uses the above bias impact analysis by exploiting the fact that the lever arm in the flying direction is correlated with the time delay given a single ground speed. In other words, if flights in opposite directions and constant ground speed are used, then the lever arm component in the flying direction will be correlated with the time delay. As a result, by estimating the lever arm component in the flying direction and then comparing it with the nominal value which is directly measured from the GNSS/INS unit to the imaging sensor, a possible time delay in system synchronization can be discerned. The indirect approach consists of two primary steps, as shown in the flowchart of FIG. 28. In the first step, an initial bundle adjustment (BA) with self-calibration is performed to solve for the lever arm components (only lever arm in the along and across flying directions) and boresight angles. If a significant time delay exists, the computed lever arm in the flying direction will be drastically different from the nominal value. For example, the lever arm in the along the flying direction may be estimated to be in the meter magnitude whereas the IMU body frame is only centimeters away from the sensor. This discrepancy is indicative that the system may have a time delay issue. After the initial bundle adjustment is performed, the difference is derived between the computed lever arm and the nominal/measured lever arm in the flying direction. In the second step this difference in distance is now known and the time delay can be computed by using the speed/time/distance relation. The computed time delay is then applied to derive the new position and orientation of IMU body frame at the actual exposure time. Finally, another bundle adjustment with self-calibration is performed to solve for the mounting parameters. Appendix D discloses additional aspects of the system and method for estimating and accounting for time delay in UAV-based imaging systems, the entire disclosure of which is incorporated herein by reference.

The bundle block adjustment and mathematical model does not change from the traditional bundle adjustment with self-calibration procedure; expressed in Equations 44a-44b above. The image coordinates are still a function of the trajectory information, IOPs, lever arm components, boresight angles, and ground coordinates. In accordance with the methods disclosed herein, the time delay is not directly derived, but instead indirectly estimated using the lever arm deviation in the along-flight direction and speed/time/distance relation. One limitation of this approach is that because it is assumed that the time delay impact is absorbed by the lever arm in the flying direction, it is necessary to fly the vehicle at a single ground speed. As mentioned above, in order to conduct reliable system calibration, flights with different flying directions, ground speeds, and altitude are required.

It can be appreciated that the calibration methods disclosed herein can be implemented in a processor or computer integrated into the UAV or mobile platform. The calibration methods provide calibration matrices that can be applied to the geospatial coordinates detected by the GLASS/INS associated with the data points representing a particular image of the subject area to correct for offsets or errors in the boresight and to correct for time delays inherent in the sensing process. The calibration methods can also be implemented in software separate from the UAV or mobile platform to correct the point cloud and global position data received from the UAV or mobile platform.

The present disclosure should be considered as illustrative and not restrictive in character. It is understood that only certain embodiments have been presented and that all changes, modifications and further applications that come within the spirit of the disclosure are desired to be protected.

What is claimed is:

1. A method for calibrating the boresight mounting parameters for an imaging device mounted to a vehicle, the vehicle having a navigation device for determining the position and orientation of the vehicle relative to a mapping frame coordinate system in a region being imaged by the imaging device, the navigation device defining a body frame coordinate system and the imaging device defining an imaging frame coordinate system offset from said body frame coordinate system by said mounting parameters, the mounting parameters defining the position and orientation of the imaging device relative to the navigation device and including boresight pitch, roll and heading angles relative to the body frame coordinate system, in which the mounting parameters include pre-determined assumed boresight angles, the imaging device operable to image a swath of the region as the vehicle travels over the region, the method comprising:

directing the vehicle in a travel path for calibrating the imaging device, the travel path including three travel lines, two of the travel lines being in parallel and in opposite directions and having a substantially complete overlap of the swath along the two travel lines, and the third travel line being parallel to the other two travel lines with the swath of the third travel line overlapping about 50% of the swath of the other two travel lines;

obtaining image and associated location data along each of the three travel lines;

identifying a tie point I in the image data that is located in the center of the swath of the third travel path;

for each of the three travel lines, a, b and c, calculating an estimated position $r_I^m(a)$, $r_I^m(b)$ and $r_I^m(c)$, respectively, of the tie point in the mapping frame coordinate system;

establishing one of the three travel lines, a, as a reference and calculating a difference between the estimated position of the reference travel line $r_I^m(a)$, and the estimated position of each of the other two travel lines, $r_I^m(b)$ and $r_I^m(c)$, respectively;

applying a least squares adjustment to equations of the following form to solve for the biases in boresight angles, $\delta\Delta\omega$, $\delta\Delta\phi$, and $\delta\Delta\kappa$, from the pre-determined assumed boresight angles $$r_I^m(a) - r_I^m(b) = \begin{bmatrix} \mp\left(H + \frac{X_a'^2}{H}\right)\delta\Delta\varphi \\ \pm H\delta\Delta\omega \pm X_a'\delta\Delta\kappa \\ 0 \end{bmatrix} - \begin{bmatrix} \mp\left(H + \frac{X_b'^2}{H}\right)\delta\Delta\varphi \\ \pm H\delta\Delta\omega \pm X_b'\delta\Delta\kappa \\ 0 \end{bmatrix},$$

where $r_I^m(a)$-$r_I^m(b)$ are the calculated differences between the reference travel line and each of the other two travel lines, respectively, H is the altitude of the vehicle above the tie point, $X'_a$ is the lateral distance between the tie point and the reference travel line, and $X'_b$ is the lateral distance between the tie point and each of the other two travel lines, respectively; and adjusting the predetermined assumed boresight angles by the biases in boresight angles determined in the least squares adjustment.

2. The method of claim 1 in which the imaging device is a push-broom scanner.

3. A method for calibrating the boresight mounting parameters for an imaging device mounted to a vehicle, the vehicle having a navigation device for determining the position and orientation of the vehicle relative to a mapping frame coordinate system in a region being imaged by the imaging device, the navigation device defining a body frame coordinate system and the imaging device defining an imaging frame coordinate system offset from said body frame coordinate system by said mounting parameters, the mounting parameters defining the position and orientation of the imaging device relative to the navigation device and including boresight pitch, roll and heading angles relative to the body frame coordinate system, in which the mounting parameters include pre-determined assumed boresight angles, the imaging device operable to image a swath of the region as the vehicle travels over the region, the method comprising:

selecting two ground control points in the region, the ground control points having a known position and orientation relative to the mapping frame and the ground control points being separated by a distance less than the half the width of the swath of the imaging device;

directing the vehicle in a travel path for calibrating the imaging device, the travel path being substantially perpendicular to a line between the two ground control points in which a first control point is substantially aligned with the center of the swath and the second control point is substantially aligned with an edge of the swath as the vehicle travels over the one control point;

obtaining image and associated location data along the travel path, the location data including location data of said two ground control points;

calculating an offset of the boresight pitch and roll angles based on the difference between the location data for first control point and the known location of the first control point;

calculating an offset of the boresight heading angle based on the difference between the location data for first control point and the known location of the second control point; and adjusting the predetermined assumed boresight angles by the calculated offsets.

4. The method of claim 3 in which the imaging device is a push-broom scanner.

5. A method for calibrating the boresight mounting parameters for an imaging device mounted to a vehicle, the vehicle having a navigation device for determining the position and orientation of the vehicle relative to a mapping frame coordinate system in a region being imaged by the imaging device, the navigation device defining a body frame coordinate system and the imaging device defining an imaging frame coordinate system offset from said body frame coordinate system by said mounting parameters, the mounting parameters defining the position and orientation of the imaging device relative to the navigation device and including boresight pitch, roll and heading angles relative to the body frame coordinate system, in which the mounting parameters include pre-determined assumed boresight angles, the imaging device operable to image a swath of the region as the vehicle travels over the region, the method comprising:

(a) directing the vehicle in a travel path for calibrating the imaging device, the travel path including three travel lines, two of the travel lines being in parallel and in opposite directions and having a substantially complete overlap of the swath along the two travel lines, and the third travel line being parallel to the other two travel lines with the swath of the third travel line overlapping about 50% of the swath of the other two travel lines;

(b) obtaining image and associated location data along the travel path for each of the three travel lines;

(c) identifying a tie point I in the image data that is located in the center of the swath of the third travel path;

(d) applying a last squares adjustment to a mathematical model of the following form to solve for boresight angles, $\delta\Delta\omega$, $\delta\Delta\phi$, and $\delta\Delta\kappa$, and for the coordinates of the tie point in the mapping frame coordinate system as determined along each of the three travel lines;

$$x_i(-N_X\Delta\varphi + N_Y\Delta\omega + D) = -f(N_X - N_Y\Delta\kappa + D\Delta\varphi) \quad (23.a)$$

$$y_i(-N_X\Delta\varphi + N_Y\Delta\omega + D) = -f(N_X\Delta\kappa + N_Y - D\Delta\omega). \quad (23.b)$$

where $\begin{bmatrix} N_X \\ N_Y \\ D \end{bmatrix} = R_b^{c'}\{R_m^b(|t)[r_I^m - r_b^m(t)] - r_c^b\},$ where $x_i$ and $y_i$ are the coordinates of the image point of the imaging device in the imaging frame coordinate system, f is the focal length of the imaging device, $r_I^m$ represents coordinates in the mapping coordinate system of the tie point I, $r_b^m$ (t) and rotation, $R_b^m$ (t) are the position and angular orientation of the body frame coordinate system relative to the mapping frame; $r_c^b$ is the lever arm vector relating the imaging device to the body frame coordinate system; c' denotes a virtual scanner coordinate system that is almost parallel to the imaging device coordinate system c, $R_m^b$ (t) is a boresight angle rotation matrix that transforms a vector from the mapping coordinate system to the body frame coordinate system and $R_b^{c'}$'s a boresight angle rotation matrix that transforms a vector from the body frame coordinate system to the virtual scanner coordinate system; and (e) adjusting the predetermined assumed boresight angles by the boresight angles determined in the least squares adjustment.

6. The method of claim 5, wherein the imaging device is a push-broom scanner.

7. A method for calibrating the mounting parameters for a LiDAR (light detection and ranging) imaging device mounted to a vehicle, the vehicle having a navigation device for determining the position and orientation of the vehicle relative to a mapping frame coordinate system in a region being imaged by the imaging device, the navigation device defining a body frame coordinate system and the LiDAR imaging device defining an imaging frame coordinate system offset from said body frame coordinate system by said mounting parameters, the mounting parameters defining the position and orientation of the LiDAR imaging device relative to the navigation device and including lever arm coordinates (X, Y) and boresight pitch ($\omega$), roll ($\varphi$) and heading ($\kappa$) angles relative to the body frame coordinate system, in which the mounting parameters include pre-determined assumed lever arm coordinates and boresight angles, the method comprising:

(a) providing a scene to be imaged by the LiDAR having vertical and horizontal planar features;

(b) directing the vehicle in a travel path for calibrating the imaging device, the travel path including a flight direction along opposite flight lines while scanning a vertical planar feature parallel to the flight direction to obtain location data of the vertical planar feature in each of the opposite flight lines, and estimating a change in lever arm coordinate (X) by minimizing discrepancies between the location data obtained in each of the opposite flight lines;

(c) directing the vehicle in the travel path for calibrating the imaging device in a flight direction along opposite flight lines while scanning a vertical planar feature perpendicular to the flight direction to obtain location data of the vertical planar feature in each of the opposite flight lines, and estimating a change in lever arm coordinate (Y) by minimizing discrepancies between the location data obtained in each of the opposite flight lines;

(d) directing the vehicle in the travel path for calibrating the imaging device in a flight direction along opposite flight lines at one altitude and along a third flight line at a different altitude while scanning a horizontal planar feature and a vertical planar feature perpendicular to the flight direction, and estimating a change in boresight pitch ($\Delta\omega$) by minimizing discrepancies between the location data obtained in each of the three flight lines;

(e) directing the vehicle in the travel path for calibrating the imaging device in a flight direction along opposite flight lines at one altitude and along a third flight line at a different altitude while scanning a horizontal planar feature and a vertical planar feature parallel to the flight direction, and estimating a change in boresight roll ($\Delta\varphi$) by minimizing discrepancies between the location data obtained in each of the three flight lines;

(f) directing the vehicle in the travel path for calibrating the imaging device in a flight direction along two flight lines in the same direction with a lateral separation between the two flight lines and estimating a change in boresight roll (Δκ) by minimizing discrepancies between the location data obtained in each of the two flight lines; and then (g) adjusting the pre-determined assumed lever arm coordinates to the values (X, Y) and adjusting pre-determined assumed boresight angles (ω, φ, κ) by the values (Δω, Δφ, Δκ) respectively.

8. A method for calibrating the mounting parameters for a LiDAR (light detection and ranging) imaging device mounted to a vehicle, the vehicle having a navigation device for determining the position and orientation of the vehicle relative to a mapping frame coordinate system in a region being imaged by the imaging device, the navigation device defining a body frame coordinate system and the LiDAR imaging device defining an imaging frame coordinate system offset from said body frame coordinate system by said mounting parameters, the mounting parameters defining the position and orientation of the LiDAR imaging device relative to the navigation device and including lever arm coordinates (X, Y, Z) and boresight pitch (ω), roll (φ) and heading (κ) angles relative to the body frame coordinate system, in which the mounting parameters include pre-determined assumed mounting parameters for the lever arm coordinates and boresight angles, the method comprising:

(a) directing the vehicle in a travel path for calibrating the imaging device, the travel path including two or more travel paths over a scene;

(b) extracting data from a plurality of LiDAR scans, image data and trajectory data and generating a LiDAR 3D point cloud;

(c) identifying two or more conjugate features in the LiDAR point cloud and image data and generating the location of the conjugate features in the imaging frame coordinate system;

(d) computing the 3D mapping frame coordinates for the LiDAR and image features initially using the pre-determined assumed mounting parameters;

(e) pairing conjugate features;

(f) assigning one LiDAR scan as a reference and generating a weight matrix of others of the plurality of LiDAR scans in relation to the reference for all conjugate features;

(g) estimating new mounting parameters for use in modifying the mounting parameters by minimizing discrepancies between the reference and each of the plurality of LiDAR scans using least squares adjustment (LSA) of the weight matrix;

(h) comparing the new mounting parameters to immediately prior mounting parameters and if the difference is greater than a pre-defined threshold value returning to Step (d) using the new mounting parameters in computing the 3D mapping frame coordinates; and (i) if the difference in Step (h) is less than the pre-defined threshold, outputting the new mounting parameters estimated in Step (g).

9. The method of claim 8, wherein the step of pairing conjugate features includes conjugate features in one of the following pairs:
image-to-image pairings based on the image data;
LiDAR-to-LiDAR pairings based on the LiDAR data;
LiDAR-to-image pairings based on the LiDAR and image data.

10. The method of claim 9, wherein:
the step of extracting conjugate features includes extracting linear features, in which the linear features include pseudo-conjugate points; and
the step of pairing conjugate features includes LiDAR-to-LiDAR or LiDAR-to-image pairings of the pseudo-conjugate points of the linear features.

11. The method of claim 9, wherein:
the step of extracting conjugate features includes extracting planar features, in which the planar features include pseudo-conjugate points; and
the step of pairing conjugate features includes LiDAR-to-LiDAR pairings of the pseudo-conjugate points along the planar features.

12. The method of claim 11, wherein the step of pairing conjugate features further includes image-to-image pairings of the pseudo-conjugate points along the planar features.

13. A method for calibrating the mounting parameters for a LiDAR (light detection and ranging) imaging device mounted to a vehicle, the vehicle having a navigation device for determining the position and orientation of the vehicle relative to a mapping frame coordinate system in a region being imaged by the imaging device, the navigation device defining a body frame coordinate system and the LiDAR imaging device defining an imaging frame coordinate system offset from said body frame coordinate system by said mounting parameters, the mounting parameters defining the position and orientation of the LiDAR imaging device relative to the navigation device and including lever arm coordinates (X, Y, Z) and boresight pitch (ω), roll (φ) and heading (κ) angles relative to the body frame coordinate system, in which the mounting parameters include pre-determined assumed mounting parameters for the lever arm coordinates and boresight angles, the method comprising:

(a) directing the vehicle in a travel path for calibrating the imaging device, the travel path including two or more travel paths over a scene;

(b) extracting data from a plurality of LiDAR scans generating a LiDAR 3D point cloud;

(c) identifying all profiles in the LiDAR point cloud in which the profiles are comprised of multiple linear segments with angular variability between the segments;

(d) extracting a template profile in one travel path from among all profiles and identifying points in the 3D point cloud corresponding to the template profile;

(e) identifying profiles in the remaining travel paths that match the template profile and identifying points in the 3D point cloud corresponding to each of the profiles;

(f) determining the 3D mapping frame coordinates for each point of all the profiles initially using the pre-determined assumed mounting parameters;

(g) comparing points in the template profile to points in each of the other profiles, respectively, to find the closest point pairs between the two profiles;

(h) generating a weight matrix for each profile, respectively, based on the closest point pairs between the respective profile and the template profile;

(i) estimating new mounting parameters for use in modifying the mounting parameters by minimizing discrepancies between point pairs;

(j) comparing the new mounting parameters to immediately prior mounting parameters and if the difference is greater than a pre-defined threshold value returning to Step (f) using the new mounting parameters; and (k) if the difference in Step (j) is less than the pre-defined threshold, outputting the new mounting parameters estimated in Step (i).

14. The method of claim 13, wherein the step of identifying all profiles in the 3D point cloud includes:
- defining a bounding box that includes all of the points captured from all the travel paths of the vehicle;
- defining square tiles of predetermined dimension in the bounding box; and
- identifying tiles that include one profile oriented in the flight direction of a travel path and one profile oriented across the flight direction.

15. The method of claim 13, wherein the step of identifying profiles in the remaining travel paths that match the template profile includes:
- generating a height map for the template profile; and
- identifying other profiles with points that are within 95% of the height for each point in the template profile height map.

16. The method of claim 13, wherein the step of selecting a template profile includes selecting a profile that exhibits a unique definition along the vertical and profile-length directions having two or more linear components with variability in the profile-length direction.

17. A method for calibrating the mounting parameters for an imaging device mounted to a vehicle, the vehicle having a navigation device for determining the position and orientation of the vehicle relative to a mapping frame coordinate system in a region being imaged by the imaging device, the navigation device defining a body frame coordinate system and the imaging device defining an imaging frame coordinate system offset from said body frame coordinate system by said mounting parameters, the mounting parameters defining the position and orientation of the imaging device relative to the navigation device and including lever arm coordinates (X, Y, Z) and boresight pitch ($\omega$), roll ($\varphi$) and heading ($\kappa$) angles relative to the body frame coordinate system, in which the mounting parameters include predetermined assumed mounting parameters for the lever arm coordinates and boresight angles, the method comprising:
- (a) directing the vehicle along at least two travel paths over a scene, the travel paths being in opposite directions and at different altitudes over the scene and the vehicle linear and angular velocities along the travel paths being different;
- (b) determining the difference between mounting parameters calculated based on each of the at least two travel paths;
- (c) computing a time delay in the imaging device based on the difference determined in Step (b); and
- (d) adjusting the position and orientation determined by the navigation device to account for the time delay.

* * * * *